United States Patent [19]

Kobayashi et al.

[11] Patent Number: 4,611,287

[45] Date of Patent: Sep. 9, 1986

[54] FUEL VOLUME MEASURING SYSTEM FOR AUTOMOTIVE VEHICLE

[75] Inventors: Hiroshi Kobayashi, Yokohama; Hiroaki Obayashi, Yokosuka, both of Japan

[73] Assignee: Nissan Motor Company, Limited, Japan

[21] Appl. No.: 502,321

[22] Filed: Jun. 8, 1983

[30] Foreign Application Priority Data

Aug. 16, 1982 [JP] Japan ............................. 57-141803
Aug. 16, 1982 [JP] Japan ............................. 57-141805
Sep. 27, 1982 [JP] Japan ............................. 57-166541

[51] Int. Cl.$^4$ .................. G01F 23/26; G01F 9/02; G01F 15/075; G06F 15/20
[52] U.S. Cl. .................... 364/442; 73/304 C; 73/313; 361/284; 364/564; 364/575
[58] Field of Search ............. 73/313, 113, 114, 804 C; 361/284; 364/424, 442, 564, 575

[56] References Cited

U.S. PATENT DOCUMENTS

| | | | |
|---|---|---|---|
| 4,054,781 | 10/1977 | Kuno et al. ................ | 73/114 X |
| 4,067,061 | 1/1978 | Juhasz ...................... | 364/424 X |
| 4,090,408 | 5/1978 | Hedrick ..................... | 73/304 C |
| 4,179,740 | 12/1979 | Malin ........................ | 364/442 |
| 4,188,618 | 2/1980 | Weisbart .................... | 364/442 |
| 4,194,395 | 3/1980 | Wood ........................ | 73/304 C |
| 4,217,644 | 8/1980 | Kato et al. ................. | 364/442 |
| 4,218,744 | 8/1980 | Pratt et al. ................. | 73/114 X |
| 4,296,472 | 10/1981 | Sarkis ....................... | 364/442 |
| 4,337,638 | 7/1982 | Leonard et al. ............. | 73/304 C |
| 4,386,406 | 5/1983 | Igarashi et al. ............ | 364/442 |
| 4,400,779 | 8/1983 | Kosuge et al. ............. | 364/442 |
| 4,402,048 | 8/1983 | Tsuchida et al. .......... | 364/442 |
| 4,444,051 | 4/1984 | Yamaki et al. ............ | 73/304 C |
| 4,448,072 | 5/1984 | Tward ...................... | 73/304 C |
| 4,470,296 | 9/1984 | Kobayashi et al. ........ | 73/113 |
| 4,502,124 | 2/1985 | Grohmann et al. ........ | 73/113 |
| 4,531,407 | 7/1985 | Kobayashi ................ | 73/304 C |

FOREIGN PATENT DOCUMENTS

57-10416 1/1982 Japan .

OTHER PUBLICATIONS

S. D. Stearns, Digital Signal Analysis, Hayden Book Company, Inc., 1975, pp. 121–123.
W. J. Brown, Research Aircraft Measurement System Graphic System User Guide, NOAA-ERL, 1978.

*Primary Examiner*—Felix D. Gruber
*Attorney, Agent, or Firm*—Schwartz, Jeffery, Schwaab, Mack, Blumenthal & Evans

[57] ABSTRACT

A fuel volume measuring system for an automotive vehicle in which fuel volume detection signals are simply averaged during a relatively-short averaging time period at regular measuring cycles when the vehicle is being refueled, and further weight-averaged or moving-averaged at regular measuring cycles when the vehicle is running. Therefore, fuel volume can be indicated quickly at a high response speed when the vehicle is being refueled and additionally fuel volume fluctuations can be minimized when the vehicle is running. Further, the system according to the present invention discloses the method of detecting the state where the vehicle is being refueled on the basis of the fact that the difference between at-least one of the current data signal indicative of fuel volume and at-least one of the preceding data signal indicative of fuel volume exceeds a predetermined value.

46 Claims, 43 Drawing Figures

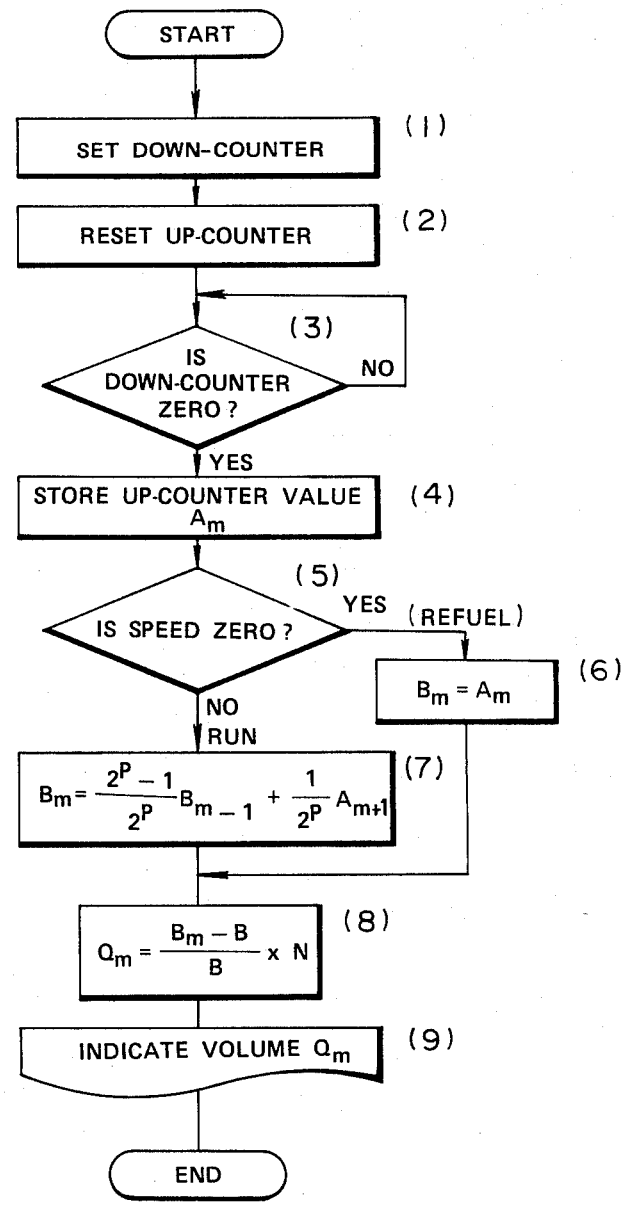

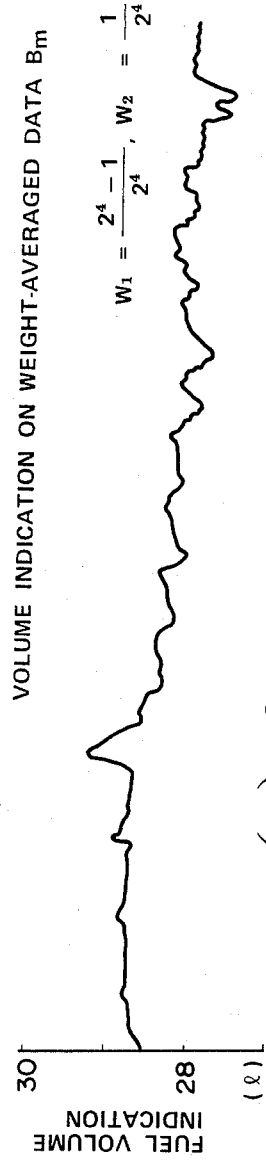
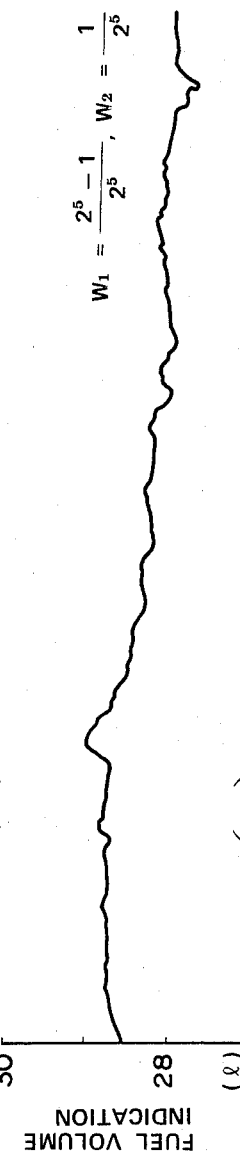
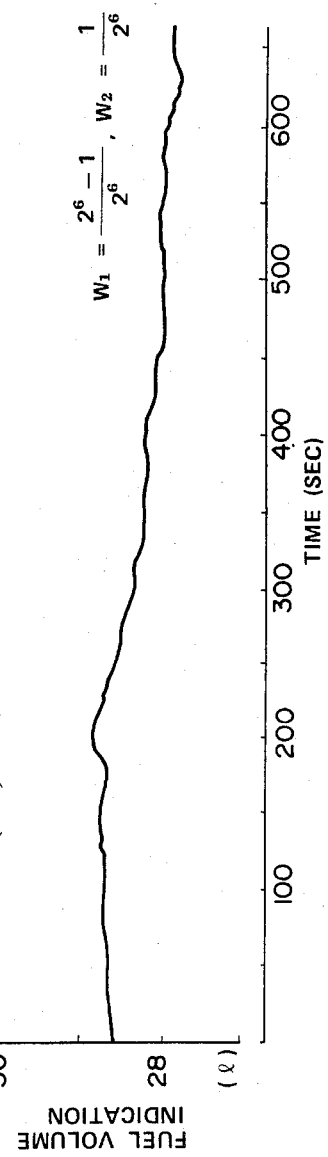

FIG.15(A)
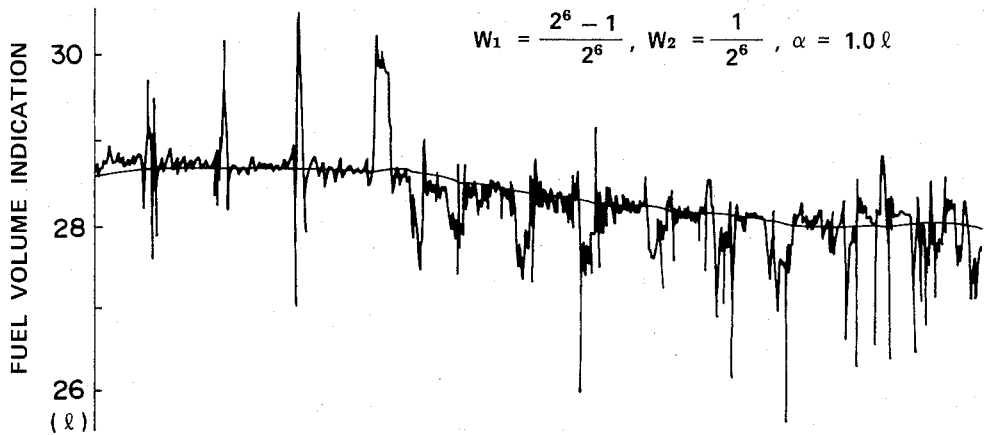
$W_1 = \dfrac{2^6 - 1}{2^6}$, $W_2 = \dfrac{1}{2^6}$, $\alpha = 1.0\,\ell$
FIG.15(B) VOLUME INDICATIONS ON SIMPLY AVERAGED DATA $A_m$ AND ON WEIGHT-AVERAGED DATA $B_m$ AFTER ELIMINATING ABNORMAL AVERAGED DATA $A_m$
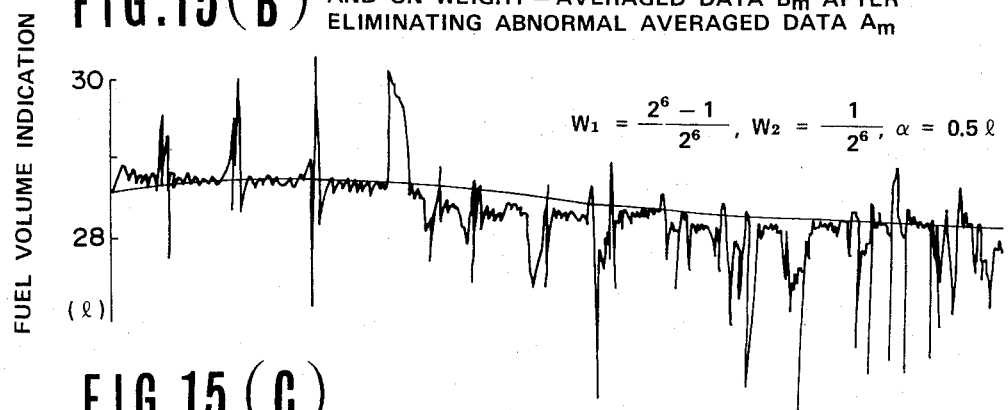
$W_1 = \dfrac{2^6 - 1}{2^6}$, $W_2 = \dfrac{1}{2^6}$, $\alpha = 0.5\,\ell$
FIG.15(C)
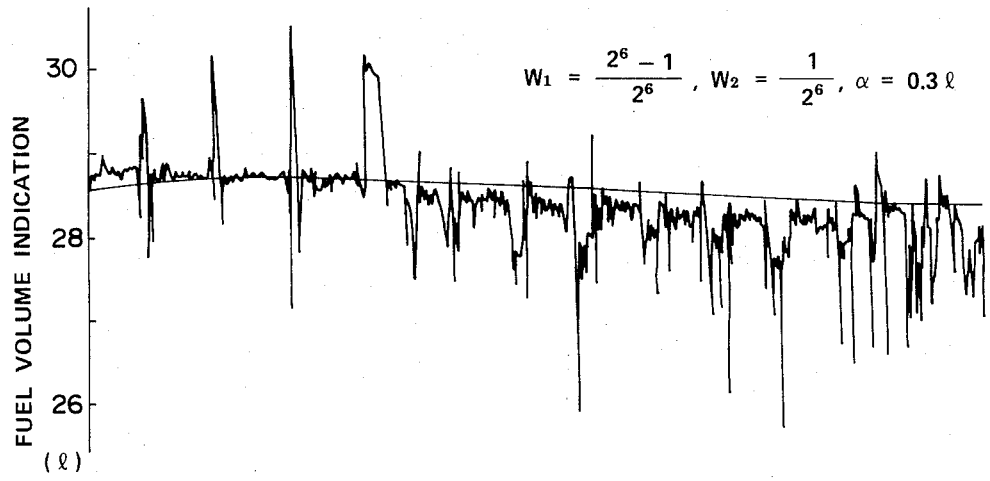
$W_1 = \dfrac{2^6 - 1}{2^6}$, $W_2 = \dfrac{1}{2^6}$, $\alpha = 0.3\,\ell$

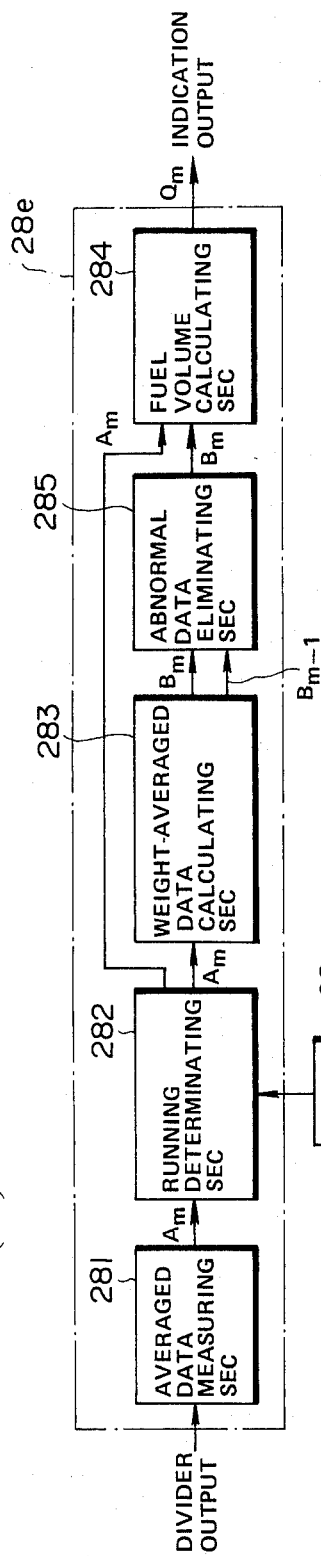
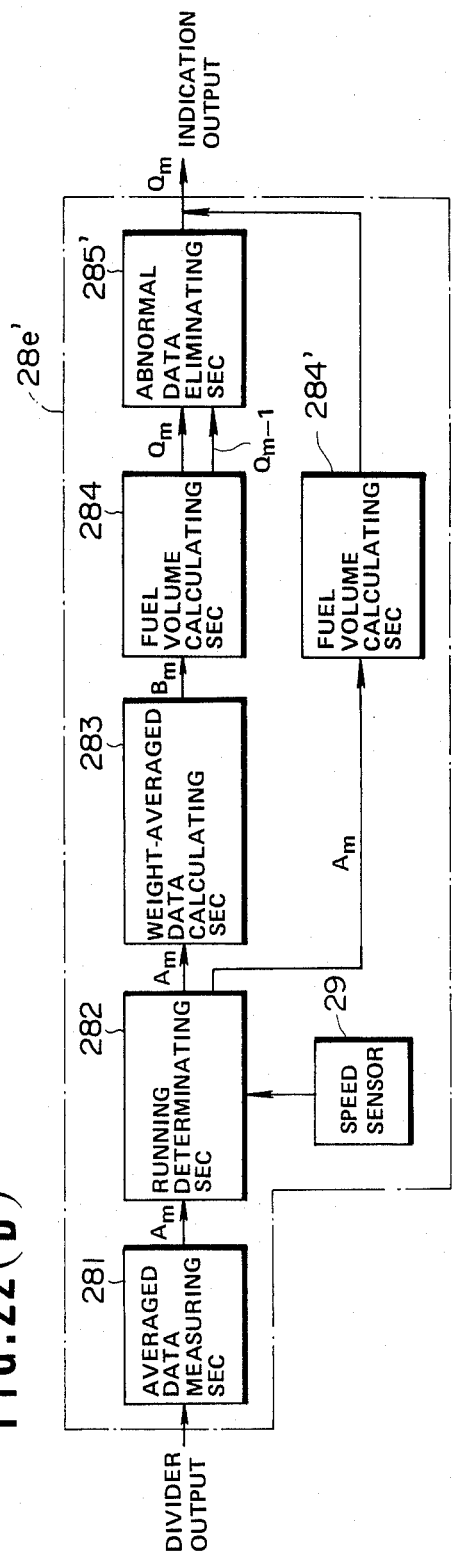
FIG.22(A)
FIG.22(B)

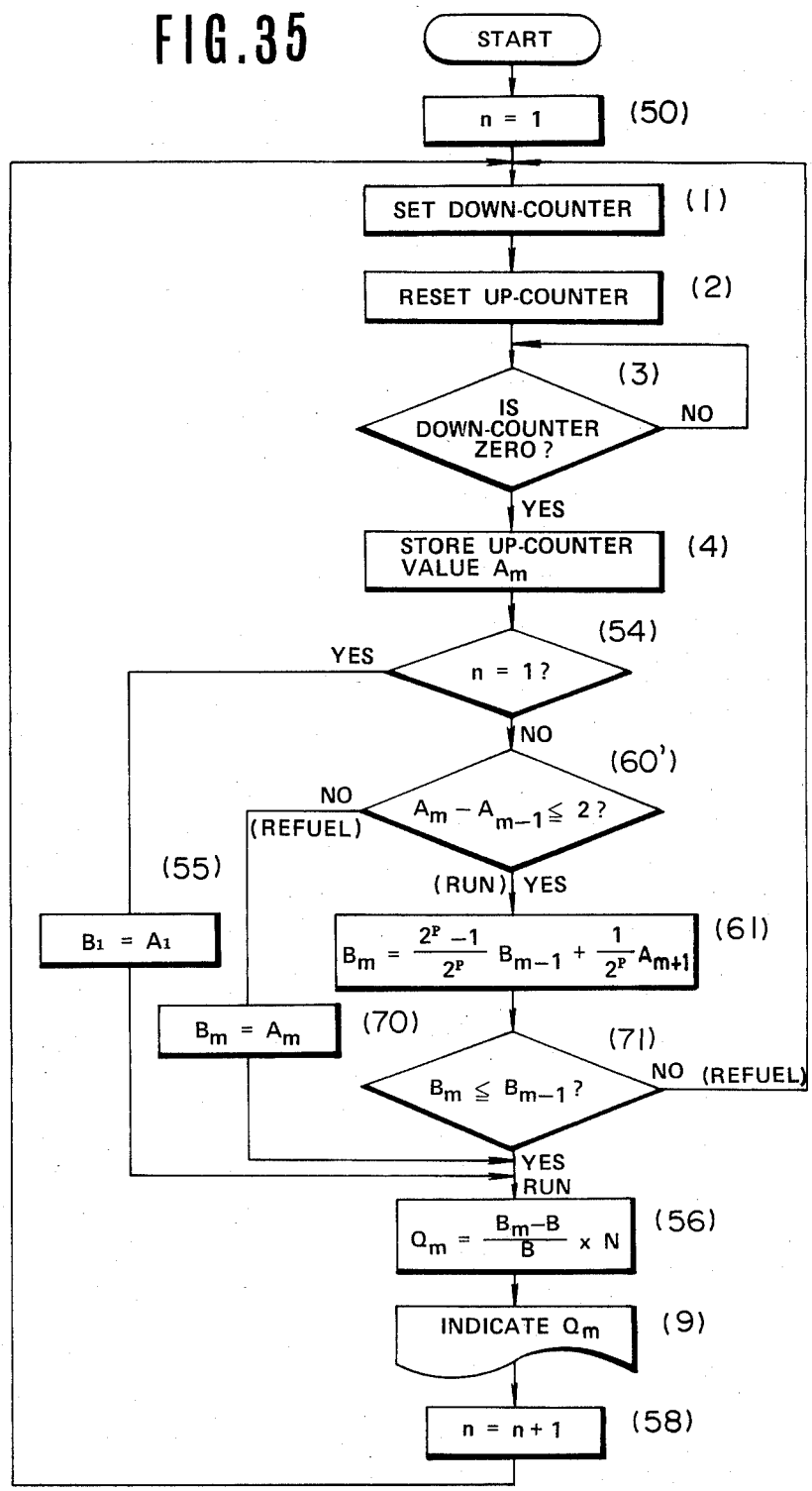

FUEL VOLUME MEASURING SYSTEM FOR AUTOMOTIVE VEHICLE

BACKGROUND OF THE INVENTION

1. Field of the Invention

The present invention relates generally to a fuel volume measuring system for an automotive vehicle and more specifically to a fuel volume measuring system for digitally indicating the amount of fuel in a fuel tank installed on an automotive vehicle, even when the vehicle is running or is being refueled; in other words, when the fuel level within the fuel tank surges or undulates or is stationary.

2. Description of the Prior Art

Conventionally, an analog fuel volume measuring apparatus is widely used for an automotive vehicle. The analog fuel volume measuring apparatus usually includes a float moved up and down according to the fuel level within a fuel tank, a resistor-type potentiometer actuated in relation to the upward-and-downward movement of the float, a DC amplifier for amplifying the output voltage signal of the potentiometer, and a meter having a pointer pivoted clockwise to indicate a fuel volume by means of an electromagnetic transducer in accordance with the magnitude of the signal outputted from the DC amplifier.

On the other hand, recently, a digital fuel volume measuring system has come into use for an automotive vehicle. The digital fuel volume measuring system can indicate the amount of fuel within a fuel tank digitally and precisely in the unit of 1.0 or 0.1 liter, for instance. In such a digital system as described above, on the basis of the accurate digital data indicative of the fuel volume within a fuel tank, it is also possible to obtain other useful information necessary for the driver or the user.

In such a digital fuel volume measuring system for an automotive vehicle, however, when the vehicle is running and thereby the fuel level within the fuel tank surges, there exist the following disadvantages: In the case where an automotive vehicle turns, starts, stops, is accelerated or decelerated, goes up a slope, reaches the head of a slope, starts going down a slope, and reaches the foot of a slope, a great acceleration is inevitably applied to a fuel tank for the vehicle and therefore the fuel within the fuel tank surges, thus causing the fluctuations of the fuel level and therefore the fluctuations of digital indication of fuel volume.

In the case of the analog fuel measuring apparatus of pointer type, even if the fuel level fluctuates within the fuel tank, these fluctuations do not give rise to a serious problem. This is because the response speed of the pointer itself is not high because of the structure thereof. Therefore, even if the signal indicative of fuel volume varies, the pointer does not oscillate, and further even if the pointer oscillates violently, no special sense of disorder with respect to the indication is given to the driver.

In contrast with this, in the case of a digital fuel volume measuring system, when the signal indicative of fuel volume fluctuates, the indicated numerical value changes or flickers and a sense of disorder with respect to the indication is given to the driver, thus eventually resulting in a danger such that the user has some doubts about the reliability of the fuel indication.

For the reason as described above, there has been proposed a fuel volume measuring system for an automotive vehicle which can suppress the fluctuations of measured fuel volume in dependence upon the method of simply averaging the data signals indicative of fuel volume. In such a prior-art fuel volume measuring system for an automotive vehicle, however, since the fuel volume is calculated on the basis of the simple averaging method, the time interval during which the data signals indicative of fuel volume are averaged is inevitably increased in order to sufficiently suppress the fluctuations of fuel volume, with the result that the time interval from when the current fuel volume is indicated to when the succeeding fuel volume is indicated is prolonged; that is, the response characteristic in measuring the fuel volume is unsatisfactory. Further, when the time interval during which the fuel volume data signals are averaged is decreased in order to improve the response characteristic, it is impossible to sufficiently suppress the fluctuations of fuel volume indication. To explain the prior-art fuel volume measuring system on the basis of experimental numerical values, in the case where the time interval during which fuel volume data signals are averaged is predetermined to be from 1 to 2 minutes, the fuel volume indication fluctuates 1 to 2 liters.

On the other hand, in such a fuel volume measuring system as described above, since the averaging time interval or the response characteristic is appropriately determined only in the state where the vehicle is running, there exists another problem in that, when the vehicle is being refueled, that is, when the fuel volume increases abruptly in a short time period, the fuel volume is not indicated immediately at a high response speed to the driver but indicated one or two minutes later.

Additionally, in such a fuel volume measuring system as described above, since the averaging time interval or the response characteristic is inevitably long, there exists another problem in that, when the vehicle is started with the ignition key inserted into the key hole, the fuel volume is not immediated indicated to the driver but indicated one or two minutes later.

Therefore, it is necessary to detect whether the vehicle is running or kept stopped, in order to change the averaging time interval according to the vehicle running condition. In more detail, when the vehicle is running, the averaging time interval is determined to be long to sufficiently suppress the fluctuations of fuel volume indication and therefore the response time of fuel volume indication is long; when the vehicle is being refueled or is stationary the averaging time interval is determined to be short to improve the response time of fuel volume indication and therefore the fluctuations of fuel volume indication are not suppressed when the fuel surges.

In the prior-art fuel volume measuring system, however, the vehicle running condition is usually detected in dependence upon the positions of the ignition key. Therefore, when the ignition switch is once set to the OFF position during refueling and then set to the ON position again in order to confirm the fuel volume when or after the vehicle is refueled, since the averaging time interval is already set to a long time interval during which fuel volume data signals are averaged, in spite of the fact that the vehicle is being refueled or has been refueled completely, the fuel volume is not immediately indicated to the driver. On the other hand, in the case where a vehicle speed sensor is used for detecting the vehicle running condition, when the vehicle is running at a very slow speed on a busy road, for instance, since the sensor detects that vehicle speed is zero and therefore the sensor determines that the vehicle is being refueled, the averaging time interval is already set to a short time interval during which fuel volume data signals are averaged, in spite of the fact that the vehicle is running, the digital fuel volume indication fluctuates or flickers without accurately indicating the fuel volume.

In brief summary, in the prior-art fuel volume measuring system for an automotive vehicle, since the data signals indicative of fuel volume are simply averaged in order to suppress the fluctuations of the fuel volume, and therefore the averaging time interval is relatively long, it has been impossible to improve the response characteristic of fuel volume indication. Additionally, since the vehicle running condition is simply detected in dependence upon the ignition key position or by means of a vehicle sensor, it has been impossible to securely detect that the vehicle is running or being refueled.

The system configuration of the prior art fuel volume measuring system for an automotive vehicle will be described in more detail hereinafter with reference to the attached drawing under DETAILED DESCRIPTION OF THE PREFERRED EMBODIMENTS.

SUMMARY OF THE INVENTION

With these problems in mind, therefore, it is the primary object of the present invention to provide an improved fuel volume measuring system for an automotive vehicle which can sufficiently suppress the fluctuations of fuel volume indication when the vehicle is running at a relatively-high response speed and can indicate the fuel volume immediately when the vehicle is being refueled, without detecting the on-or-off position of an ignition key.

To achieve the above mentioned object, the fuel volume measuring system for an automotive vehicle according to the present invention comprises (a) fuel volume sensing means for outputting a fuel volume detection signal $D_m$ corresponding to fuel volume at regular time intervals, (b) first averaging means for simply averaging the fuel volume detection signal $D_m$ and outputting a simply averaged fuel volume data signal $A_m$, (c) second averaging means for further weight-averaging the simply averaged data signal $A_m$ and outputting a weight averaged fuel volume data signal $B_m$, (d) fuel volume calculating means for calculating fuel volume on the basis of the weight averaged fuel volume data signal $B_m$ and outputting a fuel volume signal $Q_m$ and (e) indicator means for indicating the calculated fuel volume. In addition to the above-mentioned means, in the case where a vehicle speed sensor is used, the system according to the present invention further comprises running determination means for supplying the simply averaged fuel volume data signal $A_m$ to the second averaging means for suppression of fluctuations of fuel volume indication when the vehicle speed sensor detects that vehicle speed is not zero but directly to the fuel volume calculating means, without calculating the weight averaged fuel volume data signal $B_m$ for improvement in response speed of fuel volume indication, when the vehicle speed sensor detects that vehicle speed is zero. Further, in the modified embodiments of the fuel volume measuring system according to the present invention, there are additionally provided various means such as abnormal-data eliminating means, abnormal-data correcting means, allowable range controlling means, etc.

On the other hand, in the case where a vehicle speed sensor is not provided, the system according to the present invention further comprises refueling determinating means for comparing the difference between at-least one of the preceding data signal $S_{m-1}$ indicative of fuel volume and at-least one of the current data signal $S_m$ indicative of fuel volume with a predetermined value and counting means for counting the number of times that the difference $(S_m - S_{m-1})$ exceeds at-least one predetermined value, in order to confirm that fuel volume is positively increasing.

BRIEF DESCRIPTION OF THE DRAWINGS

The features and advantages of the fuel volume measuring system for an automotive vehicle according to the present invention over the prior-art fuel volume measuring system will be more clearly appreciated from the following description of the preferred embodiments of the invention taken in conjunction with the accompanying drawings in which like reference numerals designate the same or similar elements or sections throughout the figures thereof and in which;

FIG. 10 is a flowchart showing a system control program used for the microcomputer of the first basic embodiment of the fuel volume measuring system for an automotive vehicle according to the present invention;

FIG. 11(C)-1 is a graphical representation showing the fuel volume indication obtained on the basis of the second (weighted) averaged fuel volume data signal $B_m$ calculated when the power of weight value is four;

FIG. 11(C)-2 is a graphical representation showing the fuel volume indication obtained on the basis of the second (weighted) averaged fuel volume data signal $B_m$ calculated when the power of weight value is five;

FIG. 11(C)-3 is a graphical representation showing the fuel volume indication obtained on the basis of the second (weighted) averaged fuel volume data signal $B_m$ calculated when the power of weight value is six;

FIG. 15(A) is a graphical representation showing the fuel volume indications obtained on the basis of the first (simply) averaged fuel volume data signal $A_m$ and on the basis of the second (weighted) averaged fuel volume data signal $B_m$ calculated when the power of the weight value is six, after eliminating abnormal simply-averaged fuel volume data signals $A_m$ exceeding an allowable range a of 0.1 liter;

FIG. 15(B) is a graphical representation showing the fuel volume indications obtained on the basis of the first (simply) averaged fuel volume data signal $A_m$ and on the basis of the second (weighted) averaged fuel volume data signal $B_m$ calculated when the power of the weight value is six, after eliminating abnormal simply-averaged fuel volume data signals $A_m$ exceeding an allowable range a of 0.5 liter;

FIG. 15(C) is a graphical representation showing the fuel volume indications obtained on the basis of the first (simply) averaged fuel volume data signal $A_m$ and on the basis of the second (weighted) averaged fuel volume data signal $B_m$ calculated when the power of the weight value is six, after eliminating abnormal simply-averaged fuel volume data signals $A_m$ exceeding an allowable range a of 0.3 liter;

FIG. 22(A) is a schematic block diagram showing in detail only a signal processing section of a sixth embodiment of the fuel volume measuring system shown in FIG. 7, in which abnormal weight-averaged fuel volume data signal $B_m$ can be eliminated before calculating the fuel volume signal $Q_m$;

FIG. 22(B) is a schematic block diagram showing in detail only a signal processing of an eighth embodiment of the fuel volume measuring system shown in FIG. 7, in which abnormal fuel volume signal $Q_m$ can be eliminated before indicating the fuel volume;

FIG. 35 is a flowchart showing a system control program used for the microcomputer of the fifteenth embodiment of the fuel volume measuring system for an automotive vehicle according to the present invention, in which the fact that the vehicle is being refueled is determined by comparing the difference between the current simply-averaged fuel volume data signal $A_m$ and the preceding simply-averaged fuel volume signal $A_{m-1}$ with a predetermined value and by comparing the current weight-averaged fuel volume data signal $B_{m-1}$ with the preceding weight-averaged fuel volume data signal $B_{m-1}$.

DETAILED DESCRIPTION OF THE PREFERRED EMBODIMENTS

To facilitate understanding of the present invention, a brief reference will be made to a prior-art fuel amount measuring system for an automotive vehicle, with reference to the attached drawing.

Figure 1:
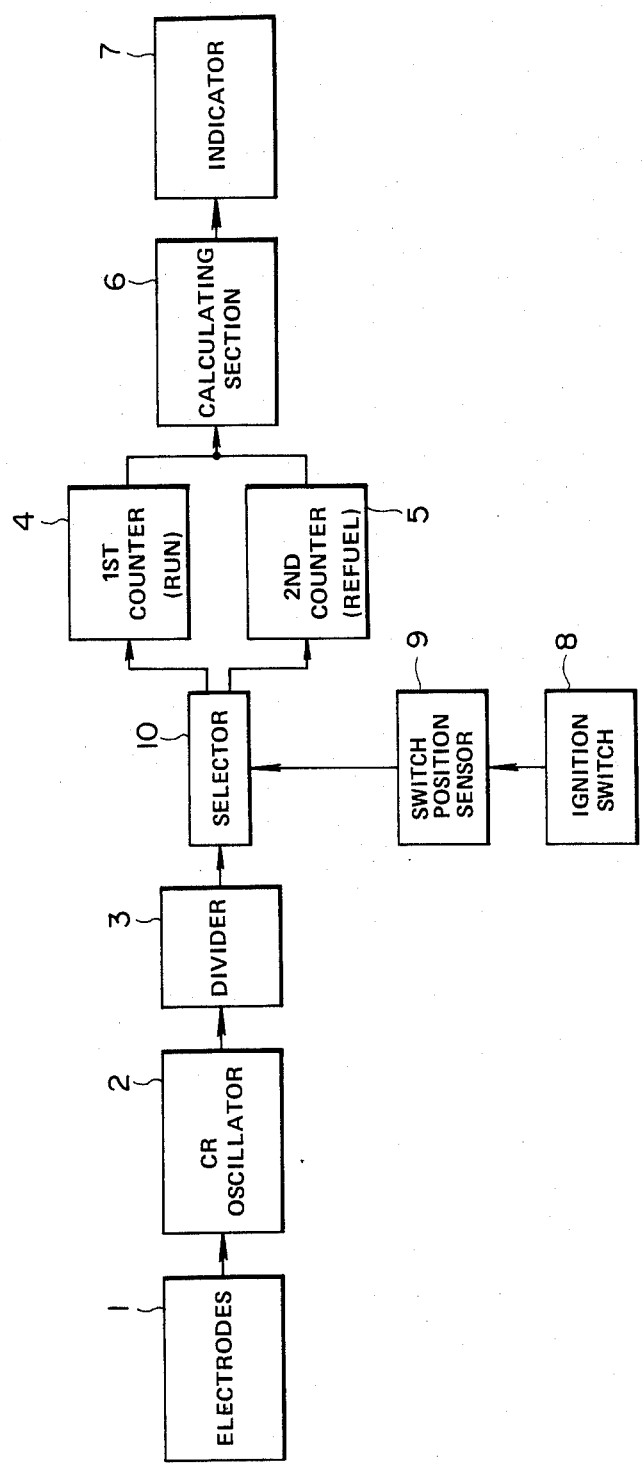
FIG. 1 is a schematic block diagram of a prior-art fuel volume measuring system for an automotive vehicle.

FIG. 1 is a schematic block diagram of the prior-art fuel volume measuring system for an automotive vehicle.

In FIG. 1, the reference numeral 1 denotes a pair of electrodes oppositely dipped into the fuel within a fuel tank, between which electrostatic capacity is formed in proportion to the fuel volume level within the fuel tank. The reference numeral 2 denotes a CR oscillator the frequency of which changes according to the electrostatic capacity formed between the electrodes. Therefore, when the fuel volume within the fuel tank changes, the period of the pulse signal generated from the CR oscillator changes. The reference numeral 3 denotes a divider for dividing the frequency of the pulse signal generated from the CR oscillator 2. Therefore, when the frequency of the pulse signal from the CR oscillator 2 changes, the frequency thereof is approximated or rounded up or down to a predetermined number of digits.

The reference numeral 4 denotes a first counter for counting the pulse signal divided by the divider 3 during a first predetermined time interval only when the vehicle is running, that is, when the fuel level within the fuel tank fluctuates. By counting the divided signal indicative of fuel volume during the first time interval when the vehicle is running, it is possible to obtain a signal indicative of an averaged fuel volume. Further, the first time interval during which the divided signal indicative of fuel volume is counted by the first counter 4 is called the vehicle-run fuel-volume averaging time period.

The reference numeral 5 denotes a second counter for counting the pulse signal divided by the divider 3 for a second predetermined time interval only when the vehicle is kept stopped, that is, when the fuel level within the fuel is stationary. By counting the divided signal indicative of fuel volume during the second time interval when the vehicle is kept stopped, it is possible to obtain another signal indicative of an averaged fuel volume. Further, the second time interval during which the divided signal indicative of fuel volume is counted by the second counter 5 is called the vehicle-refuel fuel-volume averaging time period. Further, the vehicle-run fuel-volume averaging time period is previously predetermined to be longer than the vehicle-refuel fuel-volume averaging time period.

The reference numeral 6 denotes a calculating section for calculating the fuel volume within the fuel tank in response to the signal from the counter 4 or 5. The reference numeral 7 denotes an indicator for displaying the calculated fuel volume digitally in response to the signal from the calculating section 6.

The reference numeral 8 denotes an ignition switch. The reference numeral 9 denotes an ignition switch position sensor for detecting that the ignition switch is set to the on position or off position. The reference numeral 10 denotes a selector for connecting the signal from the divider 3 to the first counter 4 in response to the on-position signal from the switch position sensor 9 and to second counter 5 in response to the off-position signal from the switch position sensor 8. Therefore, when the ignition switch 8 is set to the on-position, the signal divided by the divider 3 is averaged through the first counter 4 during a long vehicle-run fuel-volume averaging time period, so that the fluctuations of the fuel volume indication can be suppressed sufficiently. On the other hand, when the ignition switch 8 is set to the off-position, the signal divided by the divider 3 is averaged by the second counter 5 during a short vehicle-refuel fuel-volume averaging time period, so that the response time of the fuel volume indication can be improved sufficiently.

In the prior-art fuel volume measuring system for an automotive vehicle as described above, however, since the signal indicative of fuel volume is simply averaged during the predetermined fuel-volume averaging time interval, it is necessary to prolong the averaging time period in order to sufficiently suppress the fluctuations of fuel volume indication, with the result that the response time of fuel volume indication becomes unsatisfactory. On the other hand, it is necessary to shorten the fuel-volume averaging time period in order to improve the response time of fuel volume indication, with the result that the fluctuations of fuel volume indication are not sufficiently suppressed. For instance, in the case where the vehicle-run fuel-volume averaging time period is determined to be from 1 to 2 minutes, the fuel volume indication fluctuates from 1 to 2 liters in fuel volume.

Additionally, in the prior-art fuel volume measuring system for an automotive vehicle, since the vehicle running condition is detected on the basis of the positions of the ignition key, when the ignition switch is once set to the off position before the vehicle is refueled and then set to the on position again in order to confirm the fuel volume within a fuel tank while or after the vehicle is refueled, the fuel volume is not immediately indicated accurately, because the long vehicle-run fuel volume averaging time period is previously set, in spite of the fact that the vehicle is being refueled or is refueled completely.

In view of the above description, reference is now made to a first embodiment of the fuel volume measuring system for an automotive vehicle according to the present invention with reference to FIGS. 2 to 11.

Figure 7:
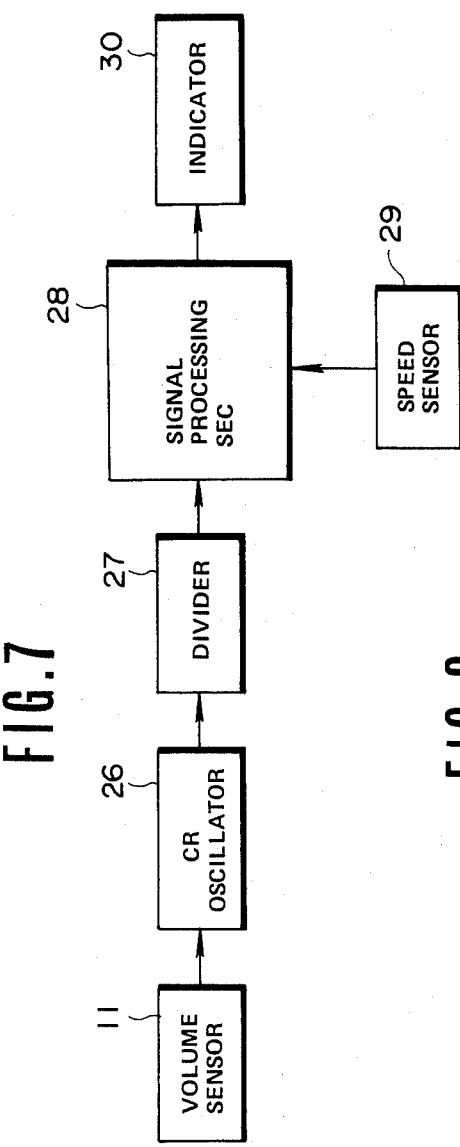
FIG. 7 is a schematic block diagram showing a basic system configuration of a first basic embodiment of the fuel volume measuring system for an automotive vehicle according to the present invention.
Figure 8:
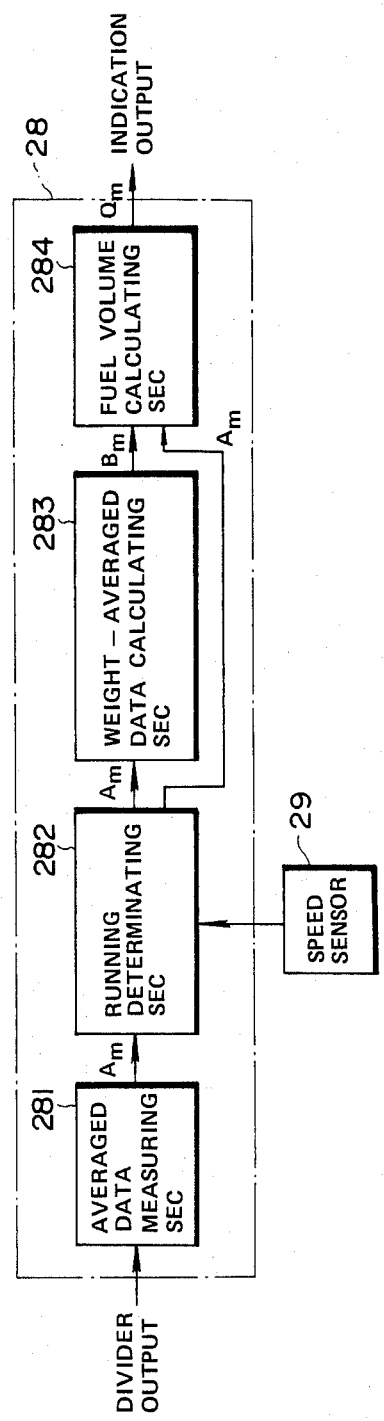
FIG. 8 is a schematic block diagram showing in detail only a signal processing section of the first basic embodiment of the fuel volume measuring system shown in FIG. 7, in which simply averaged fuel volume data signals $A_m$ are further weight-averaged into the data signals $B_m$ only when the vehicle is running.
Figure 9:
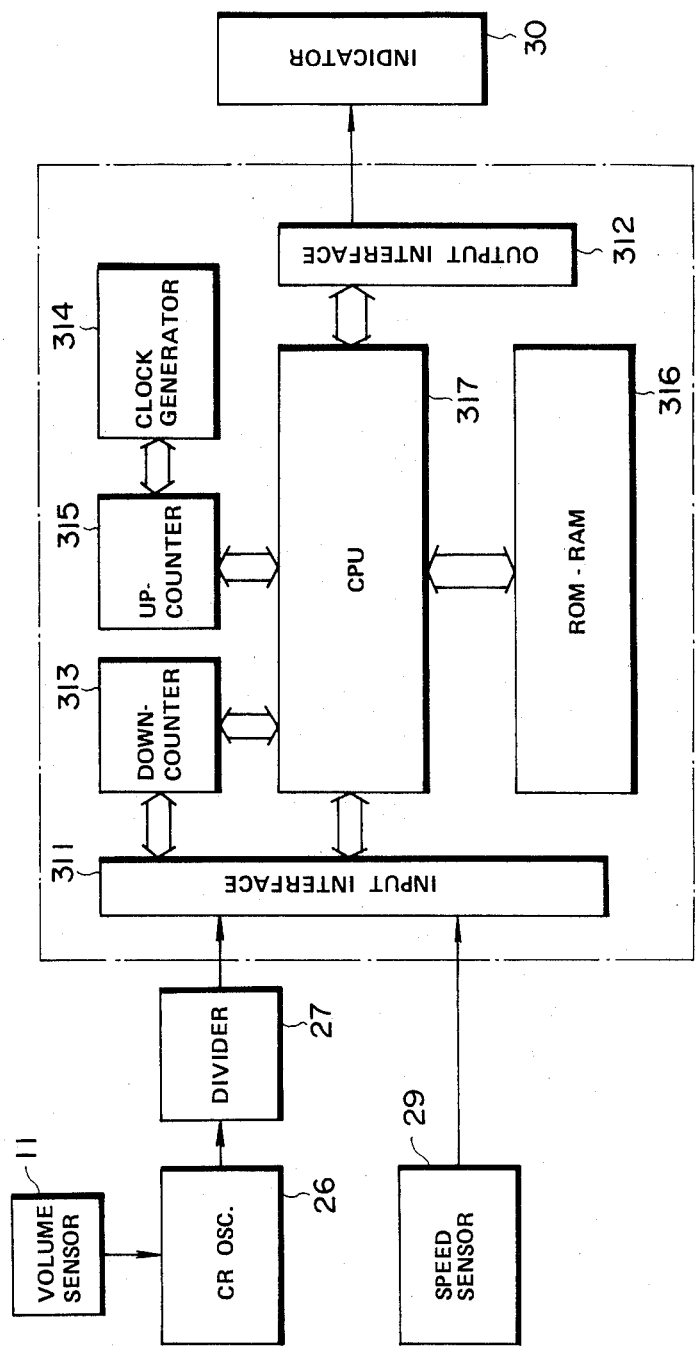
FIG. 9 is a schematic block diagram showing the hardware configuration of a microcomputer used for the embodiments of the fuel volume measuring system for an automotive vehicle according to the present invention, in which a vehicle speed sensor is externally connected to the microcomputer for determining whether the vehicle is running or being refueled.

FIGS. 2 to 6 show an example of a fuel volume sensor; FIG. 7 is a schematic block diagram showing a first basic embodiment of the fuel volume measuring system for an automotive vehicle according to the present invention; FIG. 8 is a functional schematic block diagram showing a signal processing section shown in FIG. 7; FIG. 9 is a schematic block diagram showing the first embodiment of the fuel volume measuring system according to the present invention, in which the signal processing section shown in FIG. 7 is made up of a microcomputer; FIG. 10 is a flowchart showing a system control program executed by the microcomputer shown in FIG. 9. FIGS. 11(A), 11(B), 11(C)-1, 11(C)-2, and 11(C)-3 are graphical representations of the experimental results indicative of the fuel volume indications obtained by various methods, for assistance in explaining the effect of the present invention.

The feature of this first embodiment is to calculate the fuel volume within a fuel tank on the basis of the weight-averaged values obtained by further processing the time-series simply-averaged fuel-volume data signals.

In the beginning, a fuel volume sensor used with the present invention will be described below.

A fuel volume sensor 11 shown in FIG. 7 is disposed being dipped into the fuel in a fuel tank. The structure of the fuel volume sensor 11 will be described with reference to FIGS. 2 to 6.

Figure 2:
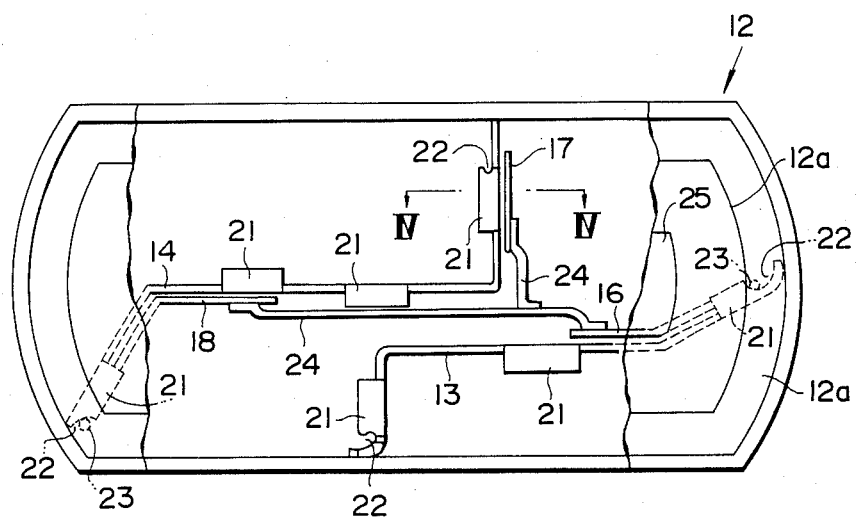
FIG. 2 is a top view, partially cutaway view, of a fuel tank used with the fuel volume measuring system for an automotive vehicle according to the present invention, in which a set of electrode plates of a fuel volume sensor is shown for assistance in explaining the method of fixing the electrode plates within a fuel tank.
Figure 3:
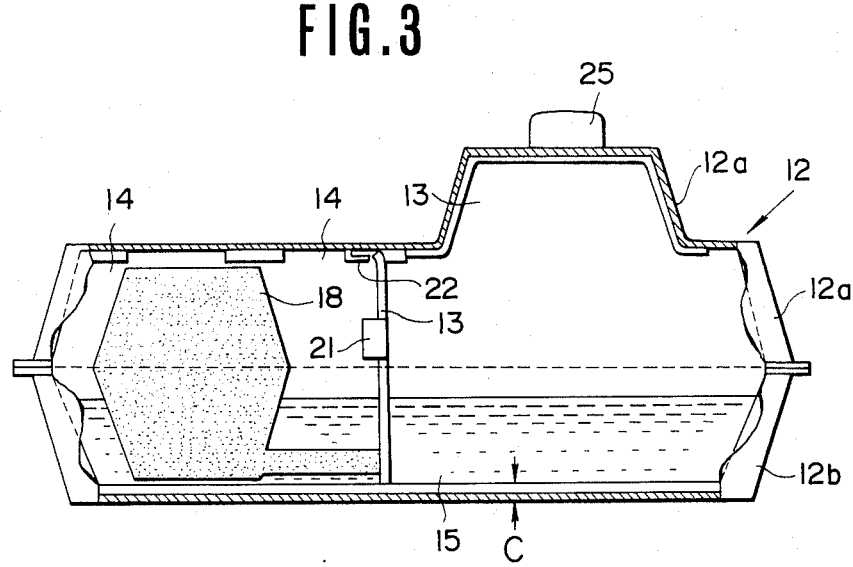
FIG. 3 is a longitudinal cross-sectional view of the fuel tank shown in FIG. 2, in which a set of the electrode plates is also depicted for assistance in explaining the structure of the electrode plates.

As depicted in FIG. 2 (a top view, partially cutaway view, of a fuel tank) and FIG. 3 (a longitudinal cross-sectional view of the fuel tank), the fuel volume sensor 11 is disposed within a fuel tank 12.

The outer shell of the fuel tank 12 is divided into two upper and lower elements: an upper shell 12a and a lower shell 12b. The inside portion thereof is divided by two buffle plates 13 and 14 directly spot-welded to the inner upper surface and the side surface of the upper shell 12 in order to prevent sound from being generated when fuel 15 surges violently.

Figure 4:
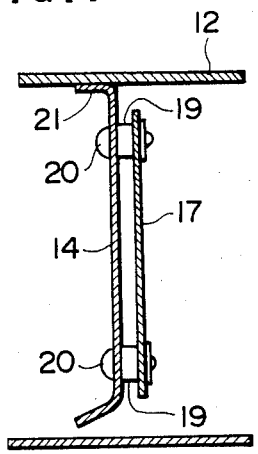
FIG. 4 is a cross-sectional view taken along the line IV—IV shown in FIG. 2.

On the surfaces of the buffle plates 13 and 14 there are separately disposed three electrode plates 16, 17, and 18 predetermined distances away from each other. As shown in FIG. 4, each of these electrode plates 16, 17 and 18 is fixed to the buffle plate 13 or 14, respectively, via two insulating spacers 19 by the aid of two revets 20 so as to be insulated from the buffle plate.

As depicted in FIG. 3, between the lower end portion of the buffle plate 13 or 14 and the bottom plate of the fuel tank 12, that is, the lower shell 12b, there is provided a predetermined clearance C, in order to prevent the lower shell 12b from being brought into contact with the buffle plate when the lower shell deforms elastically.

On the upper end of the buffle plates 13 and 14, there are disposed several flanges 21 to which the upper shell 12a is joined respectively. Further, there is formed a cutout 22 in each of the at-least two flanges 21 of each buffle plate 13 or 14, in order to securely position the buffle plate when assembled to the tank 12.

On the other hand, there are implanted four projections 23 on the upper shell 12a, which serve as a marker for positioning the buffle plates 13 and 14 when assembled, at each position corresponding to the cutout 22 of the flange 21 of the buffle plate 13 or 14.

Figure 5:
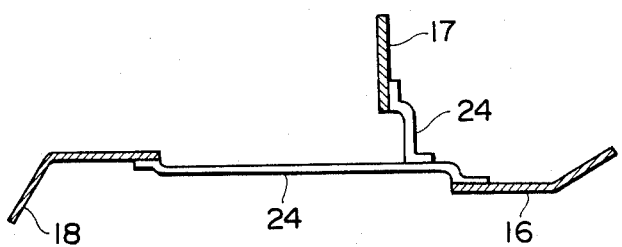
FIG. 5 is a top view of a fuel volume sensor made up of a set of electrode plates disposed within the fuel tank shown in FIGS. 2 and 3.
Figure 6:
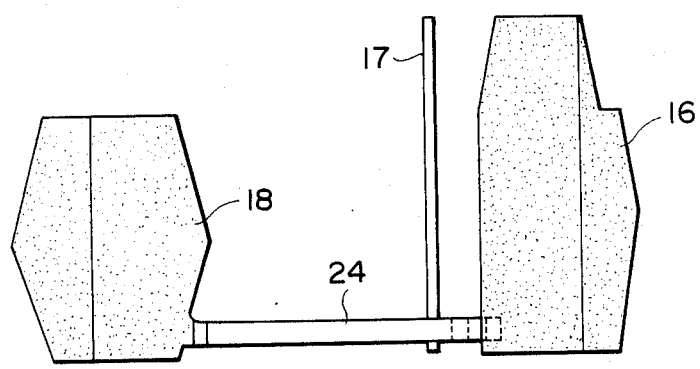
FIG. 6 is an elevational view of the fuel volume sensor made up of a set of electrode plates disposed within the fuel tank shown in FIGS. 2 and 3.

As shown in FIGS. 5 and 6, the three electrode plates 16, 17 and 18 are connected to each other at the lower end portions thereof via two conductive harness plates 24 and further to electrode-plate connecting terminals provided for a circuit board disposed within a box 25 fixed at the upper, external side of the upper shell 12a via a harness (not shown).

With reference to FIG. 7, the fuel volume measuring system according to the present invention will be described. In FIG. 7, a CR oscillator 26 is connected to the fuel volume sensor 11 made up of the above-mentioned buffle plates 13 and 14 and electrode plates 16, 17 and 18. The oscillation frequency of the CR oscillator 26 can be changed according to the electrostatic capacity formed between the three electrodes. In more detail, it is possible to configure this CR oscillator by a timer IC (NE 555), for instance.

A divider 27 shown in FIG. 7 divides a pulse signal representative of fuel volume outputted from the CR oscillator 26. By this dividing action the oscillation pulse signal is approximated or rounded up or down to a predetermined frequency.

A signal processing section 28 calculates a fuel volume in response to the signal from the divider 27 at regular time intervals. The signal processing section 28 will be described with reference to the functional block diagram shown in FIG. 8. First, an averaged data measuring section (first averaging means) 281 repeatedly counts a predetermined number of pulse (Z pulses) among the pulse signals outputted from the divider 27 during a predetermined averaging time interval and outputs an averaged fuel volume data signal $A_m$.

A running determinating section 282 selectively supplies the averaged fuel volume data signal $A_m$ measured by the averaged data measuring section 281 to either of a weight averaged data calculating section 283 or a fuel volume calculating section 284. This switching action can be achieved in response to the output signal from a vehicle speed sensor 29. In more detail, in the case where fuel is resupplied to a vehicle at a gasoline service station; that is, vehicle speed is zero, the measured and averaged fuel volume data signal $A_m$ is directly supplied to a fuel volume calculating section 284 by-passing the weight-averaged data calculating section 283. In contrast with this, in the case where the vehicle is running; that is, vehicle speed is not zero, the averaged fuel volume data signal $A_m$ is supplied to the weight-averaged data calculating section 283, directly.

The weight-averaged data calculating section 283 sequentially processes the time-series fuel volume data signal $A_m$ outputted from the averaged data measuring section 281 to obtain weighted average values and outputs the weight-averaged fuel volume data signal $B_m$ to the fuel volume calculating section 284.

The fuel volume calculating section 284 performs a predetermined calculation to obtain the fuel volume on the basis of the averaged fuel volume data signal $A_m$ or $B_m$ supplied from the running determinating section 282 or the weight-averaged data calculating section 283, outputs a fuel volume indication output signal $Q_m$ corresponding to the current fuel volume. On the basis of this outputted indication output signal $Q_m$, the current fuel volume value is indicated digitally on the digital indicator 30 in the unit of liter, for instance.

Here, the weighted average will be described simply hereinbelow, although the detail thereof is well known in various references.

Now, assumption is made that a plurality of time-series data $A_m$, $A_{m+1}$, $A_{m+2}$, $A_{m+3}$, ... are obtained to determine these weighted average values. The first data $A_m$ is multiplied by $(P-1)/P$ predetermined as the first weight value $W_1$; the second data $A_{m+1}$ is multiplied by $1/P$ predetermined as the second weight value $W_2$, so that two multiplication results $A_m \cdot (P-1)/P$ and $A_{m+1} \cdot 1/P$ are obtained. On the basis of these two multiplications, the first weighted average value $B_m$ can be obtained in accordance with the following expression:

$$B_m = A_m[(P-1)/P] + A_{m+1} \cdot (1/P)$$

Next, the second weighted average value $B_{m+1}$ can be obtained as follows: First, the first weighted average value $B_m$ is multiplied by $(P-1)/P$ predetermined as the first weight value $W_1$ and the third data $A_{m+2}$ is multiplied by $1/P$ predetermined as the second weight value $W_2$, so that two multiplication result. $B_m \cdot (P-1)/P$ and $A_{m+2} \cdot 1/P$ are obtained. On the basis of these two multiplications, the second weighted average value $B_{m+1}$ can be obtained in accordance with the following expressions:

$$B_{m+1} = B_m[(P-1)/P] + A_{m+2} \cdot (1/P)$$

As described above, the preceding weighted value is multiplied by $(P-1)/P$ predetermined as the first weight value $W_1$; the current data is multiplied by $1/P$ predetermined as the second weight value $W_2$; the third and after weighted average values can be obtained by adding these multiplicated results one by one.

In the first embodiment shown in FIGS. 7 and 8, the function of the signal processing section 28 can be attained by executing such a system control program as shown in FIG. 10 with a microcomputer made up of such hardware as shown in FIG. 9.

That is to say, in FIG. 9, a microcomputer 31 comprises an input interface 311 for receiving the output signals from the divider 27 and the vehicle speed sensor 29, an output interface 312 for outputting the calculated indication output signal $Q_m$ to the indicator 30, a presetable down-counter 313 which is controlled so as to be counted down whenever a pulse is applied from the divider 27 thereto through the input interface 311, a clock generator for generating a clock pulse used as a reference time signal, a presetable up-counter 315 which can count-up the clock pulse outputted from the clock generator 314, a memory section 316 made up of a ROM for storing the system control program and a RAM used for working areas, and a CPU 317 which can directly control the above-mentioned input interface 311, output interface 312, down counter 313, clock generator 314, up counter 315, and memory section 316, etc.

Next, the operation of this first embodiment will be described systematically with reference to the flow-chart shown in FIG. 10.

First, when program starts, the step (1) is executed and a numerical value Z corresponding to the number of pulses necessary for measuring a predetermined fuel-volume averaging time interval is preset to the down counter 313. Here, the numerical value Z is determined under the considerations of the frequency variation range of the signal outputted from the divider 27 from when the fuel tank is empty to when the fuel tank is filled with fuel. In this embodiment, the output signal from the divider 27 is so designed as to change within a range of about from 1.0 Hz to 0.5 Hz from the state where the fuel tank is empty to the state where the fuel tank is filled. Therefore, if $Z=10$, for instance, that is, if an averaged data of ten pulses is required to calculate, it takes about ten to five seconds.

When the step (2) is executed, an initial value of zero is set to the up counter 315, that is, the counter 315 is reset. Thereafter, the up counter 315 counts up the clock pulses outputted from the clock generator 314. The value counted by this up counter becomes a required averaged fuel volume data signal of Z pulses as described later.

When the step (3) is executed, the CPU 317 repeatedly checks the counted value of the down counter 313 and waits until the numerical value reaches zero. The instant the divider output signals of Z pulses have been counted and therefore the numerical value of the down counter 313 reaches zero, the result executed in the step (3) becomes YES, the step (4) being executed consequently.

When the step (4) is executed, the numerical value $A_m$ of the up counter 315 is sampled into the CPU 317 at that time and stored into an averaged data register $T_a$ provided in the working area. Here, since the up counter 315 is reset to zero at the time when a numerical value of Z is set to the down counter 313, the counted value of the up counter 315 obtained when the counted value of the down counter 313 reaches zero indicates the sum total of the time periods of divided pulses of Z, that is, this numerical value corresponds to an averaged period of Z-piece pulses outputted from the divider 27.

When the step (5) is executed, it is determined whether the vehicle is running or not on the basis of the content of a predetermined vehicle running flag F. That is to say, although not shown in the flowchart in FIG. 10, in the microcomputer 31 used in this embodiment, the presence or absence of the vehicle speed pulse signal from the vehicle speed sensor 29 is determined by a predetermined interrupt process, and on the basis of this determined result the running flag F is set or reset.

In more detail, in the first step of this interrupt process, a predetermined period counter CTR is first reset in response to the presence or absence of the vehicle speed pulse signal; next the counter CTR is incremented by +1 in response to the vehicle speed pulse signal in the second step; it is determined whether the numerical value of the counter CTR exceeds a predetermined maximum value or not in the third step; the running flag F is set or reset in accordance with the above-mentioned determined result in the fourth step.

Here, assumption is made that the running flag is set to "1" when the period of the vehicle speed signal exceeds a predetermined maximum value, that is, when the vehicle speed drops below a minimum speed. In the step (5) shown in FIG. 10, it is determined whether this running flag F is "1" or not.

In the case where the vehicle is running, since a predetermined pulse signal is kept outputted from the vehicle speed sensor 29 and therefore the running flag F is set to "0", the result executed in step (5) is NO; consequently, the step (7) is executed.

In the step (7), on the basis of the content $A_m$ of the averaged data register $T_a$ and the content $B_m$ of the weighted average data register $T_{wa}$, an updated weighted average fuel volume data $B_m$ is obtained in accordance with the following expression:

$$B_m = [(2^p-1)/2^p] \cdot B_{m-1} + (\tfrac{1}{2}^p) \cdot A_{m+1}$$

To explain the operation of the microcomputer for executing the above-mentioned expression in more detail, first, the current content $B_m$ stored in the weighted average data register $T_{wa}$ is multiplied by a first weighted value $(2^p-1)/2^p$ and is stored temporarily into a calculating register. Next, the current content $A_{m+2}$ stored in the average data register $T_a$ is multiplied by a second weighted value $\tfrac{1}{2}^p$ and is stored temporarily into a calculating register simultaneously. Next, by adding the two contents stored in each calculating register, $$B_{m+1} = [(2^p-1)/2^p] \cdot B_m + (\tfrac{1}{2}^p) \cdot A_{m+2}$$

can be obtained and stored in the weighted average data register $T_{wa}$ as the succeeding weighted average value $B_{m+1}$.

Here, the reason why the function of the p-th power of 2 is used as the first weighted value $(2^p-1)/2^p$ for the weight averaged data register $T_{wa}$ and as the second weighted value $\tfrac{1}{2}^p$ for the averaged data register $T_a$ is that the calculations of the p-th power of 2 in binary arithmetic operation can be executed within a microcomputer by simply shifting the digit of a register. Further, the value of p is an integer, and the greater the p, the more will be suppressed the fluctuations of weight-averaged data $B_m$ due to the fluctuations of average data $A_m$.

When the step (8) is executed, on the basis of the content $B_m$ in the weight-averaged data register $T_{wa}$, the fuel volume value within a tank can be obtained in accordance with the following expression and stored in the fuel volume register Q:

$$Q_m = [(B_m - B)/B] \times N$$

where B is determined so as to correspond to an average data $A_m$ in the state where the fuel tank is empty, and the value of N corresponds to the volume of the tank.

When the step (9) is executed, the content $Q_m$ in the fuel volume register Q is supplied to the digital indicator 30 via the output interface 312, so that the value of the fuel volume is digitally indicated on the indicator 30 in the unit of one liter, for instance.

In contrast with this, in the case where the vehicle is kept stopped at a gasoline service station for refuelling, the result executed in the step (5) is YES; consequently, the step (6) is executed, so that the content $A_m$ of the average data register $T_a$ are directly transferred to the weight-averaged data register $T_{wa}$.

Therefore, the weight-averaged data $B_m$ is not calculated, and the fuel volume $Q_m$ calculated on the basis of averaged data $A_m$ are sequentially displayed on the indicator 30. By this, the response speed is highly improved in indicating the fuel volume during refuelling.

As described above, in the first embodiment, since the fuel volume detected by the fuel volume sensor 11 and converted into the corresponding frequency data via the CR oscillator 26 is approximated through the rounding processing via the divider 27, and converted into the corresponding averaged fuel volume data $A_m$ through the average data processing made up of the steps (1) to (4), and since the averaged fuel volume data $A_m$ is processed into the weight-averaged fuel volume data $B_m$ in the step (7), in the case where the averaged fuel volume data $A_m$ fluctuates due to the change in fuel level within a fuel tank, it is possible to suppress the fluctuations of the fuel volume indication and prevent the fuel volume indication from flickering even where the fuel volume is indicated accurately in the unit of one liter for instance.

Further, in the case where the vehicle is being refuelled, since the fuel volume value is directly calculated on the basis of the averaged fuel volume data $A_m$, the fuel volume indication changes in response to an abrupt increase in fuel within the fuel tank, without exerting a harmful influence upon the response speed of the indicator.

Furthermore, in this first embodiment, since the time interval during which the indication is updated on the digital indicator 30 is mainly determined in dependence upon the number of pulses Z on which the averaged fuel volume data $A_m$ are obtained, even if the value of Z is determined to be relatively small, the fluctuations of the averaged fuel volume data $A_m$ does not substantially exert a harmful influence upon the weight-averaged fuel volume data $B_m$ obtained lastly, because the averaged fuel volume data $A_m$ are further processed into the weight-averaged fuel volume data $B_m$.

Thereupon, the experimental results obtained by the first embodiment according to the present invention will be explained in comparison with the results obtained in various methods with reference to FIGS. 11(A), 11(B), 11(C)-1, 11(C)-2, and 11(C)-3.

Figure 11A:
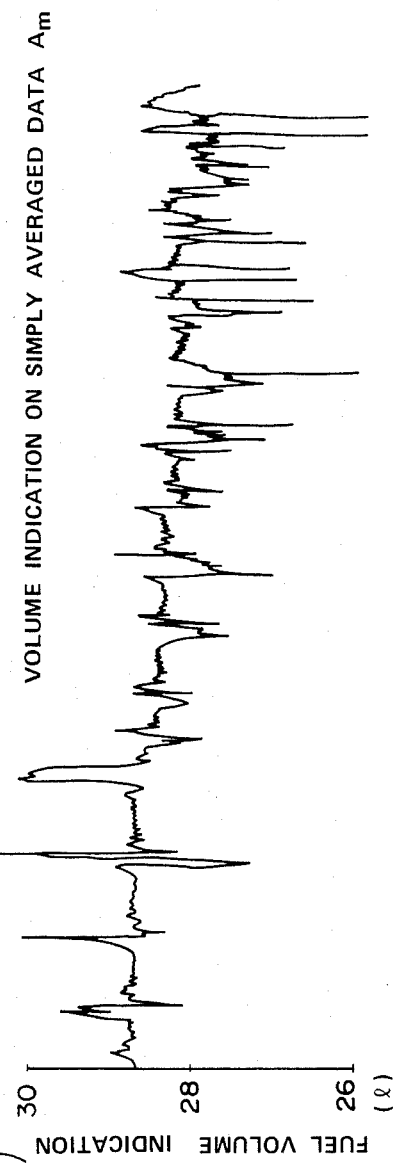
FIG. 11(A) is a graphical representation showing the fuel volume indication obtained on the basis of the first (simply) averaged fuel volume data signal $A_m$ without any other additional processes.

FIG. 11(A) shows the fuel volume indication values calculated on the basis of the averaged fuel volume data signal $A_m$ sequentially sampled in the average data register $T_a$, without any further weight-averaging processing.

Figure 11B:
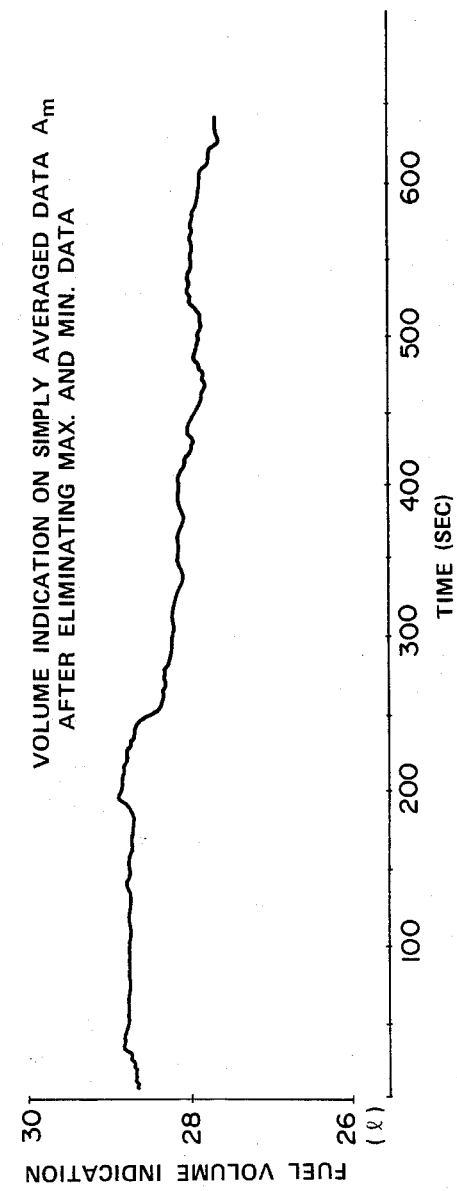
FIG. 11(B) is a graphical representation showing the fuel volume indication obtained on the basis of the first (simply) averaged fuel volume data signal $A_m$ from which some maximum and minimum fuel volume data signals $A_m$ are eliminated.

FIG. 11(B) shows the fuel volume indication values calculated by the following steps: the fuel volume detection data sequentially generated from the volume sensor are once stored in a register; these stored data are arranged in the order of the magnitude, respectively; a predetermined number of data are emitted beginning from its maximum and minimum values in order; the averaged fuel volume data $A_m$ are calculated on the basis of the remaining middle data through the simple-averaging processing.

FIGS. 11(C)-1, 11(C)-2, and 11(C)-3 show the fuel volume indication values calculated on the basis of the averaged fuel volume data $B_m$ obtained through the weight-averaging processing, in which various values are selected as the first and the second weighted values $W_1$ and $W_2$.

As is well understood through these drawings, although it is possible to fairly improve the fluctuations of the averaged fuel volume data $A_m$ by omitting a number of its maximum and minimum values and by simply averaging the fuel volume detection data into the averaged fuel volume data $A_m$, as described above, it is impossible to sufficiently suppress the small amplitude fluctuations.

In comparison with this, in the system according to the present invention, since the averaged fuel volume data $A_m$ are further weight-averaged, the greater the ratio of the first weighted value $W_1$ to the second weighted value $W_2$, the more will be increased the effect of weighted average. However, when the ratio of the first weighted value $W_1$ to the second weighted value $W_2$ is increased excessively, the time required to weight-average the data is increased, thus the response time of indication is deteriorated a little. In the experimental results obtained by the inventors, the optimum first and second weighted values are as follows:

$$W_1 = (2^6 - 1)/2^6$$

$$W_2 = \tfrac{1}{2}^6$$

Further, each graphical representation shown in FIG. 11(C)-1, 11(C)-2 or 11(C)-3 shows the experimental results obtained under the conditions such that the volume of the fuel tank is 60 liter, the division ratio of the divider is $\tfrac{1}{2}^{14}$ so that the divider output changes in frequency from 1.0 Hz to 0.5 Hz from when the fuel tank is filled to when the fuel tank is emptied, the number of pulses Z necessary for measuring the averaged fuel volume data $A_m$ is two.

Figure 12:
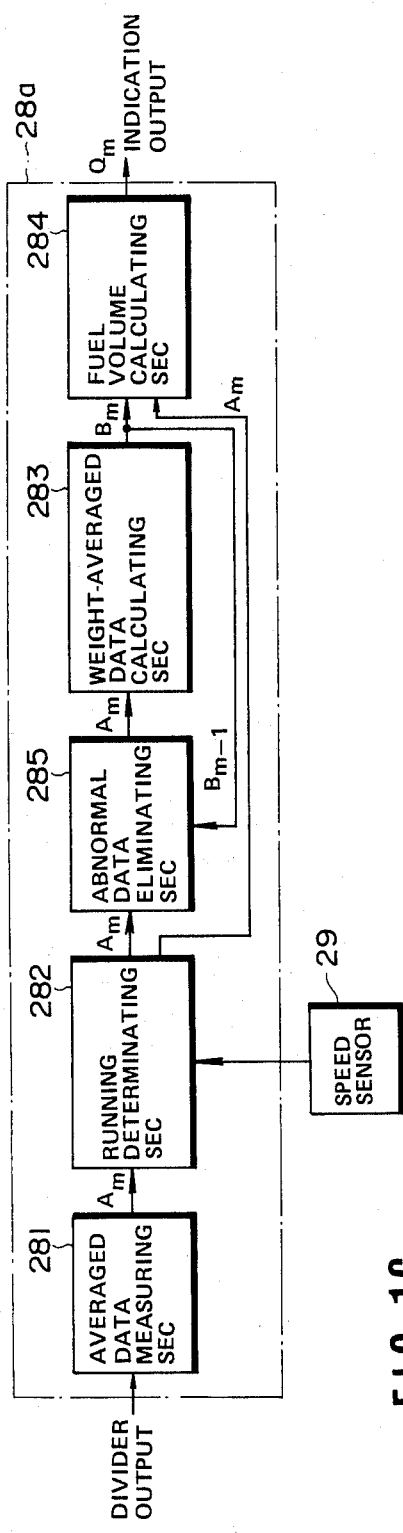
FIG. 12 is a schematic block diagram showing in detail only a signal processing section of the second embodiment of the fuel volume measuring system shown in FIG. 7, in which abnormal simply-averaged fuel volume data signal $A_m$ can be eliminated before calculating the weight averaged fuel volume data signal $B_m$.
Figure 13:
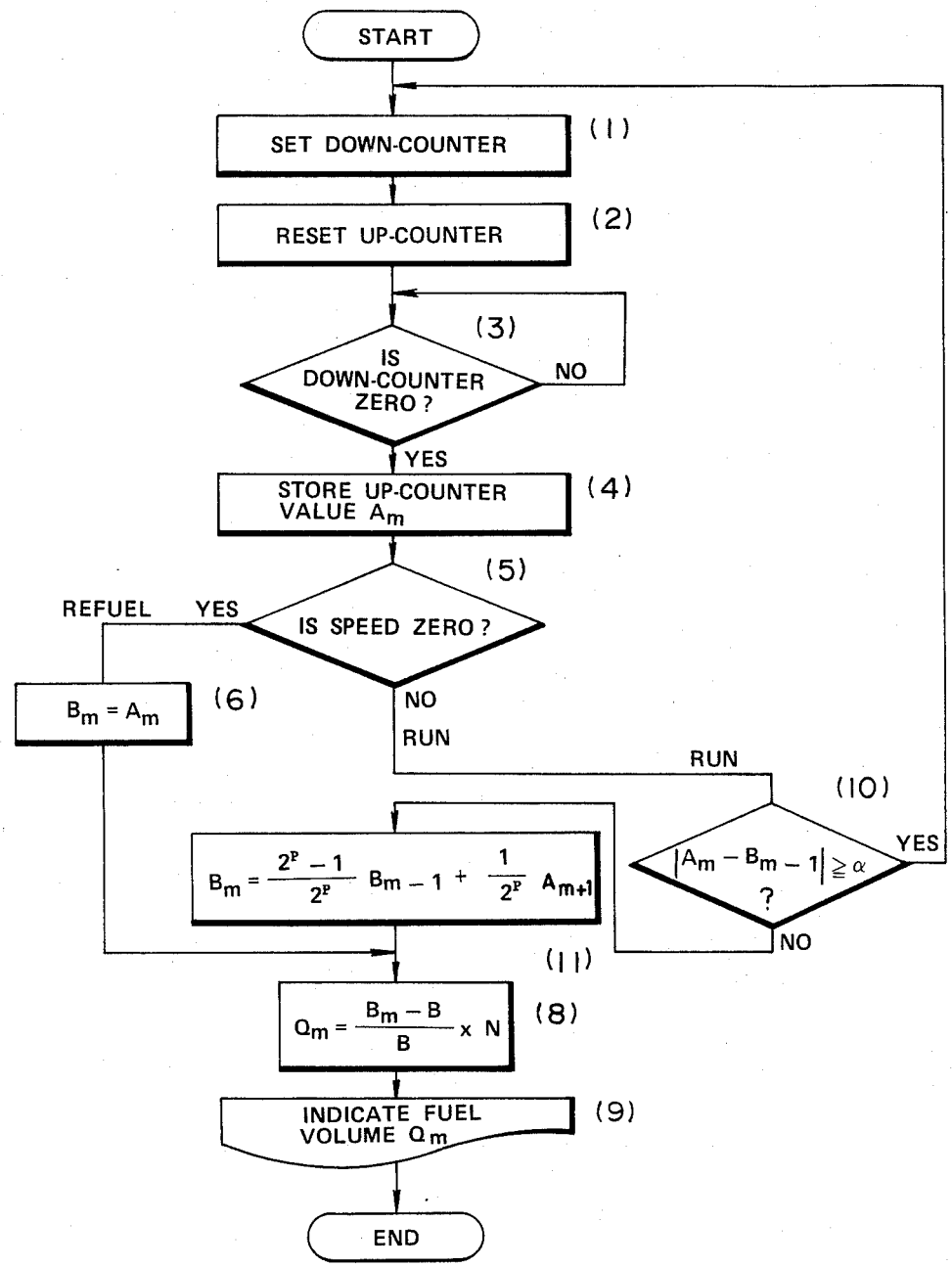
FIG. 13 is a flowchart showing a system control program used for the microcomputer of the second embodiment of the fuel volume measuring system for an automotive vehicle according to the present invention.

Next, FIG. 12 is a schematic block diagram showing the function and configuration of the signal processing section 28a used for a second embodiment of the fuel volume measuring system according to the present invention. FIG. 13 is a flowchart showing the system control program executed by the microcomputer. Further, the same system configuration portions as in the abovementioned first embodiment are designated by the same reference numerals, the description thereof being omitted hereinbelow.

The feature of this second embodiment is to eliminate abnormal averaged fuel volume data $A_m$ deviating from a predetermined allowable range in comparison with the preceding weight-averaged fuel volume data $B_m$ before the weight-averaged data are obtained.

A running determinating section 282 selectively supplies the averaged fuel volume data signal $A_m$ measured by the averaged data measuring section 281 to either of an abnormal value eliminating section 285 or a fuel volume calculating section 284. This switching action can be achieved in response to the output signal from a vehicle speed sensor 29. In more detail, in the case where fuel is resupplied to a vehicle at a gasoline service station; that is, vehicle speed is zero, the averaged fuel volume data signal $A_m$ is directly supplied to a fuel volume calculating section 284 by-passing the abnormal value eliminating section 285 and the weight-averaged data calculating section 283. In contrast with this, in the case where the vehicle is running; that is, vehicle speed is not zero, the averaged fuel volume data signal $A_m$ is supplied to the abnormal value eliminating section 285.

The abnormal value eliminating section 285 compares the averaged data $A_m$ measured by the averaged data measuring section 281 with the preceding weight-averaged data $B_{m-1}$ and, when the averaged data $A_m$ exceeds the preceding weight-averaged data $B_{m-1}$ by a predetermined allowable range, determines these data $A_m$ to be abnormal data and prohibits the data from being supplied to the weight-averaged calculating section 283. In contrast with this, the normal averaged data $A_m$ lying within the predetermined allowable range are directly supplied to the weight-averaged data calculating section 283.

The functions of the signal processing section 28a as described above can be implemented by executing the system control program shown in FIG. 13 and stored within the microcomputer made up of hardware configuration shown in FIG. 9.

The operation of the system of the second embodiment will be explained systematically with reference to the flow chart shown in FIG. 13.

When the program starts, in the same way as in the first embodiment, the steps (1) to (4) are executed sequentially, so that the current fuel volume data $A_m$ counted in the up counter 315 are sampled into the CPU 317 and stored into the average data register $T_a$ disposed within the working area.

Here, since the up counter 315 is reset to zero at the time when a numerical value Z is set to the down counter 313, the counted value of the up counter 315 obtained when the counted value of the down counter 313 becomes zero indicates the sum total of the periods of the divided pulses of Z; that is, this counted value corresponds to an averaged fuel volume data $A_m$ of Z-piece pulses divided by the divider 27.

When the step (10) is executed, it is determined whether the averaged fuel volume data signal $A_m$ obtained in the step (4) is normal or abnormal. This is determined on the basis of the fact that the following relationship between the current content $A_m$ of the average data register $T_a$ and the preceding content $B_{m-1}$ of the weight-averaged data register $T_{wa}$ can be satisfied:

$$|A_m - B_{m-1}| \geq a$$

where the numerical value a is so preset as to correspond to 0.5 liter which is the allowable fluctuation range of the fuel indication when fuel within a fuel tank surges.

Therefore, in the case where the fuel within a fuel tank surges, the fuel volume data fluctuates violently and, therefore, the content $A_m$ of the average data register $T_a$ become abnormal, the result executed in the step (10) is YES and therefore the steps (1) to (4) are executed repeatedly, thus the average fuel volume data signals $A_m$ indicating abnormal values are eliminated from the data used for the weighted average processing described later.

On the other hand, in the case where the fuel within the fuel tank does not surge or is stationary, the result executed in the step (10) is NO and consequently the step (11) is executed for obtaining weighted average fuel volume data signal $B_m$.

In order to execute this weighted-average processing, a sample data register $T_s$ is newly used in addition to the above-mentioned average data register $T_a$ and the weighted average data $T_{wa}$. That is to say, when the execution in the step (10) determines that the content $A_m$ of the average data register $T_a$ is normal, these averaged period data $A_m$ is transferred to the sample register $T_s$.

Next, when the weighted average is calculated, being different from the first embodiment, the weight-averaged value $B_m$ is calculated on the basis of the content $A_m'$ of the sample data register $T_s$ and the content $B_{m-1}$ of the weighted average resister $T_{wa}$.

That is to say, the content $B_{m-1}$ of the weighted average data register $T_{wa}$ is multiplied by $(2^p - 1)/2^p$ determined as the first weight value $W_1$ and the content $A_{m+1}'$ of the sample data register $T_s$ is multiplied by $\frac{1}{2}^p$ determined as the second weight value $W_2$, both multiplied values being stored into predetermined calculation registers.

Next, the weighted average value $$B_m = [(2^p - 1)/2^p] \cdot B_{m-1} + (\tfrac{1}{2}^p) \cdot A_{m+1}'$$

is obtained by adding two contents of the above-mentioned calculation registers, and stored into the weighted average data registers $T_{wa}$ as an updated weight-averaged data.

As described above, in the step (11), an updated weighted average data $B_m$ can be obtained on the basis of the content $A_m'$ of the sample data register $T_s$ and the content $B_m$ of the weighted average data register $T_{wa}$, and the weighted average fuel volume data signals $B_m$ are sequentially updated through the steps described above.

On the basis of these updated weight-averaged value $B_m$, the steps (8) and (9) are executed sequentially and the fuel volume can be indicated, for instance, in the unit of liter on the digital indicator 30, in the same way as in the first embodiment.

As described above, in the system of this second embodiment, since the abnormal averaged fuel volume data signal $A_m$ are eliminated by comparing the sequentially obtained current averaged data $A_m$ with the previously obtained preceding weight-averaged data $B_{m-1}$ before the weighted average data are calculated, in the case where the averaged data $A_m$ fluctuates abnormally due to the mixture of noise in addition to the change in fuel level within the fuel tank, it is possible to effectively suppress the fluctuations of the fuel volume indication within a predetermined small range.

Figure 14A:
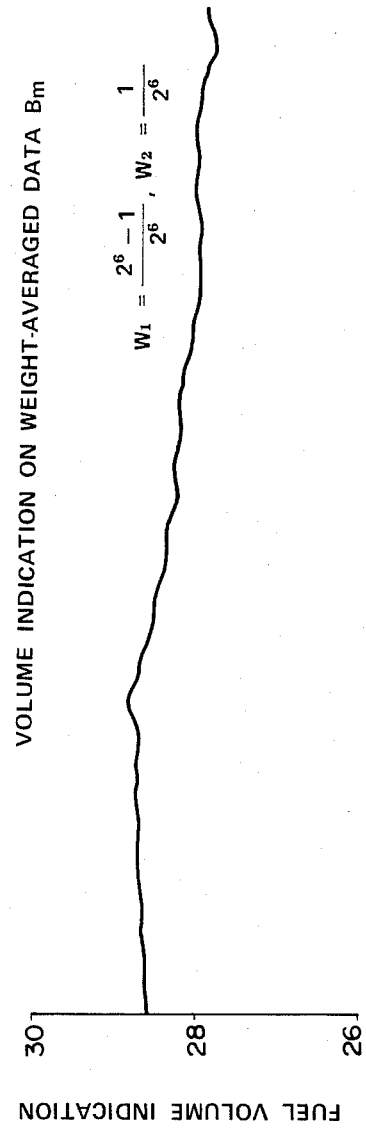
FIG. 14(A) is a graphical representation showing the fuel volume indication obtained on the basis of the second (weighted) averaged fuel volume data signal $B_m$ calculated when the power of weight value is six, which is shown under the same conditions as in FIG. 11(C)-3.
Figure 14B:
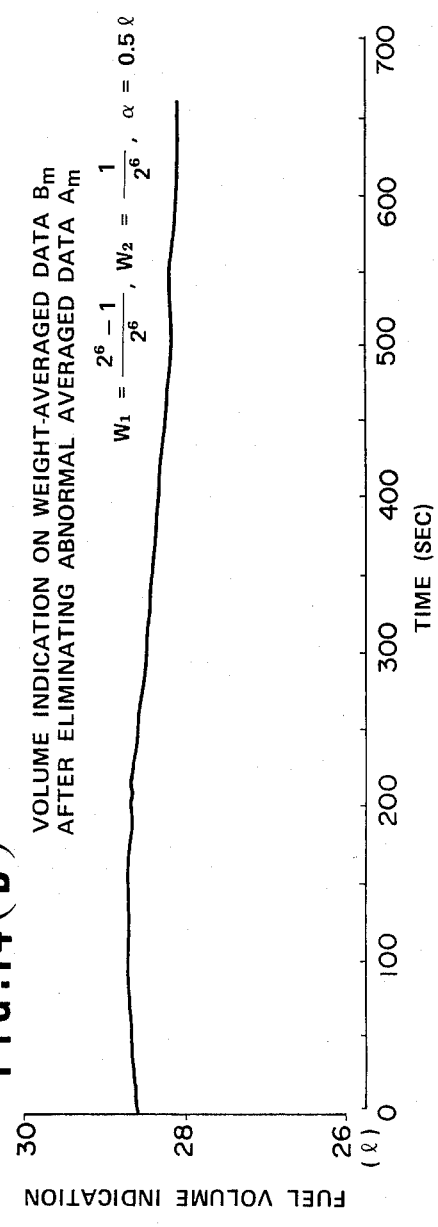
FIG. 14(B) is a graphical representation showing the fuel volume indication obtained on the basis of the second (weighted) averaged fuel volume data signal $B_m$ calculated when the power of the weight value is six, after eliminating abnormal simply-averaged fuel volume data signals $A_m$ exceeding an allowable range a of 0.5 liter.

FIGS. 14(A) and 14(B) show the difference in the fuel volume indication between the case where the abnormal values are not eliminated and the case where the abnormal values are eliminated, where the same weight value of $W_1 = (2^6 - 1)/2^6$ is selected as the first weight value and the same weight value of $W_2 = \frac{1}{2}^6$ is selected as the second weight value in both the above-mentioned cases.

As is well understood in the drawings, the amplitude fluctuations of the fuel volume indication obtained when abnormal values are eliminated (FIG. 14(B)) is apparently smaller than those obtained when weighted averages are simply calculated (FIG. 14(A)).

Further, FIGS. 15(A) to (C) show the fuel volume indication obtained when the same weight values of $(2^6 - 1)/2^6$ and $\frac{1}{2}^6$ are selected as the first and second weight values and the numerical values of 1.0, 0.5 and 0.3 liter are selected, respectively, as each allowable range a for eliminating abnormal values.

As is well understood by these graphical representations, in the case where the allowable range a is selected to 1.0 liter, there exist small amplitude fluctuations. On the other hand, in the case where the allowable range a is reduced to 0.3 liter, it is obvious that the fuel volume indication is shifted in phase from the averaged data. Therefore, we reach a conclusion that the allowable range a for eliminating abnormal value is optimum near 0.5 liter.

When the vehicle stops at a gasoline service station for refuelling, in the flowchart shown in FIG. 13, the steps from (1), through (2), (3), (4), (5), (6), and (8), to (9) are executed sequentially, without calculating the weight averaged data. Therefore, averaged fuel volume data $A_m$ is directly calculated in the step (8) and indicated on the indicator at a high response speed.

In contrast with this, in the case where the vehicle is running and the fuel within the fuel tank surges within a predetermined allowable range, in this flowchart, the steps from (1), through (2), (3), (4), (5), (10), (11), and (8), to (9) are sequentially executed and the weight-averaged data $B_m$ are calculated, and the fuel volume is indicated on the digital indicator stably even when the fuel surges within the fuel tank.

Further, in the case where fuel within the fuel tank surges violently or where the averaged fuel volume data signal $A_m$ exceeds the allowable range a due to the mixture of noise, in this flowchart, the steps from (1), through (2), (3), (4), (5) and (10), to (1) are repeatedly executed until a normal averaged data $A_m$ can be obtained, and the weight-averaged data $B_m$ is retained as it is until the content $A_m'$ of the sample data register $T_s$ is updated by a new averaged data $A_m$, so that it is possible to securely prevent the indication on the digital indicator from fluctuating extremely when fuel within the fuel tank surges extremely.

Figure 16:
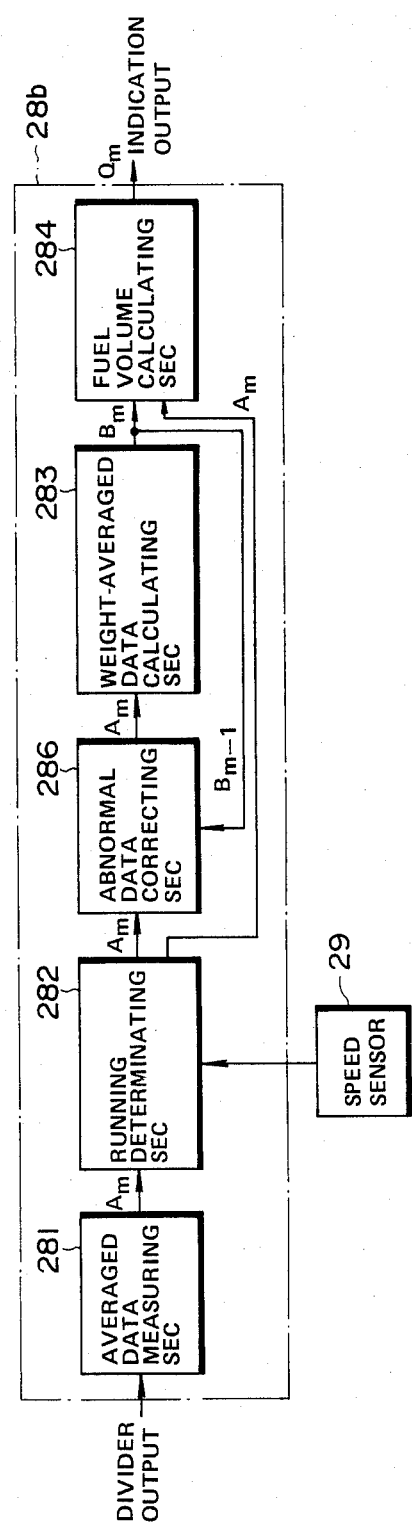
FIG. 16 is a schematic block diagram showing in detail only a signal processing section of a third embodiment of the fuel volume measuring system shown in FIG. 7, in which abnormal simply-averaged fuel volume data signal $A_m$ can be corrected before calculating the weight averaged fuel volume data signal $B_m$.
Figure 17:
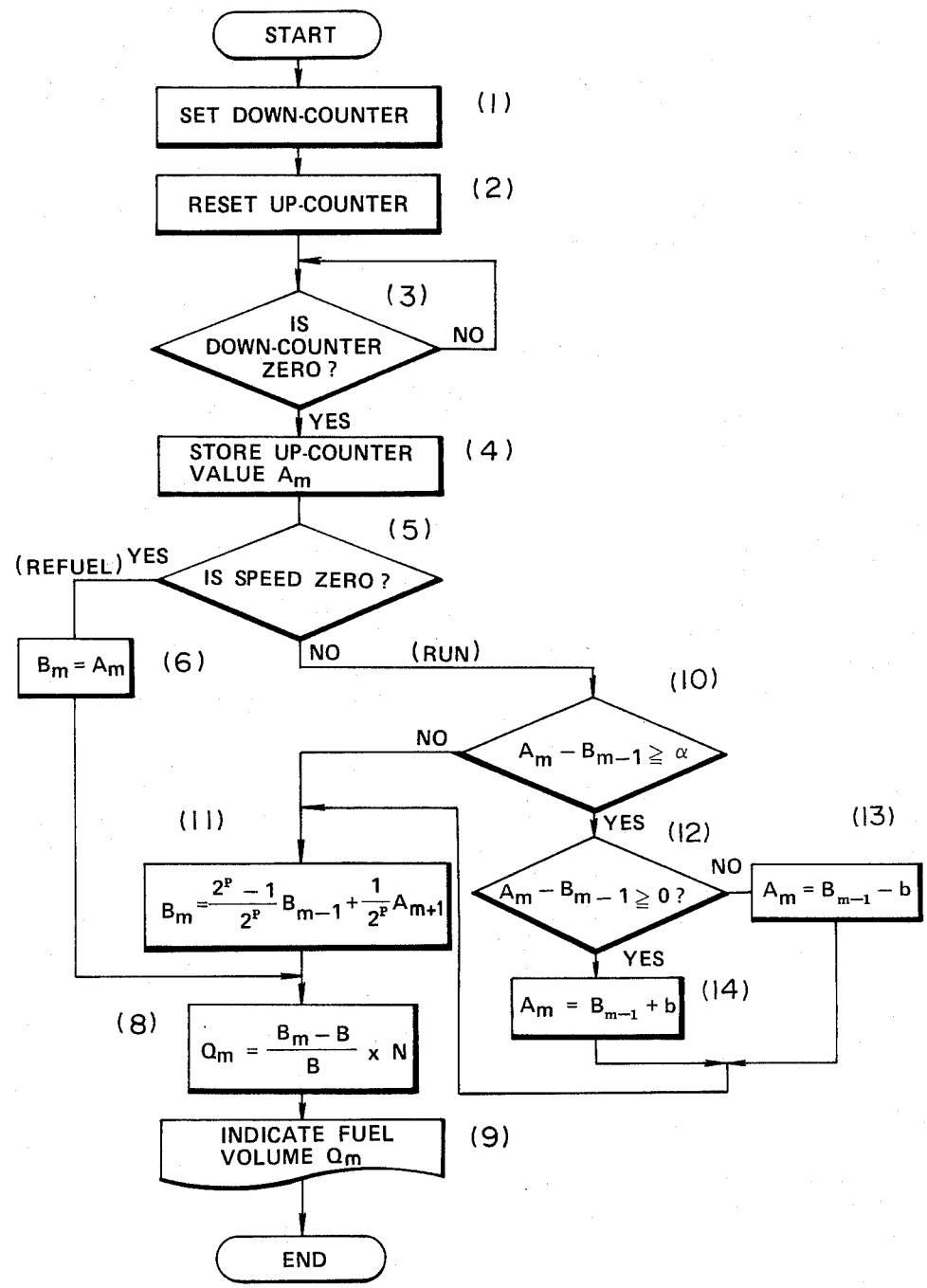
FIG. 17 is a flowchart showing a system control program used for the microcomputer of the third embodiment of the fuel volume measuring system for an automotive vehicle according to the present invention.
Figure 18:
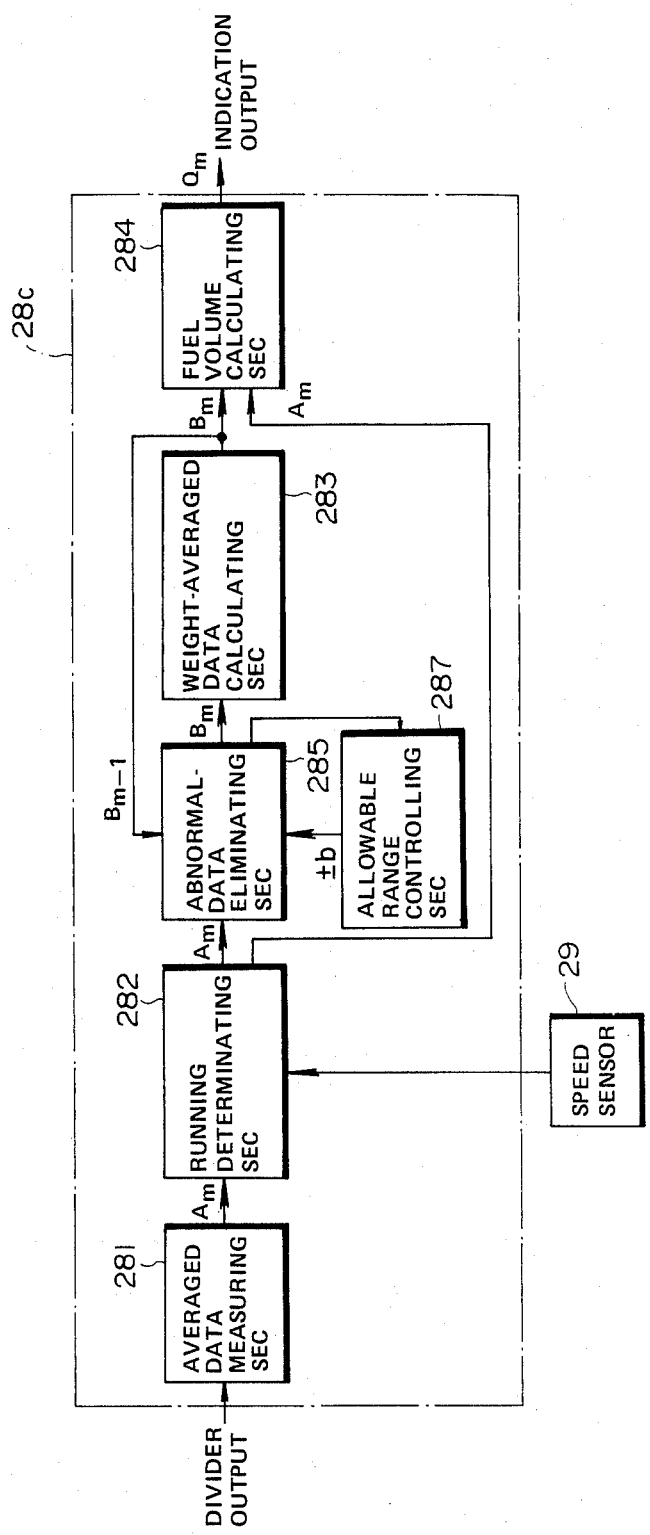
FIG. 18 is a schematic block diagram showing in detail only a signal processing section of a fourth embodiment of the fuel volume measuring system shown in FIG. 7, in which abnormal simply-averaged fuel volume data signal $A_m$ can be eliminated before calculating the weight averaged fuel volume data signal $B_m$.

FIG. 16 shows a schematic block diagram showing the signal processing section 28b of a third embodiment of the fuel volume measuring system according to the present invention; FIG. 18 shows a flowchart showing the system control program executed when this signal processing section shown in FIG. 17 is replaced with a microcomputer.

Further, in these drawings, the same system configuration components as in the above-mentioned first and second embodiments are designated by the same reference numerals, and the description thereof being omitted hereinafter.

The feature of this third embodiment is to sample the fuel volume data $A_m$ obtained by adding a predetermined correcting value to the preceding weight-average data $B_{m-1}$, when the data $A_m$ deviate out of a predetermined allowable range a and therefore the data are determined to be abnormal.

The running determinating section 282 selectively supplies the averaged data $A_m$ measured by the above-mentioned averaged data measuring section 281 to either of an abnormal-value correcting section 286 explained later in more detail or the fuel volume calculating section 284. This selection is determined on the basis of the output signal from the vehicle speed sensor 29. For instance, in the case where the vehicle is being refueled at a gasoline service station and therefore the vehicle speed pulse is absent, the measured averaged fuel volume data $A_m$ are directly supplied to the fuel volume calculating section 284 by-passing the abnormal-value correcting section 286 and the weight-averaged data calculating section 283.

In contrast with this, in the case where the vehicle speed pulse is present, the averaged fuel volume data $A_m$ measured by the averaged data measuring section 281 is supplied to the abnormal-value correcting section 286.

The abnormal-value correcting section 286 checks whether or not the averaged data $A_m$ measured by the averaged data measuring section 281 lies within an allowable range on the basis of the preceding weight-averaged data $B_{m-1}$ in order to determine whether the data are normal or abnormal. In case of abnormal data, the abnormal-value correcting section 286 supplies the data obtained by adding or subtracting a predetermined correcting value to or from the preceding weight-averaged data $B_{m-1}$ to the weight-averaged data calculating section 283. In contrast with this, in the case where the detected averaged data $A_m$ is normal, the normal data $A_m$ are directly supplied to the weight-averaged data calculating section 283 as they are without any correction.

Next, the weight-averaged data calculating section 283 sequentially calculates the weight-averaged data on the basis of the time-series data $A_m$ supplied from the abnormal-value correcting section 286 and supplies the calculated weight-averaged data $B_m$ to the fuel volume calculating section 284.

Next, the fuel volume calculating section 284 calculates the current fuel volume on the basis of the weight-averaged data $B_m$ supplied from the weight-averaged data calculating section 283 or the running determinating section 282, outputs the numerical data $Q_m$ corresponding to the fuel volume, and indicates digitally the fuel volume value on the digital indicator 30.

The functions of the above-mentioned signal processing circuit 28b can be implemented by executing the system program shown in FIG. 17 with a microcomputer. Further, the hardware configuration of the microcomputer is the same as in the above-mentioned first embodiment, the description thereof being emitted here.

With reference to the flowchart shown in FIG. 17, the operation of the third embodiment of the present invention will be described systematically hereinbelow.

First, when the program starts, the steps from (1) to (4) are executed and the averaged fuel volume data $A_m$ corresponding to the fuel volume value are stored in the averaged data register $T_a$ in the same way as described in each above-mentioned embodiment.

Next, on the basis of the result executed in the step (5), in the case where the vehicle is kept stopped or is being refuelling, consecutively the steps (6), (8) and (9) are executed sequentially, so that the fuel volume during refuelling is indicated on the digital indicator at a high response speed, as described before.

Further, on the basis of the result executed in the step (5), in the case where the vehicle is running and further the step (10) determines that the value of the averaged data $A_m$ is normal, consecutively the steps (11), (8) and (9) are executed sequentially, the normal weighted average processing being implemented, so that the fluctuations of averaged data $A_m$ due to the change in the fuel level within a fuel tank can be suppressed and the fuel volume indication is kept stable on the digital indicator, as explained before.

In contrast with this, in the case where the vehicle is determined to be running and further the absolute difference value between the averaged data $A_m$ and the weight-averaged data $B_{m-1}$ is equal to or greater than a; that is, the averaged data is determined to be abnormal, the result of the step (10) is YES, consecutively the step (12) being executed.

In the step (12), the relationship between the the newly measured averaged data $A_m$ is compared with the preceding weight-averaged data $B_{m-1}$. In the case where the averaged data $A_m$ is determined to be equal to or greater than the weight-averaged data $B_{m-1}$, the step (14) is consecutively executed in order to store the data obtained by adding a predetermined numerical value b to the preceding weight-averaged value $B_{m-1}$ into the sample data register $T_s$.

In contrast with this, as the result of the step (12), in the case where the averaged data $A_m$ is determined to be smaller than the preceding weight-averaged data $B_{m-1}$, consecutively the step (13) is executed in order to store the data obtained by subtracting a predetermined numerical value b from the preceding weight-averaged data $B_{m-1}$ into the sample data register $T_s$.

Here, the value of b is determined to be $0 \leq b \leq a$. By selecting an appropriate value within this range, it is possible to prevent the contents of the sample data register $T_s$ used for the weighted-average processing from becoming extremely large or small.

Next, when the step (11) is executed, on the basis of the content $A_m$ of the sample data register $T_s$ in which the data corrected in the steps (13) or (14) is stored and the contents $B_{m-1}$ of the weight-averaged data register $T_{wa}$, the current weight-averaged data $B_m$ is calculated in the above-mentioned method, and the content $B_m$ of the weight-averaged data register $T_{wa}$ can be updated sequentially.

Thereafter, on the basis of this updated weight-averaged data $B_m$, the steps (8) and (9) are executed sequentially. Therefore, even when the change in the fuel level within the fuel tank is extremely great to such an extent as to exceed the allowable range, the fuel volume indication is kept stable on the digital indicator.

As described above, in this third embodiment, in the case where the measured averaged fuel volume data $A_m$ are determined to be abnormal, without eliminating the data immediately, the abnormal averaged data $A_m$ are used for calculating the weight-averaged data $B_m$ after a predetermined correction value b is added or subtracted. Therefore, the weighted average is necessarily processed in a predetermined cycle, and in the case where data are determined to be abnormal continually, it is possible to prevent the fuel volume indication from being fixed at a value for a long time period.

In order to explain the advantages of this third embodiment, assumption is made that a vehicle is kept parked on a slop and therefore the averaged data $A_m$ is deviated by 3 liters from the actual fuel volume due to the inclination of the fuel level and next the vehicle begins to run from the slop to a flat road. In this case, assumption is further made that when the vehicle moves from a slop to a flat road, the fuel level fluctuates and therefore the averaged data $A_m$ fluctuates by $\pm 2$ liters from the actual fuel volume.

In such a state as described above, the sequentially detected averaged data $A_m$ is always at-least one liter smaller than the data obtained on the slop. Therefore, in the case where the allowable range within which the averaged data $A_m$ is determined to be normal is preset to $\pm 0.5$ liter, the averaged data $A_m$ sequentially detected on the flat road may always deviate out of the allowable range, so that there exists a problem in that the data used for the weighted-average processing are fixed to the old data for a long time without being updated. That is to say, in spite of the fact that the fuel is consumed actually, there exists a problem in that the fuel volume indication does not change.

However, in this third embodiment of the system according to the present invention, even if the measured averaged data $A_m$ is determined to be abnormal, since a data to which $\pm b$ is added is sequentially sampled instead of the abnormal data, the weighted average is to be calculated on the basis of the new data and therefore the indication of the fuel volume changes normally in accordance with the change in the actual fuel volume.

Figure 20:
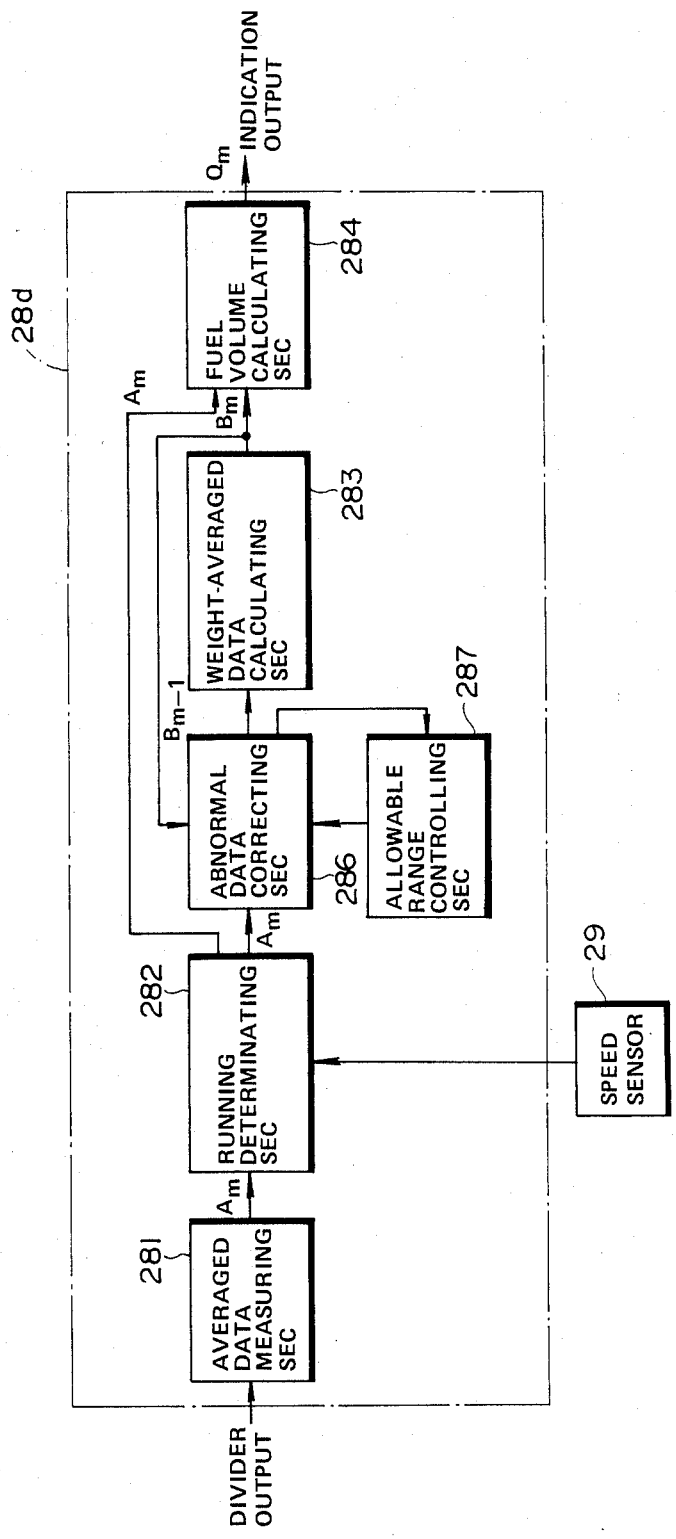
FIG. 20 is a schematic block diagram showing in detail only a signal processing section of the fifth embodiment of the fuel volume measuring system shown in FIG. 7, in which abnormal simply-averaged fuel volume data signal $A_m$ can be corrected and further the allowable range a can be controlled after calculating the weight averaged fuel volume data signal $B_m$.

FIG. 18 is a schematic block diagram showing of the signal processing circuit 28c of a fourth embodiment of the fuel volume measuring system according to the present invention; FIG. 20 is a flowchart showing the system control program executed when the signal processing circuit 28c is made up of a microcomputer.

Further, in the drawing, the same configuration components as in the above-mentioned embodiments are designated by the same reference numerals, the description thereof being omitted hereinafter.

The features of this fourth embodiment is to eliminate the abnormal averaged data $A_m$ deviating out of a predetermined allowable range in comparison with the preceding weight-averaged data $B_{m-1}$ before calculating the weight-averaged data $B_m$ and to stepwise increase or decrease the above-mentioned allowable range itself whenever the abnormal data deviates from the above-mentioned allowable range.

An allowable range controlling section 287 increases or decreases the allowable range c itself on the basis of the result determined in the abnormal-value eliminating section 285. That is to say, in the case where the averaged data $A_m$ is determined to be out of the allowable range c in the abnormal-value eliminating section 285, the allowable range controlling section 287 controls the abnormal-value eliminating section 285 so as to further widen the allowable range c by a predetermined value b. In contrast with this, in the case where the averaged data $A_m$ is determined to lie within the allowable range c in the abnormal-value eliminating section 285, the allowable range controlling section 287 controls the abnormal-value eliminating section 285 so as to narrow the allowable range c by a predetermined value b.

Figure 19:
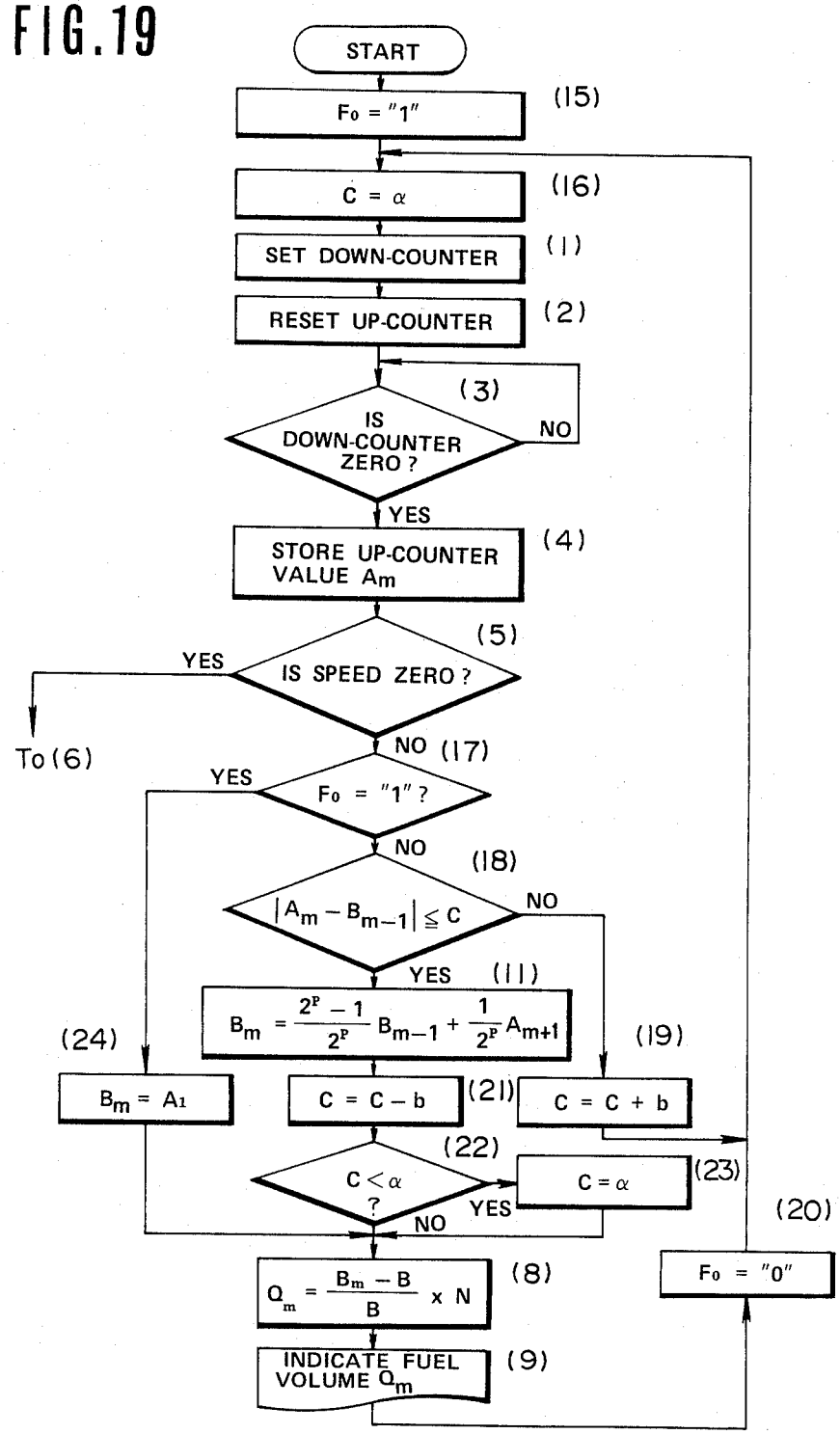
FIG. 19 is a flowchart showing a system control program used for the microcomputer of the fourth embodiment of the fuel volume measuring system for an automotive vehicle according to the present invention, in which abnormal moving-averaged fuel volume data signal $C_m$ can be eliminated and further the allowable range a can be controlled after calculating the fuel volume signal $C_m$.

The functions of the signal processing circuit 28c as described above can be implemented by executing the system program shown in FIG. 19 with a microcomputer. With reference to the flowchart shown in FIG. 19, the operation of this fourth embodiment will be described hereinbelow systematically.

When the program starts, first the step (15) is executed and therefore a predetermined initial flag Fo provided within the working area is set to "1". This initial flag Fo is used for initially presetting the firstly-detected averaged data $A_1$ into the weight-averaged data register $T_{wa}$ immediately after the program starts.

Next, when the step (16) is executed, in the same way, an initial value a is stored in the allowable range register C provided within the working RAM. Here, the value of a is determined so as to correspond to the change range of 0.5 liter of the fuel volume.

When the steps (1) to (4) are executed, as explained in the above-mentioned embodiments, the averaged data $A_m$ representative of the sum total of the periods corresponding to the divided pulses of Z are stored in the averaged data register $T_a$.

When the step (17) is executed, it is determined whether the content of the initial flag Fo is "1" or "0". Here, since the initial flag Fo is already set to "1" immediately after the program starts, the executed result is YES, consecutively the step (24) is executed and the currently-sampled averaged data $A_1$ is preset in the above-mentioned weight-averaged data register $T_{wa}$.

When the step (8) is executed, on the basis of the current content $A_1$ of the weight-averaged data register $T_{wa}$, the fuel volume is calculated through the above-mentioned processes and this calculated fuel volume $Q_1$ is stored in the fuel volume register Q.

When the step (9) is executed, the content $Q_1$ of the fuel volume register Q is transferred to the digital indicator 30 and the fuel volume indication is digitally displayed in the unit of one liter, for instance.

When the step (20) is executed, the initial flag Fo is set to "0"; consecutively, the steps from (16), through (1), (2), and (3), to (4) are executed again; the second averaged data $A_2$ is stored in the averaged data register $T_a$.

When the step (17) is executed, since the initial flag Fo is already reset to "0" at and after the second cycle in the step (20), the result executed in the step (17) is NO; consecutively, the step (18) is executed, and it is determined whether or not the absolute difference value between the current averaged data $A_m$ and the preceding weight-averaged data $B_{m-1}$ lies within the preset allowable range a. That is to say, this determination is made on the basis of the stored content of the allowable range register C. At this moment, since the numerical value a is stored in the allowable range register C, in the step (18), it is determined whether the content $A_m$ of the averaged data register $T_a$ lies within ±0.5 liter in comparison with the content $B_{m-1}$ of the weight-averaged data register $T_{wa}$.

Here, as the result executed in the step (18), in the case where the absolute difference value $|A_m-B_{m-1}|$ lies within the allowable range a, consecutively the step (11) is executed and therefore the content $A_m$ of the averaged data register $T_a$ is transferred to the sample data register $T_s$.

At the same time, on the basis of the content $A_m$ of the sample data register $T_s$ and the weight-averaged data register $T_{wa}$, a new weight-averaged data $B_m$ is calculated through the above-mentioned processes, the content of the weight-averaged data register $T_{wa}$ is updated by this newly-calculated weight-averaged data $B_m$.

Consecutively, when the step (21) is executed, the content a of the allowable range register C is subtracted by a predetermined numerical value b. Here, the value b is decided according to the increment range of 0.1 liter of the fuel volume within the fuel tank.

Consecutively, when the step (22) is executed, it is determined whether or not the content of the allowable range registr C is smaller than the numerical value a. However, in this case, since the calculation of (a−b) has already been made in the step (21), the content of the allowable range register C is of course smaller than the numerical value a. Therefore, the result executed in the step (22) is YES; consecutively, the step (23) is executed to set the content of the allowable range register C to the initial value a.

Consecutively, when the steps (8) and (9) are executed, the fuel volume is calculated and displayed on the digital indicator 30 in the unit of 1.0 liter in the same manner as described above.

In contrast with this, as the result of the execution in the step (18), in the case where it is determined that the absolute difference value $|A_m-B_{m-1}|$ deviates out of the allowable range a, consecutively the step (19) is executed, the content a of the allowable range register C is added by the numerical value b; the calculations of the weighted average, the calculations of the fuel volume, and the operation of the display being all omitted, the steps from (16), through (1), (2), and (3), to (4) are executed again to obtain the succeeding averaged data $A_m$.

Consecutively, when the step (18) is executed through the step (17), it is determined whether or not the absolute difference value $|A_m-B_{m-1}|$ lies within the content (c+b) stored in the allowable range register C. Here, the content of the allowable range register C at this moment is set to (a+b) by the execution in the step (19).

Therefore, although it has been determined whether or not the absolute difference value $|A_m-B_{m-1}|$ lies within a range a (0.5 liter) in the preceding determination, in this case, it is determined whether or not the absolute difference value lies within a range (a+b) (0.5+0.1=0.6 liter); that is to say, the allowable range is widened from 0.5 to 0.6 liter.

Further, in the case where the detected averaged data $A_m$ is determined to be abnormal after the allowable range is widened as described above, as long as such determination continues, the steps from (19), through (16), (1), (3), (4) and (17), to (18) are repeatedly executed, the content of the allowable range register C is stepwise increased by b in such a way as 0.7, 0.8, 0.9 . . . liter.

In contrast with this, in the case where the absolute difference value $|A_m-B_{m-1}|$ is determined to lie within the allowable range in the step (18), consecutively the step (11) is executed and the averaged data $A_m$ is sampled into the sample data register $T_s$; consecutively the step (21) is executed and therefore the numerical value b is subtracted from the content of the allowable range register C.

Thereafter, as long as the absolute difference value is determined to lie within the allowable range c, the steps from (22), through (8), (9), (20), (16), (1), (2), (3), (4), (17), (18) and (11), to (21) are repeatedly executed and therefore the content of the allowable range register C are stepwise decreased b by b; that is to say, the value of the allowable range is decreased in such a way as 0.9, 0.8, 0.7, 0.6 . . . liter.

Next, when the content of the allowable range register C is decreased lower than the numerical value a, the executed result in the step (22) is YES; consecutively the step (23) is executed, so that the content of the allowable range register C is returned to the original value a.

As described above, in this fourth embodiment of the system according to the present invention, since the allowable range for eliminating the abnormal fuel volume data $A_m$ is increased or decreased according to the absolute difference value between the current averaged data $A_m$ and the preceding weight-averaged data $B_{m-1}$, it is possible to effectively eliminate the extremely-abnormal data. Further, even in the case where an automotive vehicle starts and stops repeatedly on a busy road and therefore the fuel level within the fuel tank oscillates continuously and thus a great number of the averaged data $A_m$ exceeding the allowable value are repeatedly detected, it is possible to appropriately sample the averaged data $A_m$ into the sample data register T by increasing or decreasing the allowable range continuously in accordance with these detected results.

Therefore, in comparison with the case where the allowable range is fixed, it is possible to increase the number of updating of the sample data register $T_s$ and to suppress the deviation of the fuel volume indication even under the environment as described above.

Figure 21:
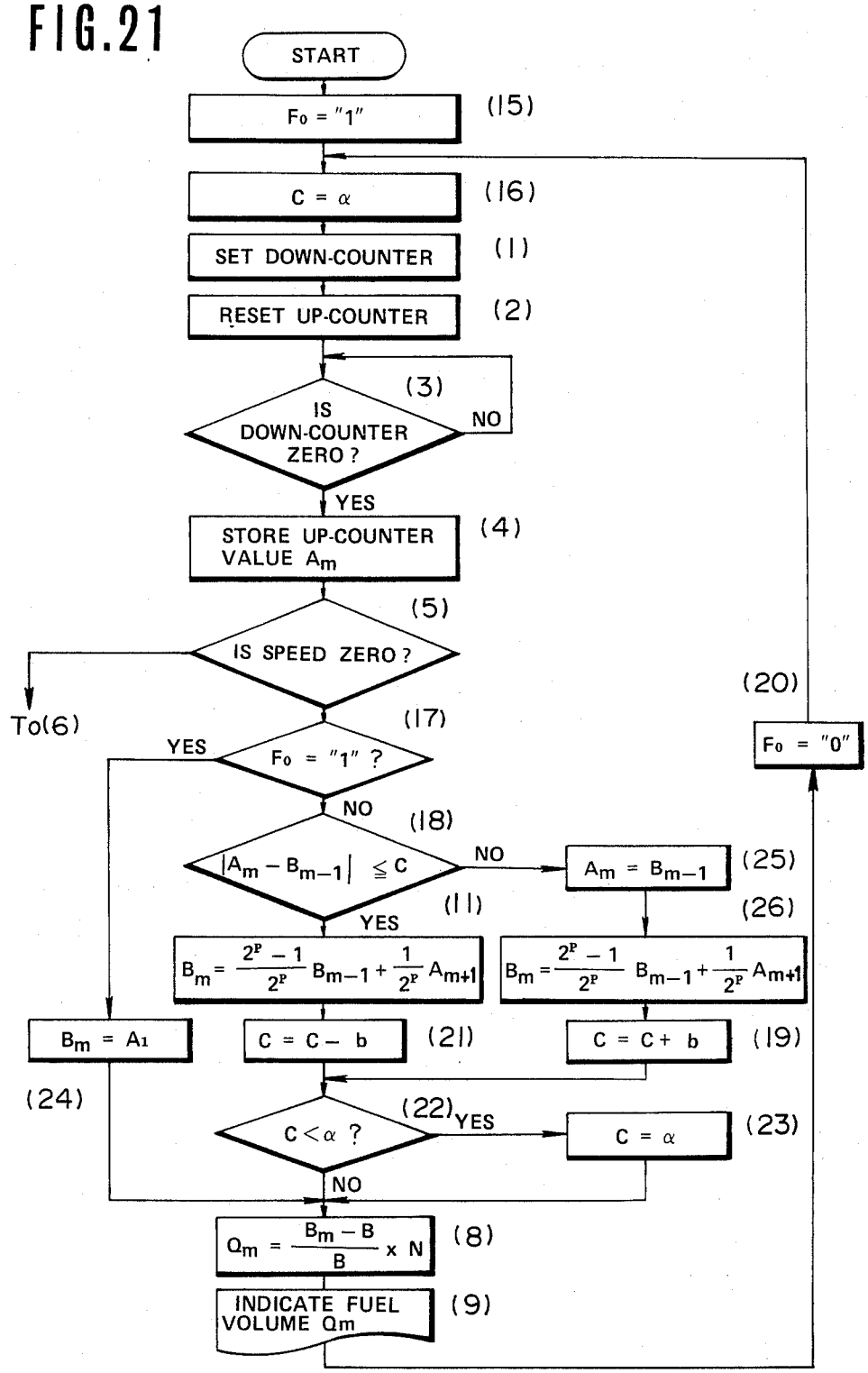
FIG. 21 is a flowchart showing a system control program used for the microcomputer of the fifth embodiment of the fuel volume measuring system for an automotive vehicle according to the present invention.

FIG. 20 is a schematic block diagram of the signal processing circuit 28d of a fifth embodiment of the fuel volume measuring system according to the present invention; FIG. 21 is a flowchart showing the system program executed by a microcomputer.

Further, in the drawing, the same configuration components as in the above-mentioned embodiments are designated by the same reference numerals, and the descriptions thereof are omitted thereinafter.

The features of this fifth embodiment of the system according to the present invention is to sample the data $A_m$ obtained by adding a predetermined correction amount b (inclusive zero) to the preceding weight-averaged data $B_{m-1}$ instead of the abnormal data $A_m$ deviating out of a predetermined allowable range c and to increase or decrease the above-mentioned allowable range c when the averaged data $A_m$ deviates from the above-mentioned allowable range c.

The abnormal-valve correcting section 286 compares the averaged data $A_m$ measured by the above-mentioned averaged data measuring section 281 with the preceding weight-averaged data $B_{m-1}$, determines the data to be normal or abnormal on the basis of whether or not the absolute difference value between the current averaged data $A_m$ and the preceding weight-averaged data $B_{m-1}$ lies within a predetermined allowable range c, and, in the case of the abnormal data, transmits the data obtained by adding a predetermined correction amount b to the preceding weight-averaged data $B_{m-1}$ to the weight-averaged data calculating section 283 instead of the abnormal data $A_m$.

On the other hand, in the case where the averaged data $A_m$ is determined to be normal, the data is transmitted to the weight-averaged data calculating section 283 as it is.

On the other hand, in the case where the absolute difference value $|A_m - B_{m-1}|$ is determined to lie out of the predetermined allowable range c in the abnormal-data correcting section 286, the determined result is transmitted to the allowable range controlling section 287.

The allowable range controlling section 287 increases or decreases the allowable range c itself of the abnormal-data correcting section 286 on the basis of the results determined by the above-mentioned abnormal-data correcting section 286. Therefore, the value of the allowable range in the abnormal-data correcting section 286 is increased or decreased according to the value of the averaged data $A_m$ measured by the averaged data measuring section 281.

The functions of the signal processing circuit 28d described above can be implemented by executing the system program shown in FIG. 21 with a microcomputer.

With reference to the flowchart shown in FIG. 21, the operation of this fifth embodiment of the system according to the present invention will be described hereinbelow systematically.

When the program starts, in the same way as in the above-mentioned fourth embodiment, the steps (15), (16), (1), (2), (3), (4), (17), (24), (8), (9) and (20) are sequentially executed; the currently-sampled averaged data $A_m$ is preset in the weight-averaged data register $T_{wa}$; and the fuel volume calculated on the basis of the data $B_m$ is indicated on the digital indicator simultaneously.

Consecutively, as the result executed in the steps from (16), through (1), (2), (3), (4) and (17), to (18), in the case where the absolute difference value $|A_m - B_{m-1}|$ is determined to be within the allowable range a, steps from (11), through (21), (22), (8), (9), (20), (16), (1), (2), (3), (4), (17), and (18), to (11) are repeatedly executed, the fuel volume calculated on the basis of the weight-averaged data is indicated normally on the digital indicator.

In contrast with this, in the step (18), in the case where the absolute difference value $|A_m - B_{m-1}|$ is determined to be out of a predetermined allowable range a, the step (25) is executed and therefore the preceding weight-averaged data $B_{m-1}$ of the weight-averaged data register $T_{wa}$ is transferred to the sample data register $T_s$.

That is to say, in the case of the above-mentioned fourth embodiment, although the abnormal data is eliminated from the data used for calculating the weight-averaged data where the data is determined to be abnormal, in this fifth embodiment system, the data obtained by adding a predetermined correction value (in this embodiment, zero) to the preceding weight-averaged data $B_{m-1}$ is sampled instead of the abnormal data $A_m$.

Consecutively, when the step (26) is executed, on the basis of the content $B_{m-1}$ of the weight-averaged data register $T_{wa}$ and the content $A_m$ of the sample data register $T_s$ in which the corrected data are stored, the weight-averaged data $B_m$ is obtained through the above-mentioned calculations and the content $B_m$ of the weight-averaged data register $T_{wa}$ is updated by this new weighted average value.

Consecutively, when the step (19) is executed, the content a of the allowable range register C is added by b and the allowable range is stepwise increased in the same way as in the above-mentioned fourth embodiment.

Thereafter, as described in the above-mentioned fourth embodiment, as long as the absolute difference value $|A_m - B_{m-1}|$ exceeds the allowable range, the steps from (16), through (1), (2), (3), (4), (17), (18), (25), (26), (19), (22), (8), and (9), to (20) are repeatedly executed and therefore the allowable range value is increased stepwise continually b by b.

As the result of increasing of the allowable range as described above, in the case where the absolute difference value lies within the allowable range, the result executed in the step (18) is YES. Consecutively, the step (11) is executed and therefore the averaged data determined to be normal is sampled into the sample data register $T_{wa}$. On the basis of the content $A_m$ of this sampled data and the preceding content $B_{m-1}$ of the weight-averaged data register $T_{wa}$, new weighted average value can be obtained and the content of the weight-averaged data register $T_{wa}$ are updated in accordance with these obtained weighted average values.

Thereafter, as long as the state where the absolute difference value $|A_m - B_{m-1}|$ is determined to lie within the allowable range continues, the steps from (16), through (1), (2), (3), (4), (17), (18), (11), (21), (22), (8), and (9) to (20) are repeatedly executed and therefore the allowable range is stepwise decreased b by b.

Next, in the case where the value of the allowable range C is determined to be smaller than a, the result executed in the step (22) is YES, and consecutively the step (23) is executed, so that the content of the allowable range register C is returned to the initial value a. Thereafter, the state is kept, provided that an abnormal data is not detected.

As described above, in the fifth embodiment, since the allowable range C is increased or decreased according to the value of the calculated averaged data, since the data obtained by adding a predetermined correction value to the preceding weight-averaged data $B_{m-1}$ is sampled without eliminating the abnormal detected averaged data as in the fourth embodiment even in the case where the calculated averaged data is determined to be out of the allowable range, and since a new weight-averaged data can be obtained on the basis of the sampled data $A_m$ and the preceding weight-averaged data $B_{m-1}$, it is possible to more effectively suppress the deviation of the final fuel volume indication even in such a case as where a vehicle repeatedly starts and stops on a busy road.

Figure 23:
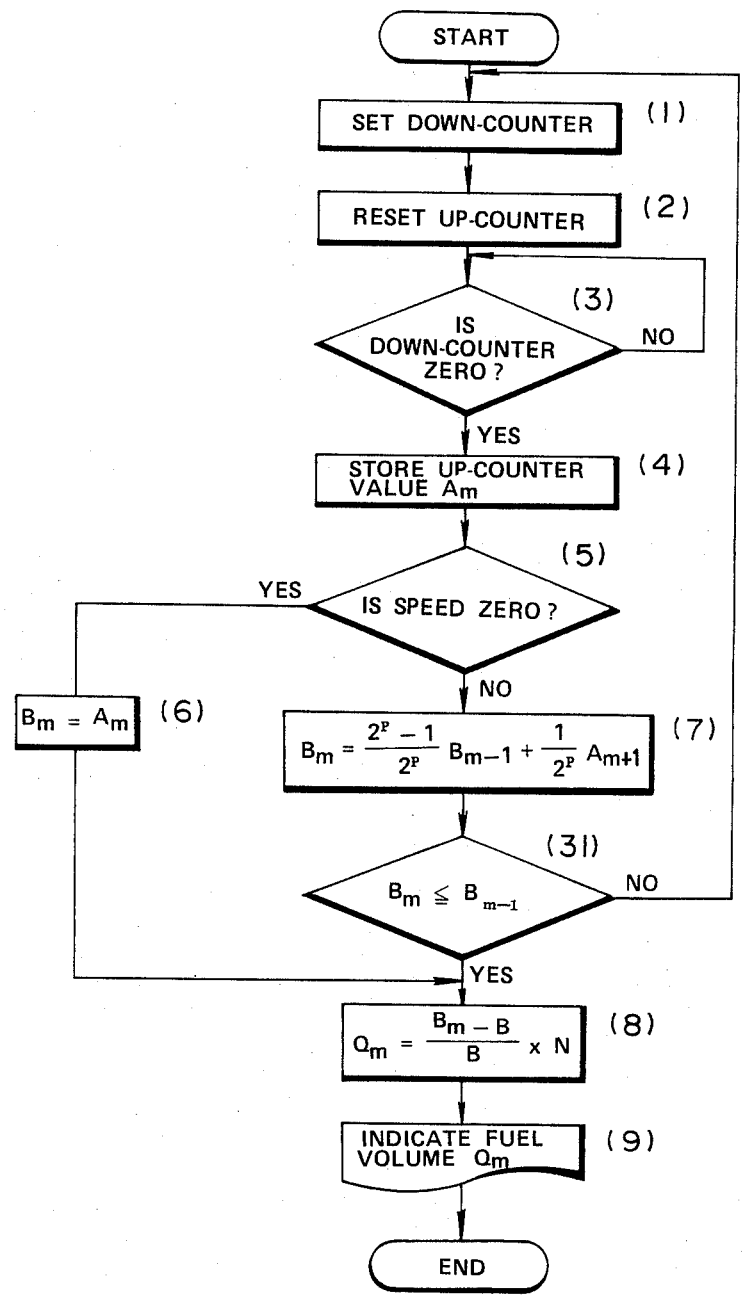
FIG. 23 is a flowchart showing a system control program used for the microcomputer of the sixth embodiment of the fuel volume measuring system for an automotive vehicle according to the present invention, in which abnormal weight-averaged fuel volume data signal $B_m$ can be eliminated before calculating the fuel volume signal $Q_m$.

FIG. 22(A) is a schematic block diagram showing the function and configuration of the signal processing section 28e used for a sixth and a seventh embodiments of the fuel volume measuring system for an automotive vehicle according to the present invention. FIG. 23 is a flowchart showing the system control program executed by the microcomputer, which is used for the sixth embodiment of the fuel volume measuring system for an automotive vehicle according to the present invention.

Further, the same sections as in the above-mentioned embodiments are designated by the same reference numerals, the description thereof being omitted herein.

The features of this sixth embodiment is to eliminate abnormal weight-averaged fuel volume data $B_m$ which exceed the preceding weight-averaged data $B_{m-1}$ before calculating the fuel volume. In connection with this, in the second embodiment described with reference to FIGS. 12 and 13, abnormal averaged data $A_m$ which exceed the preceding weight-averaged data $B_{m-1}$ are automatically eliminated before calculating the weight-averaged data $B_m$. Further, this embodiment depends upon the fact that as long as the vehicle is running, the fuel volume never increases but necessarily decreases or is kept at a constant value.

The abnormal data eliminating section 285 compares the current weight-averaged data $B_m$ outputted from the weight-averaged data calculating section 283 with the preceding weight-averaged data $B_{m-1}$ outputted from the same section 283.

In the case where the current weight-averaged data $B_m$ is equal to or smaller than the preceding weight-averaged data $B_{m-1}$, the abnormal value eliminating section 285 determines the current weight-averaged data $B_m$ to be normal and supplies the data $B_m$ to the fuel volume calculating section 284. On the other hand, in the case where the current weight-averaged data $B_m$ is greater than the preceding weight-averaged data $B_{m-1}$, the abnormal data eliminating section 285 determines the current weight-averaged data $B_m$ to be abnormal and does not supply the data $B_m$ to the fuel volume calculating section 284. This is because when the vehicle is running, an increase in the weight-averaged data indicative of the fuel volume is abnormal.

The above-mentioned functions of the signal processing section 28e can be implemented by executing the system control program shown in FIG. 23 and stored within the microcompter shown in FIG. 9.

In FIG. 23, when the step (7) is executed, the current weight-averaged data $B_m$ is calculated on the basis of the content $A_m$ of the averaged data register $T_a$ and the content $B_{m-1}$ of the current weight-averaged data register $T_{wa}$ and in accordance with the following expression:

$$B_m = [(2^p - 1)/2^p]B_{m-1} + (1)/2^p A_{m+1}$$

where p is an integer of from 4 to 6.

Consequently, the content $B_{m-1}$ of the current weight-averaged data register $T_{wa}$ is updated by this newly calculated data $B_m$. At the same time, the content $B_{m-1}$ of the current weight-averaged data register $T_{wa}$ is transferred to the preceding weight-averaged data register $T_{wa}'$.

When the step (31) is executed, the content $B_m$ of the current weight-averaged data register $T_{wa}$ is compared with the content $B_{m-1}$ of the preceding weight-averaged data register $T_{wa}'$ in accordance with the following expression:

$$B_m \leq B_{m-1}$$

As long as the vehicle is running, normally the current weight-averaged data $B_m$ must be smaller than the preceding data $B_{m-1}$. Therefore, the result obtained in the step (31) is YES. Thereafter, the fuel volume is calculated on the basis of the current weight-averaged data $B_m$ and in accordance with the following expression, as already described:

$$Q_m = [(B_m - B)/B] \times N$$

On the other hand, in the case where the fuel volume increases apparently in spite of the fact that the vehicle is running, the current weight-averaged data $B_m$ becomes greater than the preceding data $B_{m-1}$. Therefore, the result obtained in the step (31) is NO, and the steps from (1), through (2), (3), and (4), to (7) are sequentially executed again to calculate a new weight-averaged data, without advancing to the step (8) in which the fuel volume is calculated.

As described above, as long as the abnormal weight-averaged data are calculated, the steps from (1), through (2), (3), (4), and (7), to (31) are repeatedly executed, thus the system preventing the indicator from indicating the erroneous fuel volume calculated on the basis of the abnormal data.

Figure 24:
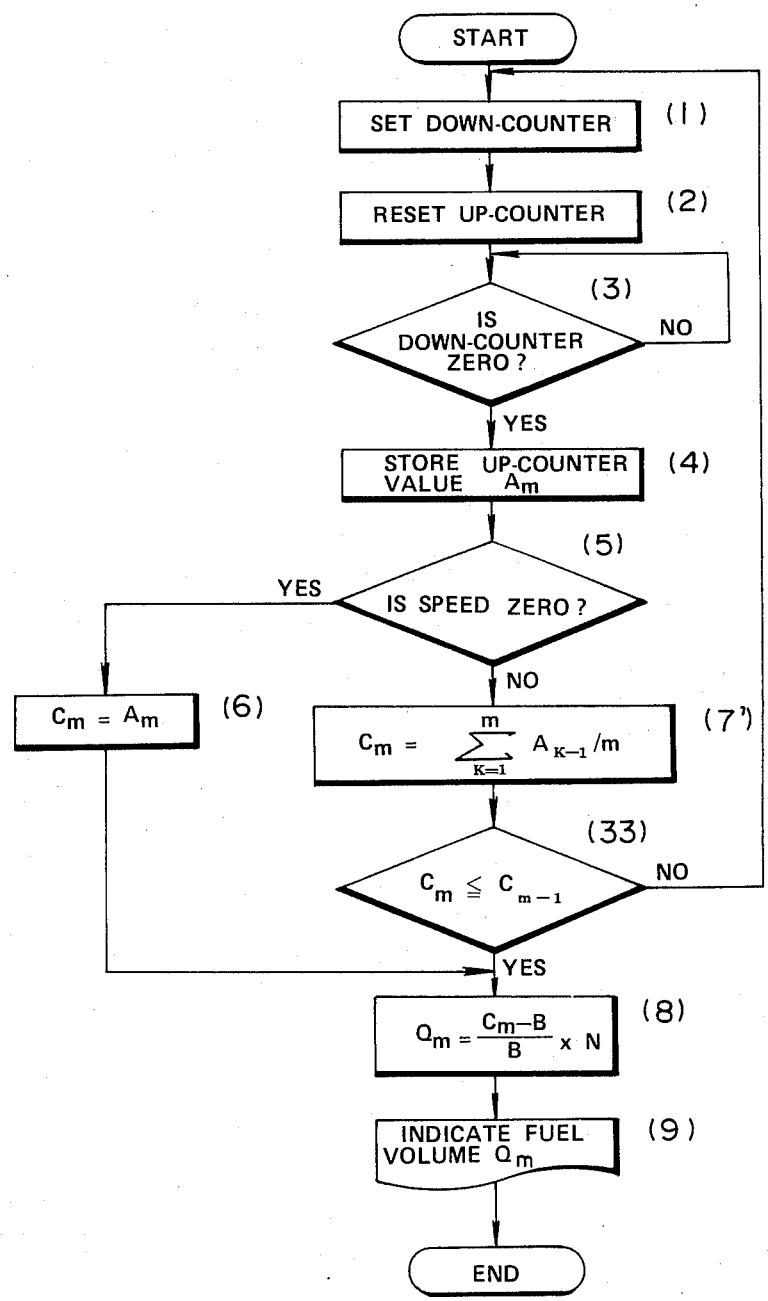
FIG. 24 is a flowchart showing a system control program used for the microcomputer of a seventh embodiment of the fuel volume measuring system for an automotive vehicle according to the present invention, in which abnormal moving-averaged fuel volume data signal $C_m$ can be eliminated before calculating the fuel volume signal $Q_m$.

FIG. 24 is a flowchart showing the system control program executed by the microcomputer, which is used for a seventh embodiment of the fuel volume measuring system for an automotive vehicle according to the present invention.

The features of this seventh embodiment is to eliminate abnormal moving-averaged data $C_m$ which exceed the preceding moving-averaged data $C_{m-1}$ before calculating the fuel volume. In connection with this, in the similar sixth embodiment described with reference to FIGS. 22(A) and 23, weight-averaged data $B_m$ are calculated in place of moving-averaged data $C_m$.

Before describing this seventh embodiment, the moving average will simply be explained below. Now, assumption is made that a plurality of time-series data $A_m$, $A_{m+1}$, $A_{m+2}$, $A_{m+3}$ ... are obtained to determine the moving average values. On the basis of these data, the moving-average values can be obtained in accordance with the following expression:

$$C_m = (A_{k-m}, A_{k-(m-1)}, A_{k-(m-2)} \ldots A_k)/m = \sum_{k=1}^{m} A_k/m$$

The current moving-averaged data $C_m$ is calculated on the basis of a plurality of averaged data $A_m$ stored in a shift register $T_{sh}$ $T_1$, $T_2$, ... $T_m$ provided within the working areas of the read-only memory. The shift register $T_{sh}$ functions as follows: when the first averaged data $A_1$ is obtained, $A_1$ is stored in the first stage $T_1$ of the shift register $T_{sh}$; when the second averaged data $A_2$ is obtained, $A_1$ is shifted from the first stage $T_1$ to the second stage $T_2$ and the $A_2$ is stored in the first stage $T_1$; when the third averaged data $A_3$ is obtained, $A_1$ is shifted from the second stage $T_2$ to the third stage $T_3$, $A_2$ is shifted from the first stage $T_1$ to the second stage $T_2$, and $A_3$ is stored in the first stage $T_1$, sequentially. That is to say, when m-piece averaged data $A_m$ are stored sequentially in the m-piece shift register, the shift registers are filled with these data as follows:

$$A_1, A_1, A_2 \ldots A_m$$

Therefore, when $A_{m+1}$ is obtained, the shift registers are filled with the data as follows:

$$A_2, A_3 \ldots A_m, A_{m+1}$$

In FIG. 24, when the step (7') is executed, the current moving averaged data $C_m$ is calculated on the basis of the contents $A_m$ of the shift register $T_{sh}$ and in accordance with the following expression:

$$C_m = \sum_{k=1}^{m} Ak/m$$

Consequtively, the calculated current moving averaged data $C_m$ is stored in the current moving averaged data register; that is, the content $C_{m-1}$ of the current moving averaged data register $T_{ma}$ is updated by this newly calculated data $C_m$. At the same time, the content $C_{m-1}$ of the current moving averaged data register $T_{ma}$ is transferred to the preceding moving averaged data register $T_{ma}'$.

When the step (33) is executed, the content $C_m$ of the current moving averaged data register $T_{ma}$ is compared with the content $C_{m-1}$ of the preceding moving averaged data register $T_{ma}'$ in accordance with the following expression:

$$C_m \leqq C_{m-1}$$

As long as the vehicle is running, normally the current moving averaged data $C_m$ must be equal to or smaller than the preceding data $C_{m-1}$. Therefore, the result obtained in the step (33) is YES. Thereafter, the fuel volume is calculated on the basis of the current moving averaged data $C_m$ and in accordance with the following expression, as already described:

$$Q_m = [(C_m - B)/B] \times N$$

On the other hand, in the case where the fuel volume increases apparently in spite of the fact that the vehicle is running, the current moving averaged data $C_m$ becomes greater than the preceding data $C_{m-1}$. Therefore, the result obtained in the step (33) is NO, and the steps from (1), through (2), (3), and (4), to (7') are sequentially executed again the calculate a new moving averaged data $C_m$, without advancing to the step (8) in which the fuel volume is calculated.

As described above, as long as the abnormal moving averaged data are calculated, th steps from (1) through (2), (3), (4) and (7') to (33) are repeatedly executed, thus the system preventing the indicator from indicating the erroneous fuel volume calculated on the basis of the abnormal data.

FIG. 22(B) is a schematic block diagram showing the function and configuration of the signal processing section 28e' used for an eighth and a ninth embodiments of the fuel volume measuring system for an automotive vehicle according to the present invention.

Figure 25:
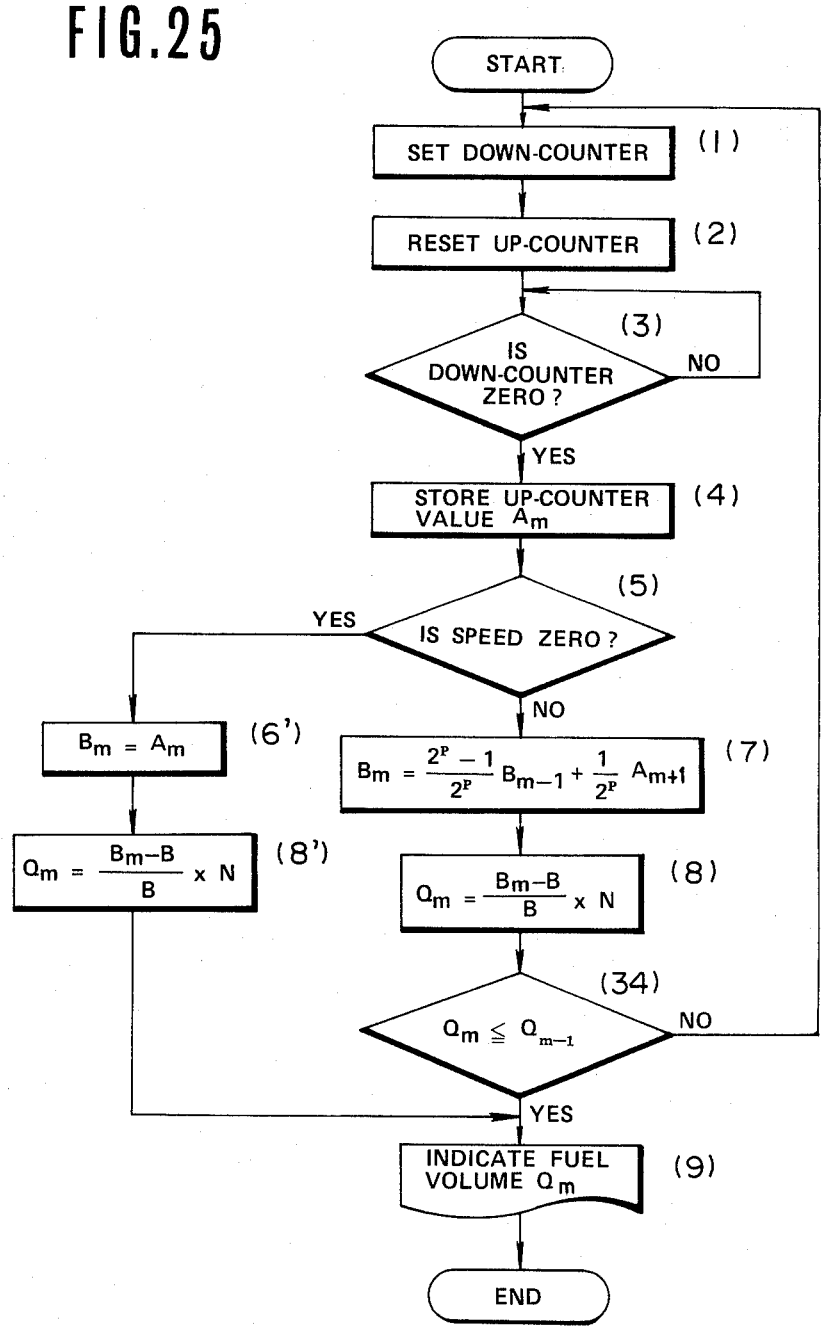
FIG. 25 is a flowchart showing a system control program used for the microcomputer of an eighth embodiment of the fuel volume measuring system for an automotive vehicle according to the present invention, in which abnormal fuel volume signal $Q_m$ calculated on the basis of the weight-averaged fuel volume data signal $B_m$ can be eliminated before indicating the fuel volume.

FIG. 25 is a flowchart showing the system control program executed by the microcomputer, which is used for an eighth embodiment of the fuel volume measuring system for an automotive vehicle according to the present invention.

The features of this eighth embodiment is to eliminate abnormal fuel volume signal $Q_m$ which exceeds the preceding fuel volume signal $Q_{m-1}$ before indicating the fuel volume, in the case where the weight-averaged data $B_m$ are calculated.

Further, this embodiment depends upon the fact that as long as the vehicle is running, the fuel volume never increases but necessarily decreases or is kept at a constant value.

The abnormal data eliminating section 285 compares the current fuel volume data $Q_m$ outputted from the fuel volume calculating section 284 with the preceding fuel volume data $Q_{m-1}$ outputted from the same section 284.

In the case where the current fuel volume data $Q_m$ is equal to or smaller than the preceding fuel volume data $Q_{m-1}$, the abnormal value eliminating section 285 determines the current fuel volume data $Q_m$ to be normal and supplies the data $Q_m$ to the fuel volume indicator. On the other hand, in the case where the current fuel volume data $Q_m$ is greater than the preceding fuel volume data $Q_{m-1}$, the abnormal data eliminating section 285 determines the current fuel volume data $Q_m$ to be abnormal and does not supply the data $Q_m$ to the fuel volume indicator. This is because, when the vehicle is running, an increase in the fuel volume data is abnormal. Further, in this embodiment, another fuel volume calculating section 284' is additionally provided for calculating the fuel volume data $Q_m$ when vehicle speed is zero.

The above-mentioned functions of the signal processing section 28e' can be implemented by executing the system control program shown in FIG. 25 and stored within the microcomputer shown in FIG. 9.

In FIG. 25, when the step (8) is executed, the current fuel volume data signal $Q_m$ is calculated on the basis of the content $B_m$ of the weight-averaged data register $T_{wa}$ and in accordance with the following expression:

$$Q_m = [(B_m - B)/B] \times N$$

Consequtively, the content $Q_{m-1}$ of the current fuel volume register $T_q$ is updated by this newly calculated data $Q_m$. At the same time, the content $Q_{m-1}$ of the current fuel volume register $T_q$ is transferred to the preceding fuel volume register $T_q'$.

When the step (34) is executed, the content $Q_m$ of the current fuel volume register $T_q$ is compared with the content $Q_{m-1}$ of the preceding fuel volume register $T_q'$ in accordance with the following expression:

$$Q_m \leqq Q_{m-1}$$

As long as the vehicle is running, normally the current fuel volume data $Q_m$ is equal to or smaller than the preceding data $Q_{m-1}$. Therefore, the result obtained in the step (34) is YES. Therefore, the fuel volume is indicated on the indicator.

On the other hand, in the case where the fuel volume increases apparently in spite of the fact that the vehicle is running, the current fuel volume data $Q_m$ becomes greater than the preceding data $Q_{m-1}$. Therefore, the result obtained in the step (34) is NO, and the steps from (1), through (2), (3), (4), (7), and (8), to (34) are sequentially executed again to calculate a new fuel volume data, without advancing to the step (9) in which the fuel volume is indicated.

As described above, as long as the abnormal fuel volume data are calculated, the steps from (1), through (2), (3), (4), (7), and (8), to (34) are repeatedly executed, thus the system preventing the indicator from indicating the erroneous fuel volume calculated on the basis of the abnormal data.

Figure 26:
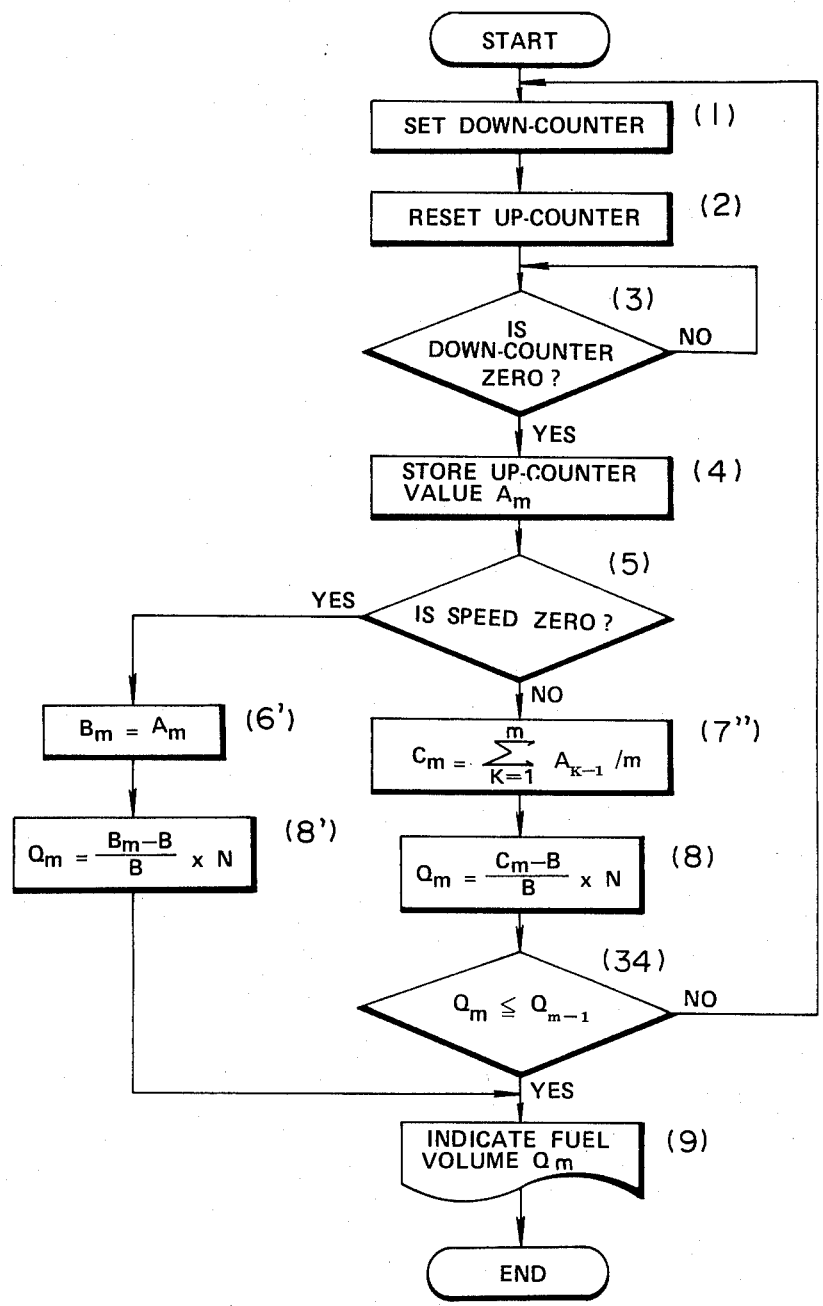
FIG. 26 is a flowchart showing a system control program used for the microcomputer of a ninth embodiment of the fuel volume measuring system for an automotive vehicle according to the present invention, in which abnormal fuel volume signal $Q_m$ calculated on the basis of the moving-averaged fuel volume data signal $C_m$ can be eliminated before indicating the fuel volume.

FIG. 26 is a flowchart showing the system control program executed by the microcomputer, which is used for a ninth embodiment of the fuel measuring system for an automotive vehicle according to the present invention.

The features of the ninth embodiment is to eliminate abnormal fuel volume data signal $Q_m$ which exceeds the preceding fuel volume data signal $Q_{m-1}$ before indicating the fuel volume, in the case where the moving-averaged data are calculated.

In FIG. 26, when the step (8) is executed, the current fuel volume data $Q_m$ is calculated on the basis of the content $C_m$ of the moving-averaged data register $T_{ma}$ and in accordance with the following expression:

$$Q_m = [(C_m - B)/B] \times N$$

Consequtively, the content $Q_{m-1}$ of the current fuel volume data register $T_q$ is updated by this newly calculated data $Q_m$. At the same time, the content $Q_{m-1}$ of the current fuel volume data register $T_q$ is transferred to the preceding fuel volume data register $T_q'$.

When the step (34) is executed, the content $Q_m$ of the current fuel volume data register $T_q$ is compared with the content $Q_{m-1}$ of the preceding fuel volume data register $T_q'$ in accordance with the following expression:

$$Q_m \leq Q_{m-1}$$

As long as the vehicle is running, normally the current fuel volume data $Q_m$ is equal to or smaller than the preceding data $Q_{m-1}$. Therefore, the result obtained in the step (34) is YES. Therefore, the fuel volume is indicated on the indicator.

On the other hand, in the case where the fuel volume increases apparently in spite of the fact that the vehicle is running, the current fuel volume data $Q_m$ becomes greater than the preceding data $Q_{m-1}$. Therefore, the result obtained in the step (34) is NO, and the steps from (1), through (2), (3), (4), (7'), and (8), to (34) are sequentially executed again to calculate a new fuel volume data, without advancing to the step (9) in which the fuel volume is indicated.

As described above, as long as the abnormal fuel volume data are calculated, the steps from (1), through (2), (3), (4), (7'), and (8), to (34) are repeatedly executed, thus the system preventing the indicator from indicating the erroneous fuel volume calculated on the basis of the abnormal data.

In all the above-mentioned embodiments from the first to the ninth, a vehicle speed sensor is provided in order to detect the state where the vehicle is running or is kept stopped. This is because when the vehicle is running, the averaged data $A_m$ indicative of fuel volume are further averaged in accordance with weighted averaged method or moving average method before calculating the fuel volume in order to effectively suppress the fluctuations of fuel volume indication and when the vehicle is being refueled, the averaged data $A_m$ indicative of fuel volume are directly indicated after calculating the fuel volume in order to effectively improve the response time of fuel volume indication.

In these above-mentioned embodiments, it is of course possible to omit the vehicle speed sensor, provided that a fast response time is not required in fuel volume indication when the vehicle is being refueled. However, it is rather preferable to provide the vehicle speed sensor for the fuel volume measuring system for an automotive vehicle according to the present invention.

By the way, in the case where the vehicle speed sensor is used for detecting the vehicle running condition, when the vehicle is running at a very slow speed on a busy road, since the sensor detects that the vehicle speed is zero and therefore the sensor determines that the vehicle is being refueled, in spite of the fact that the vehicle is running, the fluctuations of the fuel volume is not effectively suppressed, with the result that the digital fuel volume indication fluctuates or flickers without accurately indicating the fuel volume.

With these problems in mind, therefore, it is the other object of the present invention to provide the fuel volume measuring system for automotive vehicle in which no vehicle speed sensor is installed and the detection of whether the vehicle is running or being refueled is determined in dependence upon the difference in fuel volume between the preceding measuring point and the current measuring point. In other words, when the vehicle is being refueled, since the fuel volume within a fuel tank increases, the current fuel volume must be greater than the preceding fuel volume. Therefore, it is possible to determine that the vehicle is being refueled by comparing these two fuel volumes. Further, when the vehicle is determined to be being refueled, the shorter fuel-volume averaging time interval is selected or the additional fuel volume averaging calculation is omitted.

Figure 27:
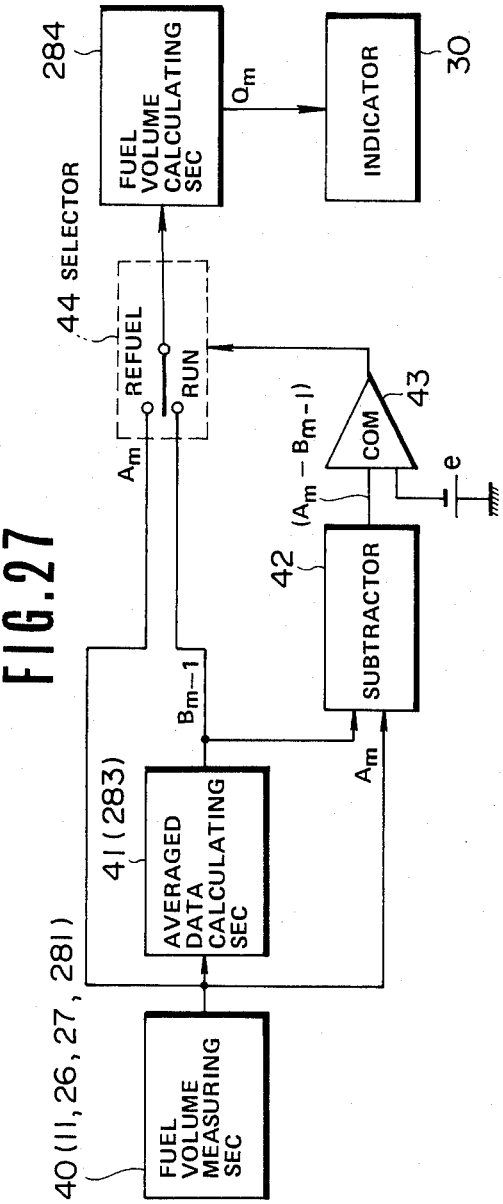
FIG. 27 is a schematic block diagram showing a system configuration of a tenth embodiment of the fuel volume measuring system for an automotive vehicle according to the present invention, in which the refueling state can be detected by comparing the current data signal indicative of fuel volume with the preceding data signal indicative of fuel volume.
Figure 28:
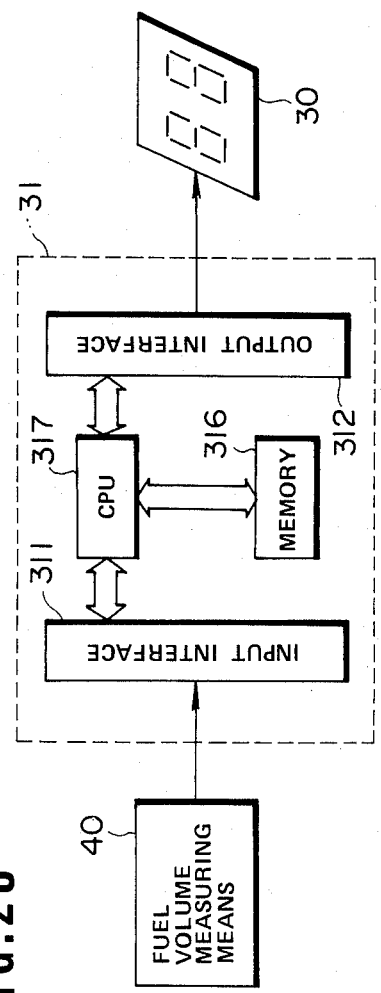
FIG. 28 is a schematic block diagram showing the hardware configuration of a microcomputer used for the tenth embodiments of the fuel volume measuring system for an automotive vehicle according to the present invention, in which no vehicle speed sensor is externally connected to the microcomputer.
Figure 29:
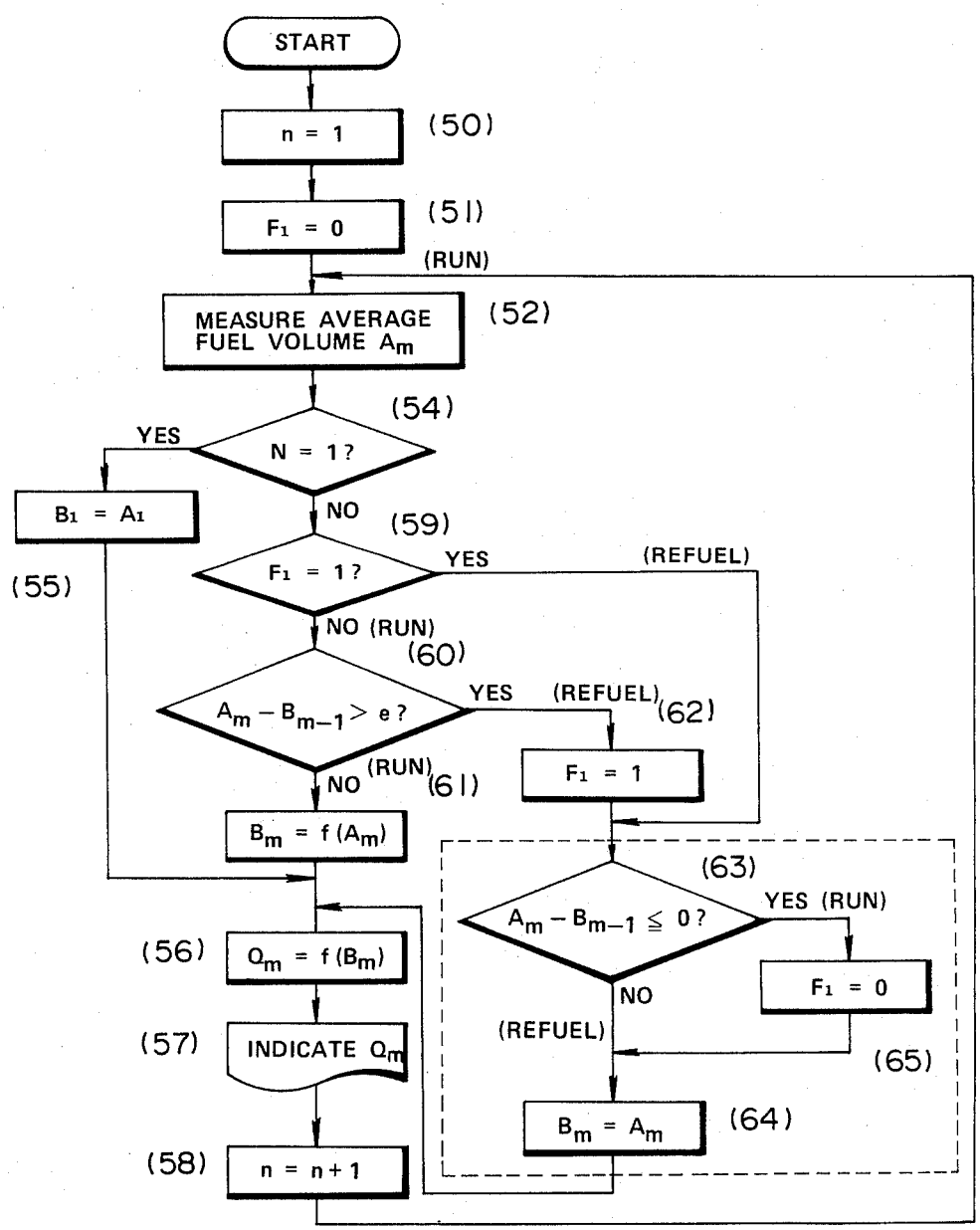
FIG. 29 is a flowchart showing a system control program used for the microcomputer of the tenth embodiment of the fuel volume measuring system for an automotive vehicle according to the present invention, in which the fact that the vehicle is being refueled is determined by comparing the difference between the current simply-averaged fuel volume data signal $A_m$ and the preceding weight-averaged fuel volume signal $B_{m-1}$ with a predetermined value e.

FIG. 27 is a schematic block diagram showing the function and configuration of a tenth embodiment of the fuel volume measuring system for a automotive vehicle according to the present invention. FIG. 28 is a schematic block diagram showing the same embodiment, in which the essential sections thereof are made up of a microcomputer. FIG. 29 is a flowchart showing a system control program executed by the microcomputer shown in FIG. 31, which is used for the tenth embodiment of the fuel volume measuring system according to the present invention.

The feature of this tenth embodiment is to determine that the vehicle is being refueled when the difference between the current averaged fuel volume data $A_m$ and the preceding weight-averaged fuel volume data $B_{m-1}$ is greater than a predetermined value e.

In FIG. 27, the reference numeral 40 denotes a fuel volume measuring section, which is made up of a volume sensor 11, a CR oscillator 26, a divider 27 and an averaged data measuring section 281 as shown in FIGS. 7 and 8, for instance. However, without limiting this fuel volume measuring means 40 to the above-mentioned sections, it is possible to use any other means for measuring the fuel volume in a fuel tank within a relatively shorter fuel volume averaging time intervals.

The reference numeral 41 denotes an averaged data calculating section, which is made up of weight-averaged data calculating section 283 as shown in FIG. 8, for instance. However, without limiting this averaged data calculating section 41 to the above-mentioned section, it is possible to use a moving averaged data calculating section or any other means for measuring fuel volume in a fuel tank within a relatively longer fuel volume averaging time intervals.

The reference numeral 42 denotes a subtractor for subtracting the preceding data $B_{m-1}$ outputted from the averaged data calculating section 41 from the current data $A_m$ outputted from the fuel volume measuring section 40.

The reference numeral 43 denotes a comparator for comparing the result $(A_m - B_{m-1})$ obtained by the subtractor 42 with a predetermined value e (inclusive zero) and outputs a signal indicative of refueling when the result ($A_m - B_{m-1}$) exceeds the value e.

The reference numeral 44 denotes a selector which connects the current data $A_m$ outputted from the fuel volume measuring section 40 to the next stage when the comparator 43 outputs a signal indicative of refueling thereto; that is, when the subtracted result ($A_m - B_{m-1}$) exceeds the value e, and connects the preceding data $B_{m-1}$ outputted from the averaged data calculating section 41 to the next stage when the comparator 43 outputs no signal, that is, when the subtracted result ($A_m - B_{m-1}$) does not exceeds the value e.

The reference numeral 284 denotes the fuel volume calculating section for calculating the fuel volume in response to the data $A_m$ from the volume measuring section 40 or the data $B_m$ from the averaged data calculating section 41; the reference numeral 30 denotes the indicator for indicating the fuel volume calculated by the fuel volume calculating section 284, as already explained with reference to FIGS. 7 and 8.

FIG. 28 shows another example of the tenth embodiment according to the present invention, in which a microcomputer 31 is incorporated and the fuel volume measuring section 40 is connected to the CPU 317 via the input interface 311 and the fuel volume indicator 30 is connected to the CPU 317 via the output interface 312. FIG. 29 shows a flowchart executed by the computer 31.

The operation of the tenth embodiment will be described systematically with reference to the flowchart shown in FIG. 29.

When the control program starts, in the step (50), the cycle count value n is set to one (n=1), and the flag $F_1$ is set to zero ($F_1=0$) in the step (51) indicating that the vehicle is running. In the step (52), the first averaged fuel volume data $A_m$ is sampled into the microcomputer from the fuel volume measuring section 40. In the step (54), it is determined whether the cycle count value n is 1 or 0. Since n is already set to 1, the result executed in the step (54) is YES, so that the program advances to the step (55). In the step (55), the first averaged fuel volume data $A_1$ is set as the first weighted averaged fuel volume data $B_1$. Thereafter, the fuel volume data $Q_1$ is calculated in the step (56) on the basis of this data $B_1$ and in accordance with a predetermined expression $B_m = f(A_m)$. The calculated fuel volume data $Q_1$ is indicated on the indicator in the step (57), incrementing the cycle count value n into 2 in the step (58). As described above, when the vehicle is running ($F_1=0$), the fuel volume is calculated on the basis of the averaged fuel volume data $A_1$ only at the first cycle.

Next, the program returns to the step (52) to measure the second average fuel volume $A_2$. In the step (54), since the cycle count value n is 2; that is, n is not 1, the result in the step (54) is NO. Further, since the flag is 0, the result in the step (59) is NO. Consequently, the current averaged fuel volume data $A_2$ is compared with the preceding weight-averaged fuel volume data $B_1$ in the step (60). When the difference between $A_2$ and $B_1$ does not exceed a predetermined value e (e.g. two liters), since this indicates that the vehicle is running or is not being refueled, the weight-averaged fuel volume data $B_2$ is calculated on the basis of the averaged fuel volume data $A_2$ and in accordance with the predetermined expression $B_m = f(A_m)$ in the step (56). The calculated fuel volume data $Q_2$ is indicated on the indicator in the step (57), incrementing the cycle count value n into 3 in the step (58). As long as the flag is zero ($F_1=0$) in the step (59) and the current averaged fuel volume data $A_m$ is not a predetermined value e greater than the preceding weighted average fuel volume data $B_{m-1}$ in the step (60), the steps from (52), through (54), (59), (60), (61), (56), and (57), to (58) are repeatedly executed to indicate the fuel volume data Q on the basis of the weighted average data $B_m$ repeatedly, because the vehicle is determined to be running.

On the other hand, in the step (60), the current averaged fuel volume data $A_m$ is a predetermined value e greater than the preceding weighted averaged fuel volume data $B_m$, result in the step (60) is YES, indicating that the vehicle is being refueled. Therefore, in the step (62), the flag is set to 1. In the step (63), the current averaged fuel volume data $A_m$ is compared with the preceding weight-averaged fuel volume data $B_{m-1}$. If $A_m$ is not smaller than or not equal to $B_{m-1}$; that is, $A_m$ is greater than $B_{m-1}$, the result in the step (63) in NO, so that the program control advances to the step (64), and the averaged fuel volume data $A_m$ is set as the weight-averaged fuel volume data $B_m$. This data $A_m$ is calculated in the step (56) to obtain the fuel volume data $Q_m$ in accordance with the same expression shown in the step (56). As long as the flag is one ($F_1=1$) in the step (62) and the current averaged fuel volume data $A_m$ is the value e greater than the preceding weight-averaged fuel volume data $B_{m-1}$, the steps from (52), through (54), (59), (60), (62), (63), (64), (56), and (57), to (58) are repeatedly executed to indicate the fuel volume $Q_m$ on the basis of the averaged data $A_m$, repeatedly, because the vehicle is determined to be being refueled.

Further, after the vehicle has been refueled competely, since the average data $A_m$ is smaller than or equal to the weight-averaged data $B_{m-1}$ in the step (63), the result of the step (63) is YES, so that the flag $F_1$ is set to 0 indicating that the vehicle is running. Thereafter, the program control advances to the step (64), $A_m$ is set as $B_m$, $B_m$ is calculated to obtain $Q_m$. However, in this case, at the first cycle, although the averaged data $A_m$ is used for calculating the fuel volume data Q at the step (56), when the program advances to the step (59) via the steps (57), (58), (52), and (54), the flag is not 1, so that the program control advances to the step (60). In the step (60), when the vehicle is running, since the data $A_m$ is not the value e greater than the data $B_{m-1}$, the weight-averaged data $B_m$ is calculated on the basis of the data $A_m$ at the step (61). Thereafter, the steps are repeatedly executed from (59), through (60), (61), (56), (57), (58), (52), and (54), to (59).

As described above, in this tenth embodiment, when the current averaged fuel volume data $A_m$ exceeds the preceding weight-averaged fuel volume data $B_{m-1}$ by a value, the vehicle is determined to be being refueled.

Figure 30:
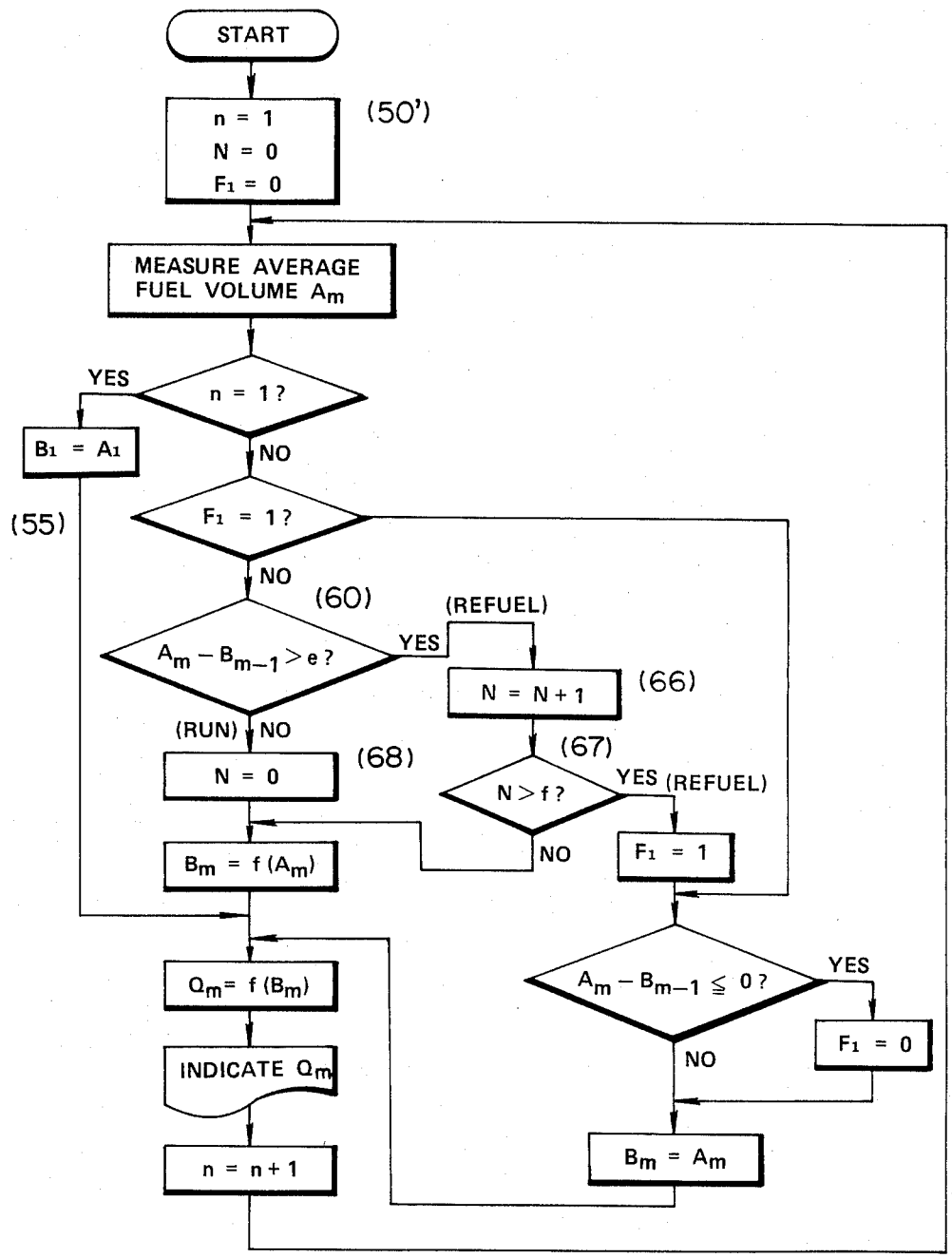
FIG. 30 is a flowchart showing a system control program used for the microcomputer of an eleventh embodiment of the fuel volume measuring system for an automotive vehicle according to the present invention, in which the fact that the vehicle is being refueled is determined by comparing the difference between the current simply-averaged fuel volume data signal $A_m$ and the preceding weight averaged fuel volume signal $B_{m-1}$ with a predetermined value e and further by counting the number of times that the difference between $A_m$ and $B_{m-1}$ exceeds a predetermined value f.

FIG. 30 is a flowchart used for an eleventh embodiment of the fuel volume measuring system according to the present invention. This flowchart is also executed by the microcomputer shown in FIG. 28.

The feature of this eleventh embodiment is to determine that the vehicle is being refueled when the current averaged fuel volume data $A_m$ is a predetermined value e greater than the preceding weight-averaged fuel volume data $B_{m-1}$ more than predetermined times f.

Since this eleventh embodiment shown in FIG. 30 is similar to the tenth embodiment shown in FIG. 29, only the steps different from those shown in FIG. 29 are described hereinbelow.

At the step (50'), the value N representative of the number of times that the current averaged data $A_m$ exceeds the preceding weight-averaged data $B_{m-1}$ by a predetermined value e is reset to zero, in addition to the resettings of the cycle count value n and the flag $F_1$ ($F_1 = 0$; during running).

At the step (66), the value N representative of the number of times is incremented whenever the averaged fuel volume data $A_m$ exceeds the preceding weight-averaged fuel volume data $B_m$ by a predetermined value e.

At the step (67), the incremented value N is compared with a predetermined value f. When the value N exceeds the value f, the program control advance to the next step to set the flag to 1 to indicate that the vehicle is being refueled.

Further, at the step (68), the value N is reset to 0. This is because when the step (60) is determined to be YES, this indicates that the fuel volume is decreasing and therefore the vehicle is running.

Figure 31:
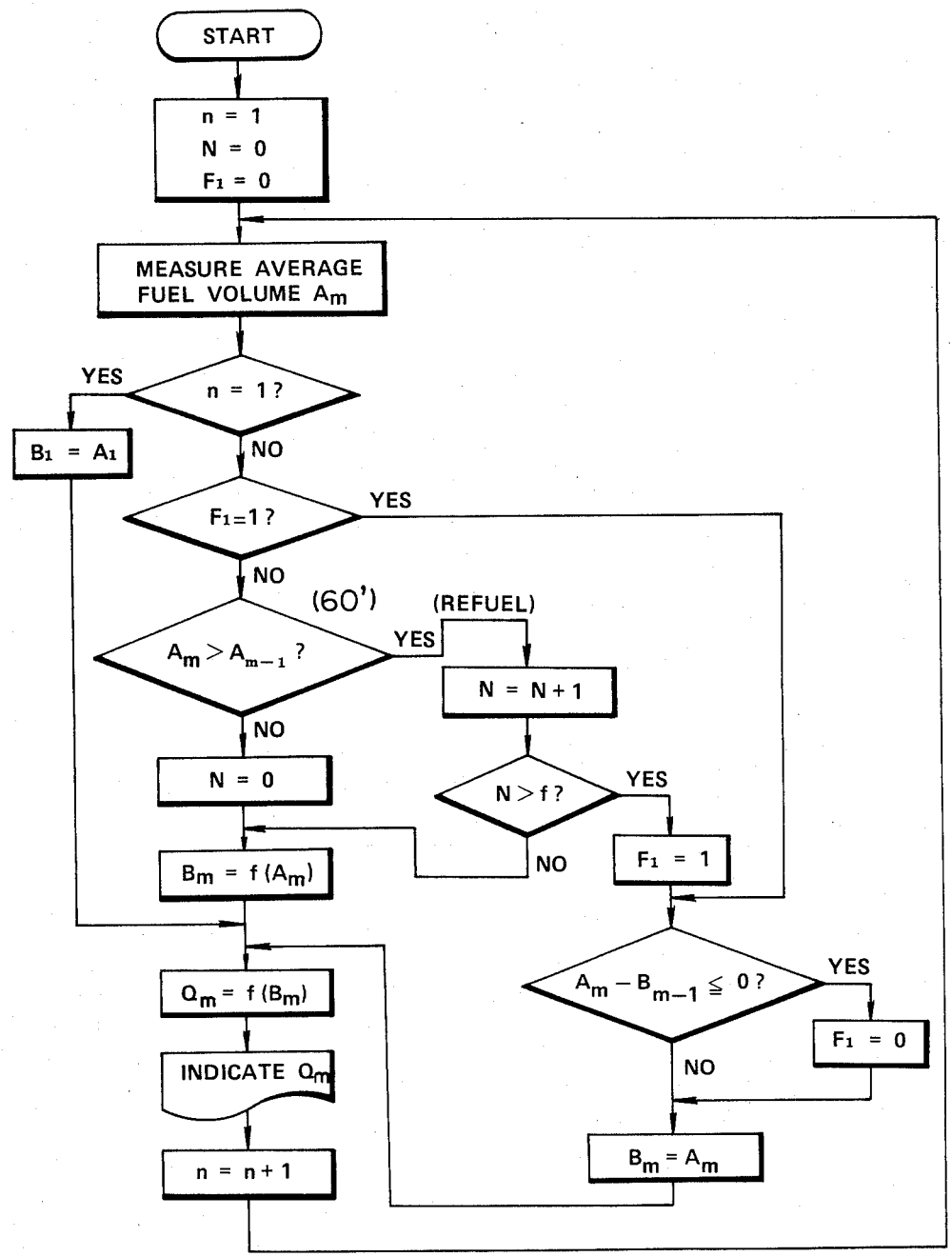
FIG. 31 is a flowchart showing a system control program used for the microcomputer of a twelfth embodiment of the fuel volume measuring system for an automotive vehicle according to the present invention, in which the fact that the vehicle is being refueled is determined by comparing the current simply-averaged fuel volume data signal $A_m$ with the preceding simply-averaged fuel volume data signal $A_{m-1}$ and further by counting the number of times that $A_m$ exceeds $A_{m-1}$.

FIG. 31 is a flowchart used for a twelfth embodiment of the fuel volume measuring system according to the present invention. This flowchart is also executed by the microcomputer shown in FIG. 28.

The feature of this twelfth embodiment is to determine that the vehicle is being refueled when the current averaged fuel volume data $A_m$ exceeds the preceding averaged fuel volume data $A_{m-1}$ more than predetermined times f.

Since this twelfth embodiment shown in FIG. 31 is similar to the eleventh embodiment shown in FIG. 30, only a step different from those shown in FIG. 30 is described hereinbelow.

At the step (60'), the current averaged fuel volume data $A_m$ is compared with the preceding averaged fuel volume data $A_{m-1}$. Therefore, when the $A_m$ exceeds the $A_{m-1}$; that is, when $A_m$ increases monotomously more than predetermined times f, the vehicle is determined to be being refueled.

Figure 32:
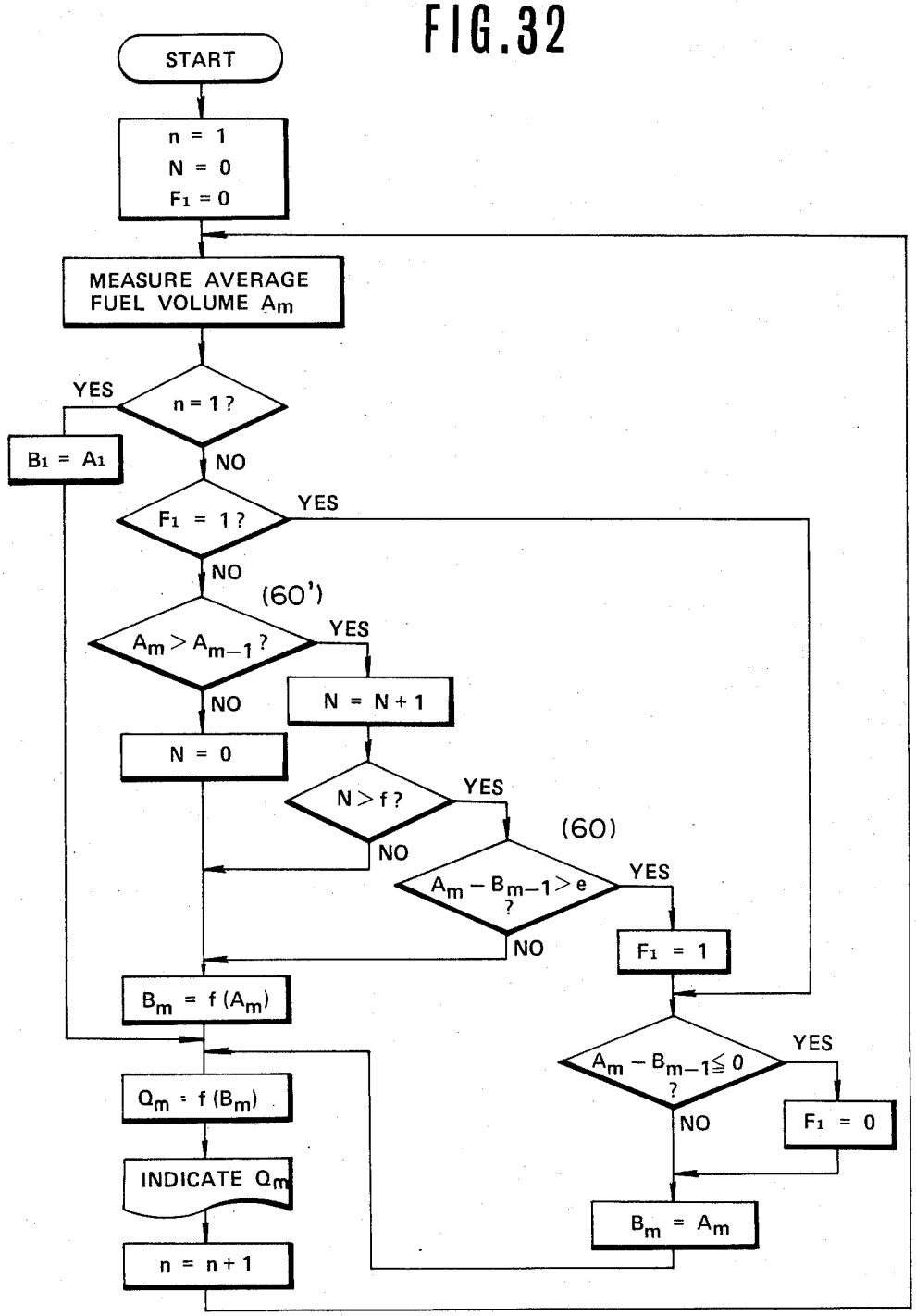
FIG. 32 is a flowchart showing a system control program used for the microcomputer of a thirteenth embodiment of the fuel volume measuring system for an automotive vehicle according to the present invention, in which the fact that the vehicle is being refueled is determined by comparing the current simply-averaged fuel volume data signal $A_m$ with the preceding simply-averaged fuel volume data signal $A_{m-1}$, by counting the number of times that $A_m$ exceeds $A_{m-1}$, and further by comparing the difference between the current simply-averaged fuel volume data signal $A_m$ and the preceding weight-averaged fuel volume signal $B_{m-1}$ with a predetermined value e.

FIG. 32 is a flowchart used for a thirteenth embodiment of the fuel volume measuring system according to the present invention. This flowchart is also executed by the microcomputer shown in FIG. 28.

The feature of this thirteenth embodiment is to determine that the vehicle is being refueled when the current average fuel volume data $A_m$ exceeds the preceding averaged fuel volume data $A_{m-1}$ more than predetermined times f and additionally when the current averaged fuel volume data $A_m$ exceeds the preceding weight-averaged fuel volume data $B_{m-1}$ by a value e. In other words, this thirteenth embodiment shown in FIG. 32 is a combined embodiment of the tenth embodiment shown in FIG. 29 and the twelfth embodiment shown in FIG. 31.

Figure 33:
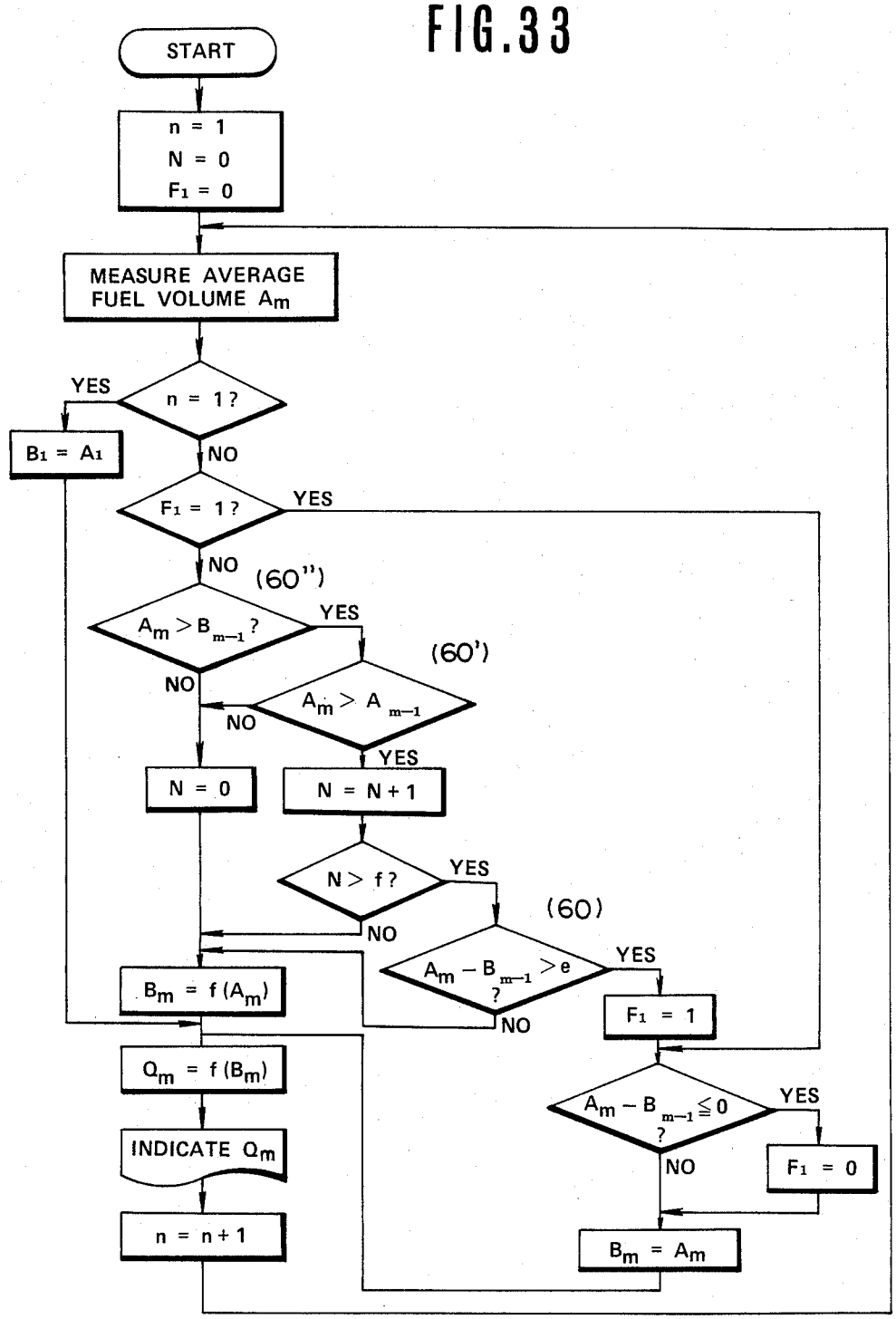
FIG. 33 is a flowchart showing a system control program used for the microcomputer of a fourteenth embodiment of the fuel volume measuring system for an automotive vehicle according to the present invention, in which the fact that the vehicle is being refueled is determined by comparing the current simply-averaged fuel volume data signal $A_m$ with the preceding weight-averaged fuel volume signal $B_{m-1}$, by comparing the current simply-averaged fuel volume data signal $A_m$ with the preceding data signal $A_{m-1}$, by counting the number of times that $A_m$ exceeds $A_{m-1}$ with a predetermined value f, and further by comparing the difference between $A_m$ and $B_{m-1}$ with a predetermined value e.

FIG. 33 is a flowchart used for a fourteenth embodiment of the fuel volume measuring system according to the present invention. This flowchart is also executed by the microcomputer shown in FIG. 28.

The feature of this fourteenth embodiment is to determine that the vehicle being refueled when the current average fuel volume data $A_m$ exceeds the preceding weight-averaged fuel volume data $B_{m-1}$, when the current average fuel volume data $A_m$ exceeds the preceding averaged fuel volume data $A_{m-1}$ more than predetermined times f, and additionally when the current averaged fuel volume data $A_m$ exceeds the preceding weight-averaged fuel volume data $B_{m-1}$ by a value e. In other words, this fourteenth embodiment shown in FIG. 33 is an embodiment obtained by adding the step (60") to the thirteenth embodiment shown in FIG. 32.

Figure 34:
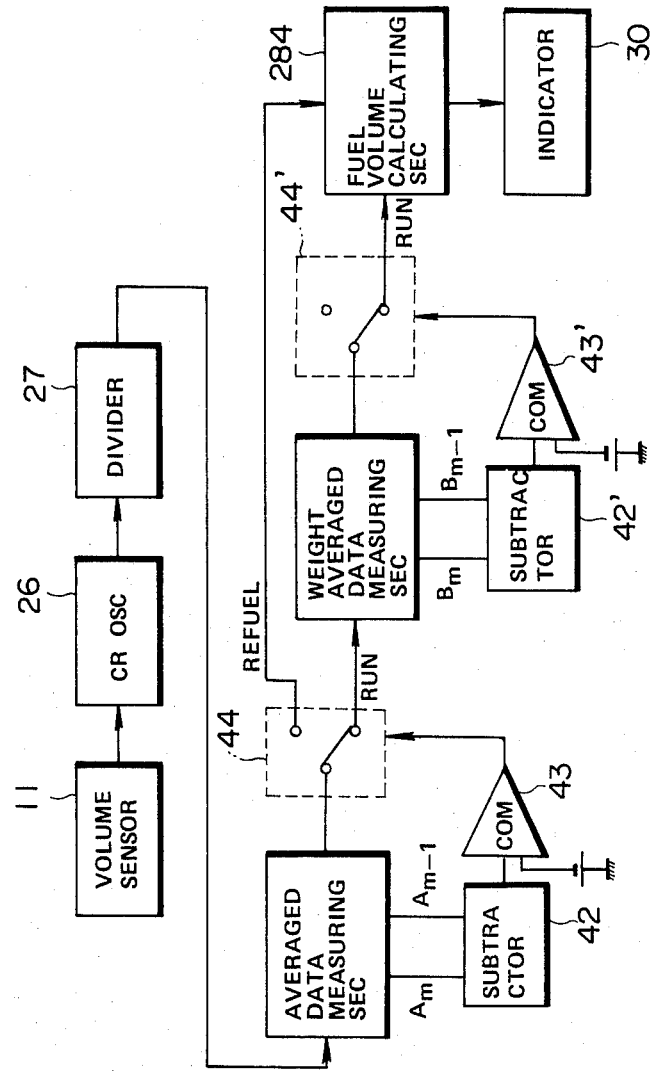
FIG. 34 is a schematic block diagram showing a system configuration of a fifteenth embodiment of the fuel volume measuring system for an automotive vehicle according to the present invention, in which the refueling state can be detected by comparing the current data signals $A_m$ and $B_m$ indicative of fuel volume with the preceding data signals $A_{m-1}$ and $B_{m-1}$ indicative of fuel volume.

FIG. 34 shows a schematic block diagram of a fifteenth embodiment of the fuel volume measuring system for an automotive vehicle according to the present invention. FIG. 35 is a flowchart showing the processing steps of this fifteenth embodiment made up of a microcomputer.

In FIG. 34, the fuel volume within a fuel tank is detected by the volume sensor 11 in dependence upon the change in the electrostatic capacity formed between the electrode plates provided for the sensor 11. The CR oscillator 26 changes the frequency thereof according to the electrostatic capacity, that is, the fuel level or fuel volume. The divider 27 divides the pulse signal representative of fuel volume to approximate or round up or down the CR oscillator pulse signal to a predetermined frequency. The averaged data measuring section 281 counts the number of the divided pulse signals to obtain an averaged data $A_m$ in accordance with the counting time interval. The above-mentioned elements or sections are already described hereinabove.

A subtractor 42 subtracts the preceding averaged data $A_{m-1}$ from the current averaged data $A_m$ and outputs the subtracted result $(A_m - A_{m-1})$ to a first comparator 43. The first comparator 43 compares the subtracted result $(A_m - A_{m-1})$ with a predetermined value (e.g. a value equivalent to two liters). When the subtracted result $(A_m - A_{m-1})$ is greater than this value 2, since this indicates that the vehicle is being refueled, the first comparator 43 outputs a signal to a selector 44 to connect the averaged data measuring section 281 to the fuel volume calculating section 284 directly. On the other hand, when the subtracted result $(A_m - A_{m-1})$ is smaller or equal to the value 2, since this indicates that the vehicle is not being refueled, that is, the vehicle is running, the first comparator 43 outputs no signal to connect the averaged data measuring section 281 to the weight-averaged data measuring sectio 283. Therefore, on the basis of the averaged data $A_m$, the weight-averaged data $B_m$ is further obtained by the weight-averaged data measuring section 283.

Next, the second comparator 43' compares the current weight-averaged data $B_m$ with the preceding weight-averaged data $B_{m-1}$. When $B_m$ is greater than $B_{m-1}$, since this indicates that the vehicle is being refueled, outputs a signal to an inhibitor 44' to disconnect the weight-averaged data measuring section 283 from the fuel volume calculating section 284, so that during refueling the fuel volume is not calculated on the basis of the weight-averaged data $B_m$ but calculated on the basis of the averaged data $A_m$ at the succeeding measuring cycle.

In FIG. 35, when the control program starts, the cycle count value n is set to 1 at the step (50). Next, the down-counter is set to a predetermined value indicative of an averaging time interval at the step (1) and the up-counter is reset to zero at the step (2). The value of the down-counter is sequentially checked at the step (3) and when the value reaches zero, the value $A_1$ of the up counter is stored in the averaged data register at the step (4). At the step (54), since the cycle count valve n is 1, the control advances to the step (55), at which the value $A_1$ is set as a first weight-averaged data $B_1$. On the basis of this first data $B_1$, the first fuel volume data $Q_1$ is calculated in accordance with the expression $Q_1 = \{(B_1 - B)/B\}N$ in the step (56). The calculated first fuel volume data $Q_1$ is indicated at the step (9) and the cycle count value is incremented to 2 at the step (58).

The program control returns from the step (58) to the step (54), through the steps (1), (2), (3) and (4). Here, since n is not 1 and 2, the control advances to the step (60), in which the difference btween the second averaged value $A_2$ and the first averaged value $A_1$ is compared. In the step (60'), if the difference $(A_2-A_1)$ is greater than two liters, since this indicates that the vehicle is being refueled, the control advances to the step (70), at which the second averaged data $A_2$ is set as the second weight-averaged data $B_2$. Thereafter, the second fuel volume $Q_2$ is calculated on the basis of this data $B_2$ or $A_2$ while the vehicle is being refueled.

On the other hand, in the step (60') when the difference $(A_1-A_2)$ is equal to or smaller than two liters, since this indicates that the vehicle is not being refueled, that is, the vehicle is running, the control advances to the step (61), at which the second weight-averaged data $B_2$ is calculated in accordance with the expression $B=(2^p-\frac{1}{2}^p)B_1+(\frac{1}{2}^p)A_2$. In the step (71), the second weight-averaged data $B_2$ is compared with the first weight-averaged value $B_1$. When $B_2$ is equal to or smaller than $B_1$, since this indicates that the vehicle is not being refueled, that is, the vehicle is running, the control advances to the step (56), in which the second fuel volume data $Q_2$ is calculated in accordance with the expression $Q_2=\{(B_2-B)/B\}N$. Thereafter, the calculated fuel volume data $Q_2$ is displayed at the step (58).

On the other hand, in the step (71), when $B_2$ is greater than $B_1$, since this indicates that the vehicle is being refueled, the control returns to the step (1) again, without calculating the weight-averaged data $B_2$.

As described above, in the fifteenth embodiment, the vehicle is determined to be being refueled, when the current averaged data $A_m$ is two liters or more greater than the preceding averaged data $A_{m-1}$ during a one measuring cycle and further when the current weight-averaged data $B_m$ is greater than the preceding weight-averaged data $B_{m-1}$.

Further, in this embodiment, it is also possible to compare the current calculated fuel volume data $Q_m$ with the preceding calculated fuel volume data $Q_{m-1}$ in order to determine that the vehicle is being refueled.

The preferred embodiments from the tenth (FIG. 29) to the fifteenth (FIG. 35) have been described in order to explain the method of determining that the vehicle is being refueled on the basis of the fact that the current data indicative of fuel volume is necessarily greater than the preceding data indicative of fuel volume, as long as the vehicle is being refueled.

Therefore, as the data indicative of fuel volume, it is possible to select any one of or any two or three combinations of the averaged data $A_m$, the weight-averaged data $B_m$ and the calculated fuel volume data $Q_m$.

Since various embodiments have been described hereinabove, only the feature of each embodiment is summarized below, where $A_m$ denotes simply-averaged data, $B_m$ denotes weight-averaged data, $C_m$ denotes moving-averaged data, $Q_m$ denotes fuel volume data.

(1) 1st embodiment shown in FIGS. 7, 8, 9, and 10: If vehicle speed=0, $Q_m$ is calculated on $A_m$. If vehicle speed≠0, $Q_m$ is calculated on $B_m$.

(2) 2nd embodiment shown in FIGS. 12 and 13: In 1st embodiment, if $|A_m-B_{m-1}|\geq a$, $A_m$ is eliminated.

(3) 3rd embodiment shown in FIGS. 16 and 17: In 2nd embodiment, if $|A_m-B_{m-1}|\geq a$, $A_m$ is corrected as $A_m\pm b$.

(4) 4th embodiment shown in FIGS. 18 and 19: In 2nd embodiment, if $|A_m-B_{m-1}|\geq a$, $A_m$ is eliminated and the allowable range is controlled as $C\pm b$.

(5) 5th embodiment shown in FIGS. 20 and 21: In 3rd embodiment, if $|A_m-B_{m-1}|\geq a$, $A_m$ is corrected as $A_m\pm b$ and the allowable range is controlled as $C\pm b$.

(6) 6th embodiment shown in FIGS. 22(A) and 23: If vehicle speed=0, $Q_m$ is calculated on $A_m$. If vehicle speed≠0, $Q_m$ is calculated on $B_m$ only when $B_m\leq B_{m-1}$.

(7) 7th embodiment shown in FIGS. 22(A) and 24: If vehicle speed=0, $Q_m$ is calculated on $A_m$. If vehicle speed≠0, $Q_m$ is calculated on $C_m$ only when $C_m\leq C_{m-1}$.

(8) 8th embodiment shown in FIGS. 22(B) and 25: If vehicle speed=0, $Q_m$ is calculated on $A_m$. If vehicle speed≠0, $Q_m$ is calculated on $B_m$ only when $Q_m\leq Q_{m-1}$.

(9) 9th embodiment shown in FIGS. 22(B) and 26: If vehicle speed=0, $Q_m$ is calculated on $C_m$. If vehicle speed≠0, $Q_m$ is calculated on $C_m$ only when $Q_m\leq Q_{m-1}$.

(10) 10th embodiment shown in FIGS. 27, 28, and 29: If $(A_m-B_{m-1})\leq e$ (run) $Q_m$ calculated on $B_m$. If $(A_m-B_{m-1})>e$ (refuel), $Q_m$ is calculated on $A_m$.

(11) 11th embodiment shown in FIG. 30: In 10th embodiment, if $(A_m-B_{m-1})>e$, N times (refuel), $Q_m$ is calculated on $A_m$.

(12) 12th embodiment shown in FIG. 31: If $A_m\leq A_{m-1}$ (run), $Q_m$ is calculated on $B_m$. If $A_m>A_{m-1}$, N times (refule), $Q_m$ is calculated on $A_m$.

(13) 13th embodiment shown in FIG. 32: If $A_m\leq A_{m-1}$ (run), $Q_m$ is calculated on $B_m$. If $A_m>A_{m-1}$, N times and if $(A_m-B_{m-1})>e$ (refuel), $Q_m$ is calculated on $A_m$.

(14) 14th embodiment shown in FIG. 33: If $A_m\leq B_{m-1}$ (run), $Q_m$ is calculated on $B_m$. If $A_m>B_{m-1}$, if $A_m>A_{m-1}$, N times and if $(A_m-B_{m-1})>e$ (refuel), $Q_m$ is calculated on $A_m$.

(15) 15th embodiment shown in FIGS. 34 and 35: If $A_m-A_{m-1}\leq 2$ and $B_m\leq B_{m-1}$ (run), $Q_m$ is calculated on $B_m$. If $A_m-A_{m-1}>2$ (refuel), $Q_m$ is calculated on $A_m$.

Further, in the above-mentioned embodiments, the function of p-th power of 2 is used for the factor to determine the first weight value $W_1$ and the second weight value $W_2$ for facilitating the calculations through a microcomputer; however, without limiting these weight values $W_1$ and $W_2$ to this value, it is of course possible to preset other optimum numerical power values (p) by configuring an independent hardware calculating circuit. In such cases, it goes without saying that the first weight value $W_1$ and the second weight value $W_2$ must be as follows:

$0<W_1<1$ $0<W_2<1$ $W_1+W_2=1$ $W_1>W_2$

Further, in the above-mentioned embodiments, a fuel volume sensor, a CR oscillator, a divider and an averaged data measuring section are employed as the means for generating the fuel volume data signals; however, without limiting the fuel volume data generating means to these elements as described above, it is of course possible to use a float-type resistance potentiometer and an A/D converter, which are both widely used for the conventional fuel volume measuring apparatus.

Further, in the above-mentioned embodiments (first to ninth) a vehicle speed sensor is employed as a means for detecting whether the automotive vehicle is running or not, it is of course possible to determine this situation instead by detecting an output signal from an ignition switch.

Further, in the above-mentioned embodiments (first to ninth), a vehicle speed sensor is utilized for directly calculating the fuel volume on the basis of the averaged fuel volume data $A_m$, without calculating the weight-averaged fuel volume data $B_m$, in order to improve the indication response speed. However, it is of course possible to omit this vehicle speed sensor. In this case, the fuel volume is indicated at a relatively slow response speed because the weight-averaged data $B_m$ are calculated even when the vehicle is being refueled.

Further, in the above-mentioned embodiments, a microprocessor has been used and software has been processed, it is of course possible to implement the same functions by the use of independent hardware logical circuits.

Further, in the above-mentioned embodiments, the averaged data $A_m$ has been obtained on the basis of the divided pulses in the steps (1) to (4), it is of course possible to set Z to 1; that is, to sequentially sample the period of each divided pulse and process these sampled periods into weighted-average values.

As described above, in kthe fuel volume measuring system for an automotive vehicle according to the present invention, since the fuel volume detection signals are simply averaged during a relatively-short averaging time period at regular time intervals when the vehicle is being refueled and additionally weight-averaged or moving-averaged at regular time intervals when the vehicle is running, it is possible to indicate fuel volume quickly and accurately at high response speed when the vehicle is being refueled and simultaneously to minimize the fluctuations or flickering of fuel volume indication when the vehicle is running and therefore the fuel level within the fuel tank surges violently.

Further, in the embodiments from tenth to fifteenth, since no speed sensor is provided and the vehicle refueling condition, is detected on the basis of an increase in fuel volume, it is possible to quickly and accurately indicate fuel volume indication regardless of the vehicle speed or the ignition key position.

It will be understood by those skilled in the art that the foregoing description is in terms of a preferred embodiment of the present invention wherein various changes and modifications may be made without departing from the spirit and scope of the invention, as set forth in the appended claims.

What is claimed is:

1. A fuel volume measuring system for an automotive vehicle provided with a fuel tank, which comprises:
    fuel volume sensing means for repeatedly outputting a fuel volume detection signal $D_m$ corresponding to fuel volume within the fuel tank at regular time intervals;
    first averaging means responsive to said fuel volume sensing means for averaging the fuel volume detection signal and outputting a first averaged fuel voulme data signal $A_m$;
    second averaging means responsive to said first averaging means for further averaging the averaged fuel volume data signal $A_m$ and outputting a second averaged fuel volume data signal $B_m$;
    fuel volume calculating means for calculating a fuel volume on the basis of an effective averaged fuel volume data signal and outputting a fuel volume data signal $Q_m$;
    vehicle speed determining means for determining vehicle speed and causing either said first averaged fuel volume data signal $A_m$ or said second averaged fuel volume data signal $B_m$ to be provided as said effective averaged fuel volume data signal in response to said vehicle speed;
    indicator means responsive to said fuel volume calculating means for indicating a fuel volume on the basis of the fuel volume data signal $Q_m$,
    whereby the fuel volume data signal $Q_m$ is caluated by said first and second averaging means for suppression of fluctuations of the fuel volume indication.

2. A fuel volume measuring system for an automotive vehicle as set forth in claim 1, which further comprises abnormal-data eliminating means responsive to said first averaging means and said second averaging means for eliminating the first averaged fuel volume data signal $A_m$ applied from said first averaging means to said second averaging means, when the absolute difference value $|A_m - B_{m-1}|$ between the current first averaged fuel volume data signal $A_m$ and the preceding second averaged fuel volume data signal $B_{m-1}$ is equal to or greater than a predetermined value a,
    whereby the abnormal first averaged fuel volume data signal $A_m$ can be eliminated before calculating the second averaged fuel volume data signal $B_m$.

3. A fuel volume measuring system for an automotive vehicle as set forth in claim 2, which further comprises allowable rang controlling means responsive to said abnormal data eliminating means for controlling a predetermined allowable range c in such a way that when the absolute difference value $|A_m - B_{m-1}|$ between the current first averaged fuel volume data signal $A_m$ and the preceding second averaged fuel volume data signal $B_{m-1}$ is greater than the allowable range c, the predetermined allowable range c is stepwise increased by a predetermined value b until the absolute difference value between the two data signals $A_m$ and $B_{m-1}$ becomes equal to or smaller than corrected and increased allowable range c and when the absolute difference value $|A_m - B_{m-1}|$ between the two data signals $A_m$ and $B_{m-1}$ is equal to or smaller than the corrected and increased allowable range c, after calculating the second averaged fuel volume data signal $B_m$, the increased allowable range c is stepwise decreased by the same predetermined value b until the corrected allowable range c becomes the original predetermined allowable range c,
    whereby the allowable range for the first averaged fuel volume data signal $A_m$ can be controlled by adding or subtracting a predetermined value to or from the allowable range.

4. A fuel volume measuring system for an automotive vehicle as set forth in claim 1, which further comprises abnormal-data correcting means responsive to said first averaging means and said second averaging means for correcting the first averaged fuel volume data signal $A_m$ applied from said first averaging means to said second averaging means, when the absolute difference value $|A_m-B_{m-1}|$ between the current first averaged fuel volume data signal $A_m$ and the preceding second averaged fuel volume data signal $B_{m-1}$ is equal to or greater than a predetermined allowable range a, in such a way that when the current first averaged fuel volume data signal $A_m$ is smaller than the preceding second averaged fuel volume data signal $B_{m-1}$, the current data signal $A_m$ is corrected by subtracting a predetermined value b from the preceding second averaged fuel volume data signal $B_{m-1}$ and when the current first averaged fuel volume data signal $A_m$ is equal to or greater than the preceding second averaged fuel volume data signal $B_{m-1}$, the current data signal $A_m$ is corected by adding a predetermined value b to the preceding second averaged fuel volume data signal $B_{m-1}$, whereby the abnormal first averaged fuel volume data signal $A_m$ can be corrected by adding or subtracting a predetermined value to or from the preceding second averaged fuel volume data signal $B_{m-1}$.

5. A fuel volume measuring system for an automotive vehicle as set forth in claim 4, which further comprises an allowable range controlling means responsive to said abnormal data correcting means for controlling the allowable range a in such a way that when the absolute difference value $|A_m-B_{m-1}|$ between the current first averaged fuel volume data signal $A_m$ and the preceding second averaged fuel volume data signal $B_{m-1}$ is greater than a predetermined range c, after adding or subtracting a predetermined value to or from the preceding second averaged data signal $B_{m-1}$ and calculating the second averaged fuel volume data signal $B_m$, the predetermined allowable range c is stepwise increased by a predetermined value b until the absolute difference value between the two data signals $A_m$ and $B_{m-1}$ is equal to or smaller than the corrected allowable range c and when the absolute difference value $|A_m-B_{m-1}|$ between the two data signals $A_m$ and $B_{m-1}$ is equal to or smaller than the corrected and increased allowable range c, after calculating the second averaged fuel volume data signal $B_m$, the increased allowable range c is stepwise decreased by the same predetermined value b until the range c becomes the original predetermined allowable range a, whereby an abnormal first averaged fuel volume data signal $A_m$ can be corrected by adding or substracting a predetermined value to or from the preceding second averaged data $B_{m-1}$ and additionally the allowable range for the first averaged fuel volume data signal $A_m$ can be controlled by adding or subtracting a predetermined value to or from the allowable range.

6. A fuel volume measuring system for an automotive vehicle as set forth in claim 1, which further comprises abnormal data eliminating means responsive to only said second averaging means for eliminating the second averaged fuel volume data signal $B_m$ applied from said second averaging means to said fuel volume calculating means, when the current second averaged fuel volume data signal $B_m$ is greater than the preceding second averaged fuel volume data signal $B_{m-1}$, whereby the abnormal second averaged fuel volume data signal $B_m$ can be eliminated before calculating the fuel volume data signal $Q_m$.

7. A fuel volume measuring system for an automotive vehicle as set forth in claim 1, which further comprises abnormal data eliminating means responsive to said fuel volume calculating means for eliminating the fuel volume data signal $Q_m$ applied from said fuel volume calculating means to said indicator means, when the current fuel volume data signal $Q_m$ is greater than the preceding fuel volume data signal $Q_{m-1}$, whereby the abnormal fuel volume data signal $Q_m$ can be eliminated before indicating the fuel volume.

8. A fuel volume measuring system for an automotive vehicle as set forth in claim 1, wherein said vehicle speed determining means comprises:
(a) vehicle speed sensing means for detecting vehicle speeds; and
(b) running determination means responsive to said first averaging means and said vehicle speed sensor for supplying the first averaged fuel volume data signal $A_m$ to said second averaging means when said vehicle speed sensor detects that vehicle speed is not zero but directly to said fuel volume calculating means without obtaining the second averaged fuel volume data signal $B_m$ when said vehicle speed senser detects that vehicle speed is zero.

9. A fuel volume measuring system for an automotive vehicle as set forth in claim 1, wherein said first averaging means calculates the first averaged fuel volume data signal $A_m$ on the basis of a fuel volume detection signal $D_m$ and in accordance with the following simply-averaging expression:

$$A_m = \sum_{K=1}^{m} D_K/m$$

10. A fuel volume measuring system for an automotive vehicle as set forth in claim 1, wherein said second averaging means calculates the second averaged fuel volume data signal $B_m$ on the basis of the first averaged fuel volume data signal $A_m$ and in accordance with the following weight-averaging expression:

$$B_m=((2^p-1)/2^p)B_{m-1}+(\tfrac{1}{2^p})A_{m+1}$$

where p denotes a power.

11. A fuel volume measuring system for an automotive vehicle as set forth in claim 1, wherein said second averaging means calculates the second averaged fuel volume data signal $B_m$ on the basis of the first averaged fuel volume data signal $A_m$ and in accordance with the following moving-averaging expression.

$$B_m = \sum_{k=1}^{m} A_{k-1}/m$$

12. A fuel volume measuring system for an automotive vehicle as set forth in claim 1, wherein said fuel volume sensing means comprises:
(a) a volume sensor disposed within the fuel tank and provided with three electrode plates for detecting the fuel volume within the fuel tank in dependence upon a change in fuel level, said three electrode plates generating an electrostatic capacity which varies according to the change in the fuel level;
(b) a CR oscillator responsive to said volume sensor for outputting an oscillating signal the frequency of which varies in accordance with the electrostatic capacity generated by said volume sensor; and (c) a divider responsive to said CR oscillator for dividing the oscillation signal from said CR oscillator and outputting a fuel volume detection signal.

13. A fuel volume measuring system for an automotive vehicle provided with a fuel tank which comprises:
 (a) fuel volume measuring means for outputting fuel volume detection signals corresponding to fuel volume within the fuel tank at regular time intervals;
 (b) first averaging means responsive to said fuel volume sensing means for averaging the fuel volume detection signal and outputting a first averaged volume data signal $A_m$;
 (c) second averaging means responsive to said first averaging means for further averaging the averaged fuel volume data signal $A_m$ and outputting a second averaged fuel volume data signal $B_m$;
 (d) subtracting means responsive to said first averaging means and said second averaging means for subtracting the preceding second averaged fuel volume data signal $B_{m-1}$ from the current first averaged fuel volume data signal $A_m$ and outputting a subtracted data signal;
 (e) comparating means responsive to said subtracting means for comparing the subtracted data signal with a predetermined value inclusive of zero and outputting a refuel command signal when the subtracted result is greater than said predetermined value and a vehicle-run command signal when the subtracted result is equal to or smaller than the predetermined value:
 (f) selecting means responsive to said first averaging means, second averaging means and said comparating means for selecting the first averaging means in response to the refuel command signal from said comparating means but selecting the second averaging means in response to the vehicle-run command signal;
 (g) fuel volume calculating means responsive to said selecting means for calculating a fuel volume on the basis of the first averaged fuel volume data signal $A_m$ when said selecting means selects said first averaging means and on the basis of the second averaged fuel volume data signal $B_m$ when said selecting means selects said second averaging means and for outputting a fuel volume signal $Q_m$; and
 (h) indicator means responsive to said fuel volume calculating means for indicating a fuel volume on the basis of the fuel volume signal $Q_m$,
 whereby the fuel volume can be calculated on the basis of the first averaged fuel volume data signal $A_m$ when the current first averaged fuel volume data signal $A_m$ is greater than the preceding second averaged fuel volume data signal $B_{m-1}$ but on the basis of the second averaged fuel volume data signal $B_m$ when the $A_m$ is equal to or smaller than $B_{m-1}$,
 and therefore a vehicle refueling condition can be detected on the basis of the difference between $A_m$ and $B_{m-1}$.

14. A fuel volume measuring system for an automotive vehicle provided with a fuel tank which comprises:
 (a) fuel volume sensing means for outputting fuel volume detection signals corresponding to fuel volume within the fuel tank at regular time intervals;
 (b) first averaging means responsive to said fuel volume sensing means for averaging the fuel volume detection signal and outputting a first current averaged volume data signal $A_m$;
 (c) first subtracting means responsive to said first averaging means for subtracting a preceding first averaged fuel volume data signal $A_{m-1}$ from the current first averaged fuel volume data signal $A_m$ and outputting a subtracted data signal;
 (d) first comparing means responsive to said first subtracting means for comparing the subtracted data signal with a predetermined value inclusive of zero and outputting a refuel command signal when the subtracted result is greater than a predetermined value and a vehicle-run command signal when the subtracted result is equal to or smaller than the predetermined value;
 (e) first selecting means responsive to said first averaging means and said first comparing means for connecting the first averaging means to a fuel volume calculating means in response to the refuel command signal from said first comparator but to a second averaging means in response to the vehicle-run command signal from said first comparator;
 (f) said second averaging means being responsive to said first selecting means for further averaging the averaged fuel volume data signal $A_m$ and outputting a second current averaged fuel volume data signal $B_m$, when said first selecting means connects said first averaging means thereto in response to the vehicle-run command signal from said first comparator;
 (g) second subtracting means responsive to second averaging means for subtracting a preceding second averaged fuel volume data signal $B_{m-1}$ from the current second averaged fuel volume data signal $B_m$ and outputting a second subtracted data signal;
 (h) second comparing means responsive to said second subtracting means for comparing the second subtracted data signal with a second predetermined value inclusive of zero and outputting a vehicle-run command signal when the second subtracted result exceeds said second predetermined value and an inhibit command signal when the second subtracted result is equal to or smaller than said second predetermined value;
 (i) second selecting means responsive to said second averaging means and said second comparating means for connecting said second averaging means to said fuel volume calculating means in response to the vehicle-run command signal from said second comparing means but for inhibiting the second averaged fuel volume data signal $B_m$ from being supplied to the fuel volume calculating means in response to said inhibit signal;
 (j) said fuel volume calculating means being responsive to said second selecting means for calculating a fuel volume signal $Q_m$ on the basis of the second averaged fuel volume data signal $B_m$ when said selecting means connects said first averaging means to said second averaging means and additionally when said second selecting means connects said second averaging means to said fuel volume calculting means but on the basis of the first averaged fuel volume data signal $A_m$ when said first selecting means directly connects said first averaging means to said fuel volume calculating means, and outputting a fuel volume signal $Q_m$; and (k) indicator means responsive to said fuel volume calculating means for indicating a fuel volume on the basis of the fuel volume signal $Q_m$, whereby the fuel volume can be calculated on the basis of the first averaged fuel volume data signal $A_m$ when the current first averaged fuel volume data signal $A_m$ is greater than the preceding first averaged fuel volume data signal $A_{m-1}$ and additionally when the current second averaged fuel volume data signal $B_m$ is greater than the preceding second averaged fuel volume data signal $B_{m-1}$ but on the basis of the second averaged fuel volume data signal $B_m$ when $A_m$ is equal to or smaller than $A_{m-1}$ and when $B_m$ is equal to or smaller than $B_{m-1}$, and therefore the vehicle refueling condition can be detected on the basis of differences between $A_m$ and $B_{m-1}$ and between $B_m$ and $B_{m-1}$.

15. A fuel volume measuring system for an automotive vehicle provided with a fuel tank, which comprises:

(a) a volume sensor disposed within the fuel tank and provided with three electrode plates for detecting the fuel volume within the fuel tank in dependence upon the change in fuel level, said three electrode plates generating the electrostatic capacity varied according to the change in the fuel level;

(b) a CR oscillator responsive to said volume sensor for outputting an oscillating signal the frequency of which varies in accordance with the electrostatic capacity generated by said volume sensor;

(c) a divider responsive to said CR oscillator for dividing the oscillation signal from said CR oscillator and outputting a fuel volume detection signal;

(d) a vehicle speed sensor for detecting vehicle speeds;

(e) a microcomputer including an input interface, central processing unit, a read-only memory, a random access memory, a clock generator, an output interface, etc. and responsive to said CR divider and said vehicle speed sensor, for averaging the fuel volume detection signal to obtain a simply averaged fuel volume data signal $A_m$, further weight-averaging the simply-averaged fuel volume data signal $A_m$ to obtain a weight-averaged fuel volume data signal $B_m$ when the vehicle speed is not zero, and calculating a fuel volume data signal $Q_m$ on the basis of the weight-averaged fuel volume data signal $B_m$ when the vehicle speed is not zero but on the basis of the simply-averaged fuel volume data signal $A_m$ when the vehicle speed is zero; and (f) an indicator responsive to said microcomputer for indicating a fuel volume on the basis of the calculated fuel volume data signal $Q_m$, whereby the fuel volume data signal $Q_m$ is calculated on the basis of the weight-averaged fuel volume data signal $B_m$ for suppression of fluctuations of the fuel volume indication when the vehicle speed is not zero.

16. A fuel volume measuring system for an automotive vehicle as set forth in claim 15, wherein said microcomputer further comprises the functions of determining whether or not the absolute difference value between the current simply-averaged fuel volume data signal $A_m$ and the preceding weight-averaged fuel volume data signal $B_{m-1}$ is equal to or greater than a predetermined value a and of eliminating the simply-averaged fuel volume data signal $A_m$ when the absolute difference value between $A_m$ and $B_{m-1}$ is equal to or greater than the predetermined value a beofre calculating the weight-averaged fuel volume data signal $B_m$ on the basis of the simply-averaged fuel volume data signal $A_m$, whereby the abnormal simply-averaged fuel volume data signal $A_m$ can be eliminated before calculating the weight-averaged fuel volume data signal $B_m$.

17. A fuel volume measuring system for an automotive vehicle as set forth in claim 15, wherein said microcomputer further comprises the functions of determining whether or not the absolute difference value between the current simply-averaged fuel volume data signal $A_m$ and the preceding weight-averaged fuel volume data signal $B_{m-1}$ is equal to or greater than a predetermined value a and of correcting the simply-averaged fuel volume data signal $A_m$, when the absolute difference value between $A_m$ and $B_{m-1}$ is equal to or greater than the value a, by subtracting a predetermined value b from the preceding weight-averaged fuel volume data signal $B_{m-1}$ when the current simply-averaged fuel volume data signal $A_m$ is smaller than the preceding weight-averaged fuel volume data signal $B_{m-1}$ and by adding the value b to the preceding weight-averaged fuel volume data signal $B_{m-1}$ when $A_m$ is greater than $B_{m-1}$, before calculating the weight-averaged fuel volume data signal $B_m$, whereby the abnormal simply-averaged fuel volume data signal $A_m$ can be corrected by adding or subtracting a predetermined value to or from the preceding second averaged fuel volume data signal $B_{m-1}$.

18. A fuel volume measuring system for an automotive vehicle as set forth in claim 15, wherein said microcomputer further comprises the functions of determining whether or not the absolute difference value between the current simply-averaged fuel volume data signal $A_m$ and the preceding weight-averaged fuel volume data signal $B_{m-1}$ is equal to or smaller than a allowable range c and of controlling the allowable range c by stepwise increasing the allowable range c by a predetermined value b until the absolute difference value between the two data signals $A_m$ and $B_{m-1}$ becomes equal to or smaller than the corrected allowable range c when the absolute difference value between the two data signals $A_m$ and $B_{m-1}$ is greater than the predetermined allowable range c and by stepwise decreasing the allowable range c by a predetermined value b until the corrected allowable range c becomes the original predetermined allowable range c, after calculating the weight-averaged fuel volume data signal $B_m$, when the absolute difference value between the two data signals $A_m$ and $B_{m-1}$ becomes equal to or smaller than the corrected and increased allowable range c, whereby the allowable range for the simply-averaged fuel volume data signal $A_m$ can be controlled by adding or subtracting a predetermined value to or from the allowable range.

19. A fuel volume measuring system for an automotive vehicle as set forth in claim 15, wherein said microcomputer further comprises the functions of determining whether or not the absolute difference value between the current simply-averaged fuel volume data signal $A_m$ and the preceding weight-averaged fuel volume data signal $B_{m-1}$ is equal to or smaller than a predetermined value c, of correcting the simply-averaged fuel volume data signal $A_m$, when the absolute difference value between $A_m$ and $B_{m-1}$ is greater than the predetermined allowable range c, by adding or subtracting a predetermined value b to or from the preceding weight-averaged fuel volume data signal $B_{m-1}$, and of controlling the allowable range c by stepwise increasing the allowable range c by a predetermined value b until the absolute difference value between the two data signals $A_m$ and $B_{m-1}$ becomes equal to or smaller than the corrected allowable range c, after calculating the weight-averaged fuel volume data signal $B_m$ when the absolute difference value between the two data signals $A_m$ and $B_{m-1}$ is greater than the predetermined allowable range c and by stepwise decreasing the increased allowable range c by a predetermined value b until the corrected allowable range c becomes the original predetermined allowable range c, after calculating the weight-averaged fuel volume data signal $B_m$ when the absolute difference value between the two data signals $A_m$ and $B_{m-1}$ becomes equal to or smaller than the corrected and increased allowable range c, whereby an abnormal simply-averaged fuel volume data signal $A_m$ can be corrected by adding or subtracting a predetermined value to or from the preceding second averaged data $B_{m-1}$ and additionally the allowable range for the simply-averaged fuel volume data signal $A_m$ can be controlled by adding or subtracting a predetermined value to or from the allowable range.

20. A fuel volume measuring system for an automotive vehicle as set forth in claim 15, wherein said microcomputer further comprises the functions of comparing the current weight-averaged fuel volume data signal $B_m$ with the preceding weight-averaged fuel volume data signal $B_{m-1}$ and of eliminating the current data signal $B_m$ before calculating the fuel volume signal $Q_m$ when the current weight-averaged fuel volume data signal $B_m$ is greater than the preceding weight-averaged fuel volume data signal $B_{m-1}$, whereby the abnormal weight-averaged fuel volume data signal $B_m$ can be eliminated before calculating the fuel volume data signal $Q_m$.

21. A fuel volume measuring system for an automotive vehicle as set forth in claim 15, wherein said microcomputer further comprises the functions of comparing the current moving-averaged fuel volume data signal $C_m$ with the preceding moving-averaged fuel volume data signal $C_{m-1}$ and of eliminating the current data $C_m$ before calculating the fuel volume signal $C_m$ when the current moving-averaged fuel volume data signal $C_m$ is greater than the preceding moving-averaged fuel volume data signal $C_{m-1}$, whereby the abnormal moving-averaged fuel volume data signal $C_m$ can be eliminated before calculating the fuel volume signal $Q_m$.

22. A fuel volume measuring system for an automotive vehicle as set forth in claim 15, wherein said microcomputer further comprises the functions of comparing the current fuel volume signal $Q_m$ with the preceding fuel volume signal $Q_{m-1}$ and of eliminating the current data signal $Q_m$ before indicating the fuel volume when the current fuel volume signal $Q_m$ is greater than the preceding fuel volume signal $Q_{m-1}$, whereby the abnormal fuel volume signal $Q_m$ can be eliminated before indicating the fuel volume.

23. A fuel volume measuring system for an automotive vehicle provided with a fuel tank, which comprises:
(a) a volume sensor disposed within the fuel tank and provided with three electrode plates for detecting the fuel volume within the fuel tank in dependence upon the change in fuel level, said three electrode plates generating the electrostatic capacity varied according to the change in the fuel level;
(b) a CR oscillator responsive to said volume sensor for outputting an oscillating signal the frequency of which varies in accordance with the electrostatic capacity generated by said volume sensor;
(c) a divider responsive to said CR oscillator for dividing the oscillation signal from said CR oscillator and outputting a fuel volume detection signal; and
(d) a microcomputer including an input interface, central processing unit, a read-only memory, a random access memory, a clock generator, an output interface, etc., and responsive to said CR oscillator, for averaging the fuel volume detection signal to obtain a simply-averaged fuel volume data signal $A_m$, further weight-averaging the simply-averaged fuel volume data signal $A_m$ to obtain a weight-averaged fuel volume data signal $B_m$, subtracting at-least one preceding data signal $S_{m-1}$ indicative of fuel volume from at-least one current data signal $S_m$ indicative of fuel volume to obtain at-least one difference between current fuel volume data and preceding fuel volume data, comparing the at-least one obtained difference with at-least one predetermined value, calculating a fuel volume $Q_m$ on the basis of the weight-averaged fuel volume data signal $B_m$ only when the at-least one difference between the current data signal and the preceding data signal is equal to or smaller than said predetermined value, and on the basis of the simply-averaged fuel volume data signal $A_m$ when the at-least one difference between the current data signal and the preceding data signal is greater than the predetermined value, whereby a vehicle refueling condition can be detected on the basis of the difference between $S_m$ and $S_{m-1}$.

24. A fuel volume measuring system for an automotive vehicle as set forth in claim 12, wherein said microcomputer further comprises the function of counting the number of times that the at-least one difference between the current data signal indicative of fuel volume and the preceding data signal indicative of fuel volume exceeds a predetermined value f and calculating the fuel volume $Q_m$ on the basis of the weight-averaged fuel volume data signal $B_m$ when the number of times does not exceed the predetermined value f and on the basis of the simply-averaged fuel volume data signam $A_m$ when the number of times exceeds the predetermined value f.

25. A fuel volume measuring system for an automotive vehicle as set forth in claim 23, wherein said at-least one of the preceding data signal $S_{m-1}$ indicative of fuel volume is the simply-averaged fuel volume data signal $A_{m-1}$.

26. A fuel volume measuring system for an automotive vehicle as set forth in claim 23, wherein said at-least one of the preceding data signal $S_{m-1}$ indicative of fuel volume is the weight-averaged fuel volume data signal $B_{m-1}$.

27. A fuel volume measuring system for an automotive vehicle as set forth in claim 23, wherein said at-least one of the preceding data signal $S_{m-1}$ indicative of fuel volume is a moving-averaged fuel volume data signal $C_{m-1}$.

28. A fuel volume measuring system for an automotive vehicle as set forth in claim 23, wherein said at-least one of the preceding data signal $S_{m-1}$ indicative of fuel volume is the fuel volume data signal $Q_{m-1}$.

29. A fuel volume measuring system for an automotive vehicle as set forth in claim 23, wherein said at-least one of the current data signal $S_m$ indicative of fuel volume is the simply-averaged fuel volume data signal $A_m$.

30. A fuel volume measuring system for an automotive vehicle as set forth in claim 23, wherein said at-least one of the current data signal $S_m$ indicative of fuel volume is the weight-averaged fuel volume data signal $B_m$.

31. A fuel volume measuring system for an automotive vehicle as set forth in claim 23, wherein said at least one of the current data signal $S_m$ indicative of fuel volume is a moving-averaged fuel volume data signal $C_m$.

32. A fuel volume measuring system for an automotive vehicle as set forth in claim 23, wherein said at least one of the current data signal $S_m$ indicative of fuel volume is the fuel volume signal $Q_m$.

33. A method of measuring fuel volume within a fuel tank for an automotive vehicle, which comprises the following steps of:
  (a) detecting the fuel volume within the fuel tank repeatedly and outputting fuel volume detection signals corresponding thereto at regular time intervals;
  (b) simply-averaging the fuel volume detection signals and outputting simply-averaged fuel volume data signals $A_m$;
  (c) detecting vehicle speed;
  (d) if vehicle speed is zero, calculating the fuel volume data signal $Q_m$ on the basis of the simply-averaged fuel volume data signal $A_m$;
  (e) if vehicle speed is not zero, weight-averaging the simply-averaged fuel volume data signal $A_m$, outputting a weight-averaged fuel volume data signal $B_m$ and calculating the fuel volume data signal $Q_m$ on the basis of the calculated weight-averaged fuel volume data signal $B_m$; and
  (f) indicating the fuel volume in accordance with the calculated fuel volume data signal $Q_m$,
  whereby the fuel volume can be indicated on the basis of simply-averaged data signal $A_m$ when vehicle speed is zero but of weight-averaged data signal $B_m$ when vehicle speed is not zero.

34. A method of measuring fuel volume within a fuel tank for an automotive vehicle as set forth in claim 33, which further comprises the following step of:
  (a) comparing the absolute difference value between the current simply-averaged fuel volume data signal $A_m$ and the preceding weight-averaged fuel volume data signal $B_{m-1}$ with a predetermined value a;
  (b) if the absolute difference value $|A_m - B_{m-1}|$ is equal to or greater than the predetermined value a, eliminating the simply-averaged fuel volume data signal $A_m$, and
  (c) if the absolute difference value $|A_m - B_{m-1}|$ is smaller than the predetermined value a, weight-averaging the simply-averaged fuel volume data signal $A_m$ before calculating the fuel volume data signal $Q_m$,
  whereby an abnormal simply-averaged fuel volume data signal $A_m$ can be eliminated.

35. A method of measuring fuel volume within a fuel tank for an automotive vehicle as set forth in claim 33, which further comprises the following steps of:
  (a) comparing the absolute difference value between the current simply-averaged fuel volume data signal $A_m$ and the preceding weight-averaged fuel volume data signal $B_{m-1}$ with a predetermined value a;
  (b) if the absolute difference value $|A_m - B_{m-1}|$ is smaller than the predetermined value a, weight-averaging the simply-averaged fuel volume data signal $A_m$ before calculating the fuel volume signal $Q_m$:
  (c) if the absolute difference value $|A_m - B_{m-1}|$ is equal to or greater than the predetermined value a,
  (d) comparing the current simply-averaged fuel volume data signal $A_m$ with the preceding weight-averaged fuel volume data signal $B_{m-1}$;
  (e) if the current simply-averaged data signal $A_m$ is equal to or greater than the preceding weight-averaged data signal $B_{m-1}$, correcting the current simply-averaged fuel volume data signal $A_m$ by adding a predetermined value b to the preceding weight-averaged fuel volume data $B_{m-1}$ before weight-averaging the simply-averaged fuel volume data signal $A_m$; and
  (f) if the current simply-averaged data signal $A_m$ is smaller than the preceding weight-averaged data signal $B_{m-1}$, correcting the current simply-averaged fuel volume data signal $A_m$ by subtracting the predetermined value b from the preceding weight-averaged fuel volume data $B_{m-1}$, before weight-averaging the simply-averaged fuel volume data signal $A_m$;
  whereby an abnormal simply-averaged fuel volume data signal $A_m$ can be corrected.

36. A method of measuring fuel volume within a fuel tank for an automotive vehicle as set forth in claim 33, which further comprises the following steps of:
  (a) comparing the absolute difference value between the current simply-averaged fuel volume data signal $A_m$ and the preceding weight-averaged fuel volume data signal $B_{m-1}$ with a predetermined allowable range c;
  (b) if the absolute difference value $|A_m - B_{m-1}|$ is greater than the allowable range c, stepwise increasing the range c by a predetermined value b until the absolute difference value lies within the increased allowable range c before weight-averaging the simply-averaged fuel volume data signal $A_m$; and
  (c) if the absolute difference value $|A_m - B_{m-1}|$ is equal to or smaller than the allowable range c, weight averaging the simply-averaged fuel volume data signal $A_m$, and stepwise decreasing the increased allowable range c by the predetermined value b until the decreased allowable range c becomes the initial allowable range c before calculating fuel volume signal $Q_m$,
  whereby the allowable range for an abnormal simply-averaged fuel volume data signal $A_m$ can be increased or decreased.

37. A method of measuring fuel volume within a fuel tank for an automotive vehicle as set forth in claim 33, which further comprises the following steps of:
  (a) comparing the absolute difference value between the current simply-averaged fuel volume data signal $A_m$ and the preceding weight-averaged fuel volume data signal $B_{m-1}$ with a predetermined allowable range c;

(b) if the absolute difference value $|A_m-B_{m-1}|$ is greater than the allowable range c, correcting the current simply-averaged fuel volume data signal $A_m$ by adding or subtracting a predetermined value to or from the preceding weight-averaged data signal $B_{m-1}$, weight-averaging the corrected simply-averaged data signal, and stepwise increasing the allowable range c by a predetermined value b until the absolute difference value lies within the increased allowable range c before calculating the fuel volume signal $Q_m$; and (c) if the absolute difference value $|A_m-B_{m-1}|$ is equal to or smaller tha allowable range c, weight-averaging the simply-averaged fuel volume data signal $A_m$, and stepwise decreasing the allowable range c by a predetermined value b until the decreased allowable range c becomes the initial allowable range c before calculating the fuel volume data signal $Q_m$, whereby an abnormal simply-averaged fuel volume data signal $A_m$ can be corrected and further the allowable range for an abnormal simply-averaged fuel volume data signal $A_m$ can be increased or decreased.

38. A method of measuring fuel volume within a fuel tank for an automotive vehicle as set forth in claim 33, which further comprises the following steps of:

(a) comparing the current weight-averaged fuel volume data $B_m$ with the preceding weight-averaged fuel volume data $B_{m-1}$, before calculating the fuel volume data signal $Q_m$;

(b) if the current data $B_m$ exceeds the preceding data $B_{m-1}$, eliminating the current data $B_m$ before calculating the fuel volume data signal $Q_m$; *and*

(c) if the current data $B_m$ is equal to or smaller than the preceding data $B_{m-1}$, calculating the fuel volume signal $Q_m$ on the basis of the compared current weight-averaged fuel volume data $B_m$, whereby an abnormal fuel volume data signal $B_m$ can be eliminated before calculating the fuel volume signal $Q_m$.

39. A method of measuring fuel volume within a fuel tank for an automotive vehicle as set forth in claim 33, which further comprises the following steps of:

(a) comparing the current fuel volume data signal $Q_m$ with the preceding fuel volume data signal $Q_{m-1}$ before indicating the fuel volume;

(b) if the current signal $Q_m$ is greater than the preceding signal $Q_{m-1}$, eliminating the current signal $Q_m$ before indicating the fuel volume; and (c) if the current signal $Q_m$ is equal to or smaller than the preceding signal $Q_{m-1}$, indicating the fuel volume on the basis of the compared current fuel volume signal $Q_m$, whereby an abnormal fuel volume data signal $Q_m$ can be eliminated before indicating the fuel volume.

40. A method of measuring fuel volume as set forth in claim 37, which further comprises the following steps of:

(a) counting the number of times N that the difference between the current simply-averaged data signal $A_m$ and the preceding weight-averaged data signal $B_{m-1}$ becomes greater than the predetermined value e;

(b) comparing the counted number of times N with a predetermined value f;

(c) if the counted number of times is equal to or smaller than the predetermined value f, calculating the fuel volume data signal $Q_m$ on the basis of the calculated weight-averaged fuel volume data signal $B_m$; and (d) if the counted number of times N is greater than the predetermined value f, calculating the fuel volume data $Q_m$ on the basis of the simply averaged fuel volume data signal $A_m$, whereby the fuel volume can be indicated on the basis of the simply-averaged fuel volume data signal $A_m$ when the fuel volume is increasing positively.

41. A method of measuring fuel volume within a fuel tank for an automotive vehicle, which comprises the following steps of:

(a) detecting the fuel volume within the fuel tank repeatedly and outputting fuel volume detection signals corresponding thereto at regular time intervals;

(b) simply-averaging the fuel volume detection signals and outputting a simply-averaged fuel volume data signal $A_m$;

(c) weight-averaging the simply-averaged fuel volume data signal $A_m$ and outputting a weight-averaged fuel volume data signal $B_m$;

(d) comparing the current simply-averaged fuel volume data signal $A_m$ with the preceding weight-averaged fuel volume data signal $B_{m-1}$;

(e) if the difference between the current simply-averaged data signal $A_m$ and the preceding weight-averaged data signal $B_{m-1}$ is equal to or smaller than a predetermined value e, calculating the fuel volume signal $Q_m$ on the basis of the calculated weight-averaged fuel volume data signal $B_m$;

(f) if the difference between the current simply-averaged data signal $A_m$ and the preceding weight-averaged data signal $B_{m-1}$ is greater than the predetermined value e, calculating the fuel volume signal $Q_m$ on the basis of the calculated simply-averaged fuel volume data signal $A_m$; and (g) indicating the fuel volume in accordance with the calculated fuel volume data signal $Q_m$, whereby the fuel volume can be indicated on the basis of the weight-averaged fuel volume data signal $B_m$ when the fuel volume is decreasing but on the basis of the simply-averaged fuel volume data signal $A_m$ when the fuel volume is increasing.

42. A method of measuring fuel volume within a fuel tank for an automotive vehicle, which comprises the following steps of:

(a) detecting the fuel volume within the fuel tank repeatedly and outputting fuel volume detection signals corresponding thereto at regular time intervals;

(b) simply-averaging the fuel volume detection signals and outputting simply-averaged fuel volume data signal $A_m$;

(c) comparing the current simply-averaged fuel volume data signal $A_m$ with the preceding simply-averaged fuel volume data signal $A_{m-1}$;

(d) if the current simply-averaged fuel volume data signal $A_m$ is equal to or smaller than the preceding simply-averaged fuel volume data signal $A_{m-1}$, weight-averaging the simply-averaged fuel volume data signal $A_m$, outputting a weight-averaged fuel volume data signal $B_m$, and calculating the fuel volume data signal $Q_m$ on the basis of the calculated weight-averaged fuel volume data signal $B_m$;

(e) if the current simply-averaged fuel volume data signal $A_m$ is greater than the preceding simply-averaged fuel volume data signal $A_{m-1}$, calculating the fuel volume signal $Q_m$ on the basis of the calculated simply-averaged fuel volume data signal $A_m$; and (f) indicating the fuel volume in accordance with the calculated fuel volume data signal $Q_m$, whereby the fuel volume can be indicated on the basis of the weight-averaged fuel volume data signal $B_m$ when the fuel volume is decreasing, but on the basis of the simply-averaged fuel volume data signal $A_m$ when the fuel volume is increasing.

43. A method of measuring fuel volume a set forth in claim 42, which further comprises the following steps of:

(a) counting the number of times that the current simply-averaged fuel volume data signal $A_m$ is greater than the preceding simply-averaged fuel volume data signal $A_{m-1}$;

(b) comparing the counted number of times with a predetermined value f;

(c) if the counted number of times is equal to or smaller than the predetermined value f, calculating the fuel volume $Q_m$ on the basis of the calculated weight-averaged fuel volume data signal $B_m$; and (d) if the counted number of times is greater than the predetermined value f, calculating the fuel volume $Q_m$ on the basis of the simply averaged fuel volume data signal $A_m$, whereby the fuel volume can be indicated on the basis of the simply-averaged fuel volume data signal $A_m$ when the fuel volume is increasing positively.

44. A method of measuring fuel volume as set forth in claim 43, which further comprises the following steps of:

(a) when the counted number of times that the current simply-averaged fuel volume data signal $A_m$ is greater than the preceding simply-averaged fuel volume data signal $A_{m-1}$ is greater than the predetermined value f, further comparing the current simply-averaged fuel volume data signal $A_m$ with the preceding weight-averaged fuel volume data signal $B_{m-1}$;

(b) if the difference between the current simply-averaged data signal $A_m$ and the preceding weight-averaged data signal $B_{m-1}$ is equal to or smaller than a predetermined value e, calculating the fuel volume data signal $Q_m$ on the basis of the calculated weight-averaged fuel volume data signal $B_m$; and (c) if the difference between the current simply-averaged data signal $A_m$ and the preceding weight-averaged data signal $B_{m-1}$ is greater than the predetermined value e, calculating the fuel volume signal $Q_m$ on the basis of the calculated simply-averaged fuel volume data signal $A_m$, whereby the fuel volume can be indicated on the basis of the simply-averaged fuel volume data signal $A_m$ when the fuel volume is increasing more positively.

45. A method of measuring fuel volume within a fuel tank for an automotive vehicle, which comprises the following steps of:

(a) detecting the fuel volume within the fuel tank repeatedly and outputting fuel volume detection signals corresponding thereto at regular time intervals;

(b) simply-averaging the fuel volume detection signals and outputting simply-averaged fuel volume data signal $A_m$;

(c) weight-averaging the simply-averaged fuel volume data signal $A_m$ and outputting a weight-averaged fuel volume data signal $B_m$;

(d) comparing the current simply-averaged fuel volume data signal $A_m$ with the preceding weight-averaged fuel volume data signal $B_{m-1}$;

(e) if the current simply-averaged fuel volume data signal $A_m$ is equal to or smaller than the preceding weight-averaged fuel volume data $B_{m-1}$, calculating the fuel volume data signal $Q_m$ on the basis of the weight-averaged fuel volume data signal $B_m$;

(f) if the current data signal $A_m$ is greater than the preceding data signal $B_{m-1}$, comparing the current simply-averaged fuel volume data signal $A_m$ with the preceding simply-averaged fuel volume data signal $A_{m-1}$;

(g) if the current data signal $A_m$ is equal to or smaller than the preceding data signal $A_{m-1}$, calculating the fuel volume data signal $Q_m$ on the basis of the weight-averaged fuel volume data signal $B_m$;

(h) if the current data signal $A_m$ is greater than the preceding data signal $A_{m-1}$, counting the number of times that the current data signal $A_m$ is greater than the preceding data signal $A_{m-1}$;

(i) comparing the counted times with a predetermined value f;

(j) if the counted number of times is equal to smaller than a predetermined value f, calculating the fuel volume data signal $Q_m$ on the basis of the weight-averaged fuel volume data signal $B_m$;

(k) if the counted number of times is greater than the predetermined value f, comparing the current simply-averaged fuel volume data signal $A_m$ with the preceding weight-averaged fuel volume data signal $B_{m-1}$;

(l) if the difference between the current data signal $A_m$ and the preceding data signal $B_{m-1}$ is equal to or smaller than a predetermined value e, calculating the fuel volume data signal $Q_m$ on the basis of the weight-averaged fuel volume data signal $B_m$;

(m) if the difference is greater than the predetermined value e, calculating the fuel volume data signal $Q_m$ on the basis of the calculated simply-averaged fuel volume data signal $A_m$; and (n) indicating the fuel volume in accordance with the calculated fuel volume data signal $Q_m$, whereby the fuel volume can be indicated on the basis of the simply-averaged fuel volume data signal $A_m$ when the fuel volume is increasing more positively.

46. A method of measuring fuel volume within a fuel tank for an automotive vehicle, which comprises the following steps of:

(a) detecting the fuel volume within the fuel tank repeatedly and outputting fuel volume detection signals corresponding thereto at regular time intervals;

(b) simply-averaging the fuel volume detection signals and outputting a simply-averaged fuel volume data signal $A_m$;

(c) comparing the current simply-averaged fuel volume data signal $A_m$ with the preceding simply-averaged fuel volume data signal $A_{m-1}$;

(d) if the difference between the current data signal $A_m$ and the preceding data signal $A_{m-1}$ is greater than a predetermined value, calculating the current fuel volume data signal $Q_m$ on the basis of the simply-averaged fuel volume data signal $A_m$;

(e) if the difference is equal to or smaller than the predetermined value, calculating the weight-averaged fuel volume data signal $B_m$ on the basis of the simply-averaged fuel volume data signal $A_m$;

(f) comparing the current weight-averaged fuel volume data signal $B_m$ with the preceding weight-averaged fuel volume data signal $B_{m-1}$, (g) if the current weight-averaged fuel volume data signal $B_m$ is equal to or smaller than the preceding data signal $B_{m-1}$, calculating the current fuel volume data signal $Q_m$ on the basis of the weight-averaged fuel volume data signal $B_m$;

(h) if the current data signal $B_m$ is greater than the preceding data signal $B_{m-1}$, eliminating the weight-averaged fuel volume data signal $B_m$ before calculating the fuel volume data signal $Q_m$; and (i) indicating the fuel volume in accordance with the calculated fuel volume data signal $Q_m$, whereby an abnormal weighted-averaged fuel volume data signal $B_m$ can be eliminated.

* * * * *